(12) United States Patent
Kawano et al.

(10) Patent No.: US 11,120,063 B2
(45) Date of Patent: Sep. 14, 2021

(54) INFORMATION PROCESSING APPARATUS AND INFORMATION PROCESSING METHOD

(71) Applicant: SONY CORPORATION, Tokyo (JP)

(72) Inventors: Shinichi Kawano, Tokyo (JP); Keisuke Touyama, Tokyo (JP); Nobuki Furue, Tokyo (JP); Keisuke Saito, Tokyo (JP); Daisuke Sato, Tokyo (JP); Mitani Ryosuke, Kanagawa (JP); Miwa Ichikawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 123 days.

(21) Appl. No.: 16/068,987

(22) PCT Filed: Oct. 14, 2016

(86) PCT No.: PCT/JP2016/080485
§ 371 (c)(1),
(2) Date: Jul. 10, 2018

(87) PCT Pub. No.: WO2017/130474
PCT Pub. Date: Aug. 3, 2017

(65) Prior Publication Data
US 2019/0019511 A1 Jan. 17, 2019

(30) Foreign Application Priority Data
Jan. 25, 2016 (JP) .............................. JP2016-011224

(51) Int. Cl.
*G10L 15/22* (2006.01)
*G06F 16/34* (2019.01)
(Continued)

(52) U.S. Cl.
CPC ............ *G06F 16/345* (2019.01); *G06F 3/017* (2013.01); *G06F 40/20* (2020.01); *G06F 40/58* (2020.01);
(Continued)

(58) Field of Classification Search
CPC ........ G10L 15/22; G10L 15/26; G06F 16/345
See application file for complete search history.

(56) References Cited

U.S. PATENT DOCUMENTS 8,370,146 B1 * 2/2013 Schalkwyk ......... G10L 15/1815
704/255
9,552,354 B1 * 1/2017 Seligman ................ G06F 40/51
(Continued)

FOREIGN PATENT DOCUMENTS

JP 2000-089789 A 3/2000
JP 2006-058567 A 3/2006
(Continued)

OTHER PUBLICATIONS

Waibel, A. (1996). Interactive translation of conversational speech. Computer, 29(7), 41-48.*
(Continued)

*Primary Examiner* — Bryan S Blankenagel
(74) *Attorney, Agent, or Firm* — Chip Law Group

(57) ABSTRACT

There is provided an information processing apparatus including: a processing unit configured to perform a summarization process of summarizing content of speech indicated by voice information based on speech of a user on a basis of acquired information indicating a weight related to a summary.

18 Claims, 29 Drawing Sheets

(51) Int. Cl.
  G10L 15/26    (2006.01)
  G10L 15/00    (2013.01)
  G10L 15/10    (2006.01)
  G06F 40/20    (2020.01)
  G06F 40/58    (2020.01)
  G06F 3/01     (2006.01)
  G10L 15/18    (2013.01)

(52) U.S. Cl.
  CPC .............. *G10L 15/00* (2013.01); *G10L 15/10* (2013.01); *G10L 15/1815* (2013.01); *G10L 15/22* (2013.01); *G10L 15/26* (2013.01); *G10L 2015/223* (2013.01)

(56) References Cited

U.S. PATENT DOCUMENTS

| | | | | |
|---|---|---|---|---|
| 2007/0174343 | A1* | 7/2007 | Fortuna | G06F 40/258 |
| 2008/0097745 | A1* | 4/2008 | Bagnato | G06F 40/53 |
| | | | | 704/8 |
| 2013/0144609 | A1 | 6/2013 | Osada et al. | |
| 2013/0268839 | A1* | 10/2013 | Lefebvre | G06Q 10/107 |
| | | | | 715/234 |
| 2014/0297263 | A1* | 10/2014 | Kim | G06T 13/00 |
| | | | | 704/9 |
| 2015/0348538 | A1* | 12/2015 | Donaldson | G10L 15/08 |
| | | | | 704/235 |
| 2016/0313868 | A1* | 10/2016 | Weng | G06F 3/017 |
| 2017/0091174 | A1* | 3/2017 | Rubin | G06F 3/041 |
| 2017/0169816 | A1* | 6/2017 | Blandin | G06F 16/683 |
| 2017/0169822 | A1* | 6/2017 | Fujita | G10L 15/16 |

FOREIGN PATENT DOCUMENTS

| | | |
|---|---|---|
| JP | 2007-156888 A | 6/2007 |
| JP | 2010-256391 A | 11/2010 |
| WO | 2012/023450 A1 | 2/2012 |

OTHER PUBLICATIONS

Taskiran, C. M., Pizlo, Z., Amir, A., Ponceleon, D., & Delp, E. J. (2006). Automated video program summarization using speech transcripts. IEEE Transactions on Multimedia, 8(4), 775-791.*

Hata et al., "Sentence Boundary Detection Focused on Confidence Measure of Automatic Speech Recognition", IPSJ SIG Technical Report, vol. 2009-SLP-79, Issue 20, 06 pages.

Tatsunori Mori, "Term Weighting Method based on Information Gain Ratio for Summarizing Documents Retrieved by IR Systems", Jul. 2002, vol. 9, No. 4, pp. 3-32.

Ohno, et al., "Real-time Captioning based on Simultaneous Summarization of Spoken Monologue", IPSJ SIG Technical Report, vol. 2006-SLP-62, Jul. 8, 2006 pp. 51-56.

International Search Report and Written Opinion of PCT Application No. PCT/JP2016/080485, dated Jan. 10, 2017, 11 pages of ISRWO.

Seiichi Yamamoto, "Present State and Future Works of Spoken Language Translation Technologies", Technical Report of IEICE, Dec. 15, 2000, vol. 100, No. 523, pp. 49-54.

Yamamoto, "Present State and Future Works of Spoken Language Translation Technologies", The Institute of Electronics, Information and Communication Engineering, Dec. 2000, pp. 49-54.

Tatsunori Mori, "A term weighting method based on Information Gain Ratio for summarizing documents retrieved by IR systems", Journal of Natural Language Processing, vol. 9, No. 4, Date: Jul. 10, 2002, pp. 3-33.

Hata, et al., "Sentence boundary detection focused on Confidence Measure of Automatic Speech Recognition", IPSJ SIG Technical Report, vol. 2009-SLP-79, No. 20, Date: Dec. 22, 2009, pp. 1-7.

Seuchi Yamamoto, "Present state and future works of spoken language translation technologies", Technical Report of IEICE, vol. 100, NLC 2000-55, SP 2000-103 (Dec. 2000), Date: Dec. 15, 2000, pp. 49-54.

Ohno, et al., "Real-time captioning based on simultaneous summarization of spoken monologue", IPSJ SIG Technical Report, vol. 2006, Date: Jul. 8, 2006, pp. 51-56.

Office Action for JP Patent Application No. 2017-563679 dated Nov. 4, 2020, 07 pages of Office Action and 06 pages of English Translation.

* cited by examiner

FIG. 3A — Why there is no trash box to throw away the trash at station platform

FIG. 3B — ⇒ Why there is no trashbox at the station

FIG. 3C — ⇒ why no trash box station why
no trash box
station

| | MORNING | SHIBUYA | KNIFE | MAGIC | WHEN | WHERE | WHO | HAIR-STYLE | WEIGHT | ... |
|---|---|---|---|---|---|---|---|---|---|---|
| TIME | 1 | 0 | 0 | 0 | 1 | 0 | 0 | 0 | 0 | |
| PLACE | 0 | 1 | 0 | 0 | 0 | 1 | 0 | 0 | 0 | |
| DISH | 0 | 0 | 1 | 0 | 0 | 0 | 0 | 0 | 0 | |
| GAME TERM | 0 | 0 | 0 | 1 | 0 | 0 | 0 | 0 | 0 | |
| QUESTION | 0 | 0 | 0 | 0 | 1 | 1 | 1 | 0 | 0 | |
| MALE | 0 | 0 | 0 | 1 | 0 | 0 | 0 | 1 | 0 | |
| FEMALE | 0 | 0 | 0 | 0 | 0 | 0 | 0 | 0 | 1 | |
| ... | | | | | | | | | | |

Columns: VOCABULARY

Rows: TYPE OF WEIGHT RELATED TO SUMMARY

FIG. 7

| SCHEDULE CONTENT | TYPE OF WEIGHT RELATED TO SUMMARY |
|---|---|
| CHANGING PLACES (biz) | TIME, PLACE |
| CONFERENCE (biz) | TIME, QUESTION |
| LUNCH (biz) | TIME, JOY |
| COMMUTE (biz) | TIME, MALE |
| ⋮ | ⋮ |

FIG. 8

| BEHAVIOR | TYPE OF WEIGHT RELATED TO SUMMARY |
|---|---|
| EATING | DISH |
| PLAYING GAME | GAME TERM |
| MOVING | TIME |
| COOKING | DISH, FOOD, TIME |
| ⋮ | ⋮ |

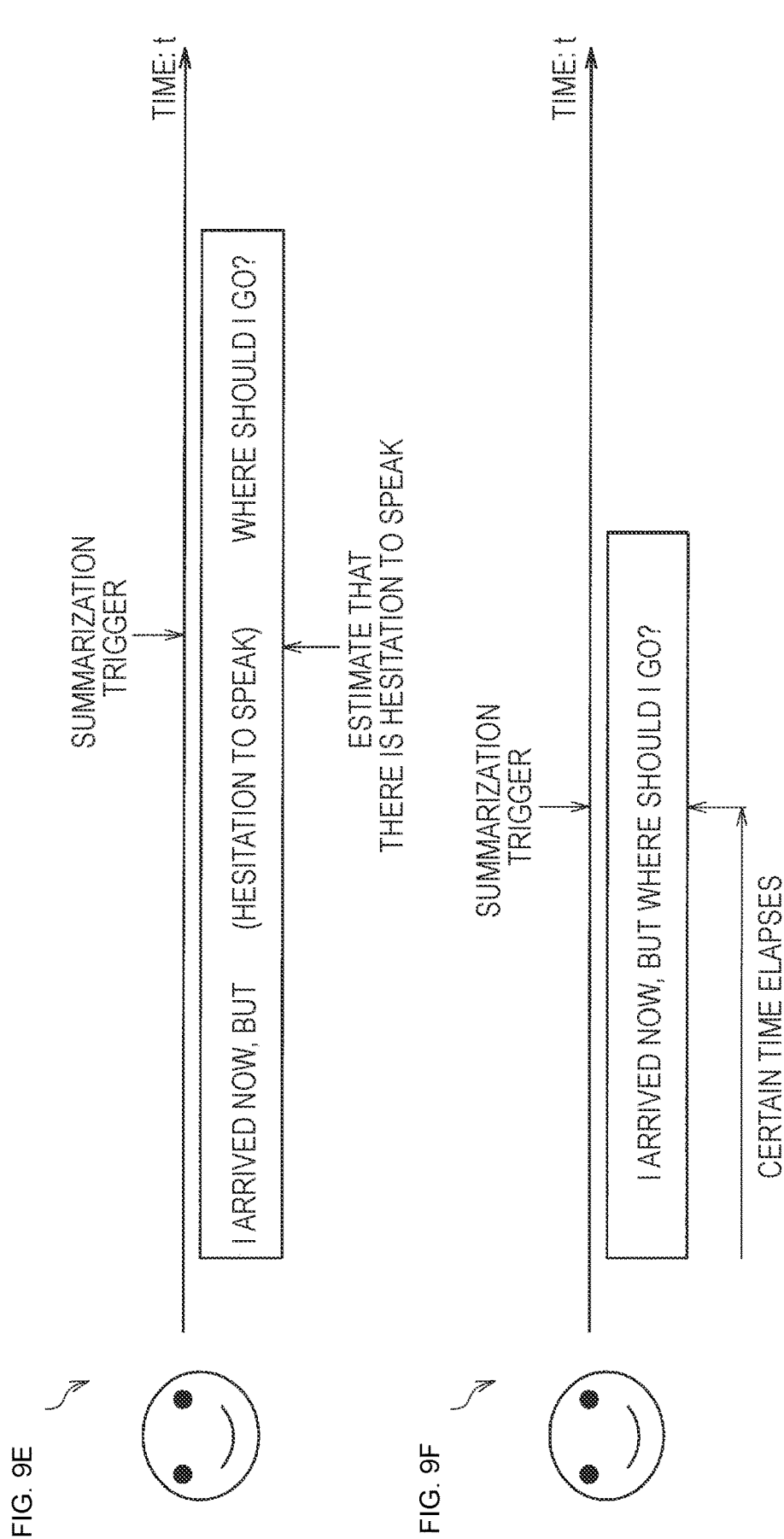

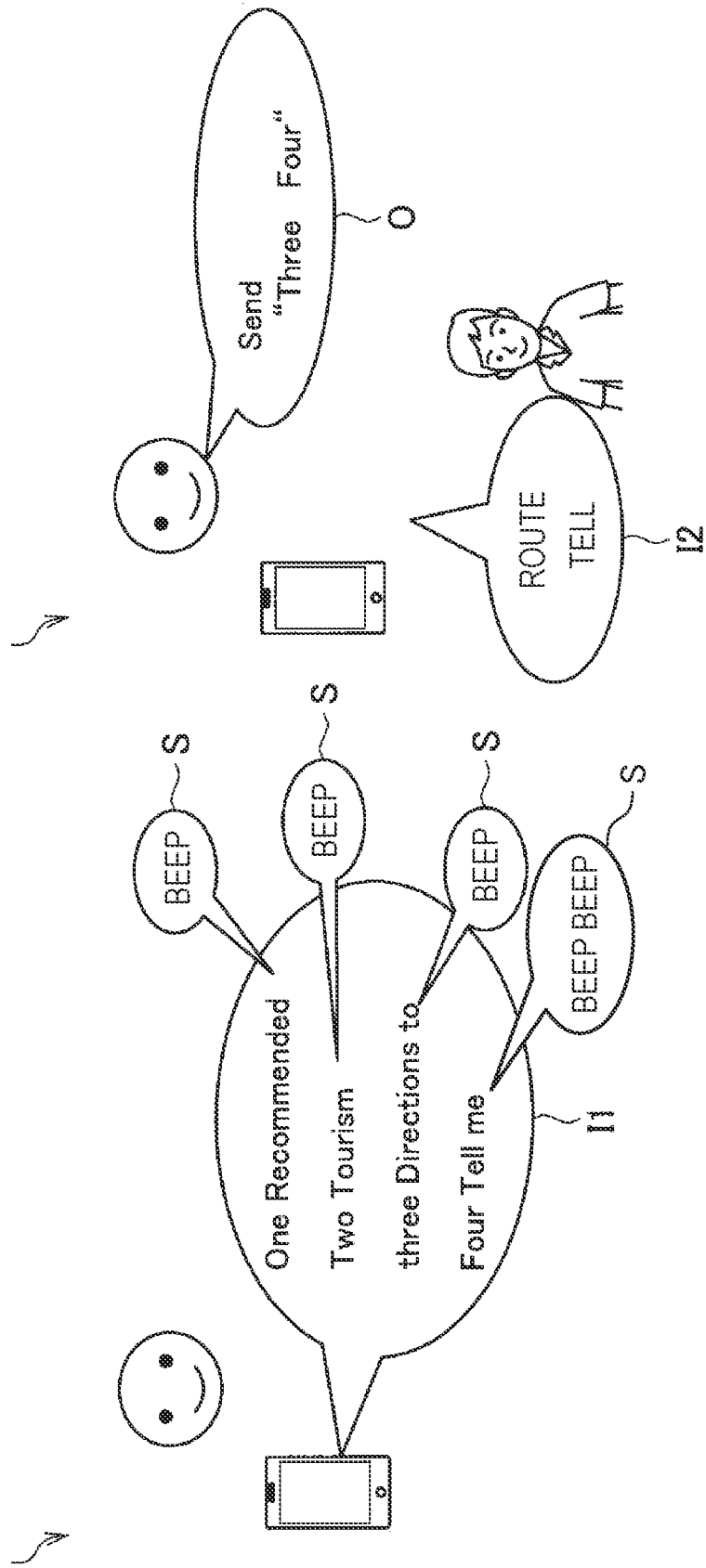

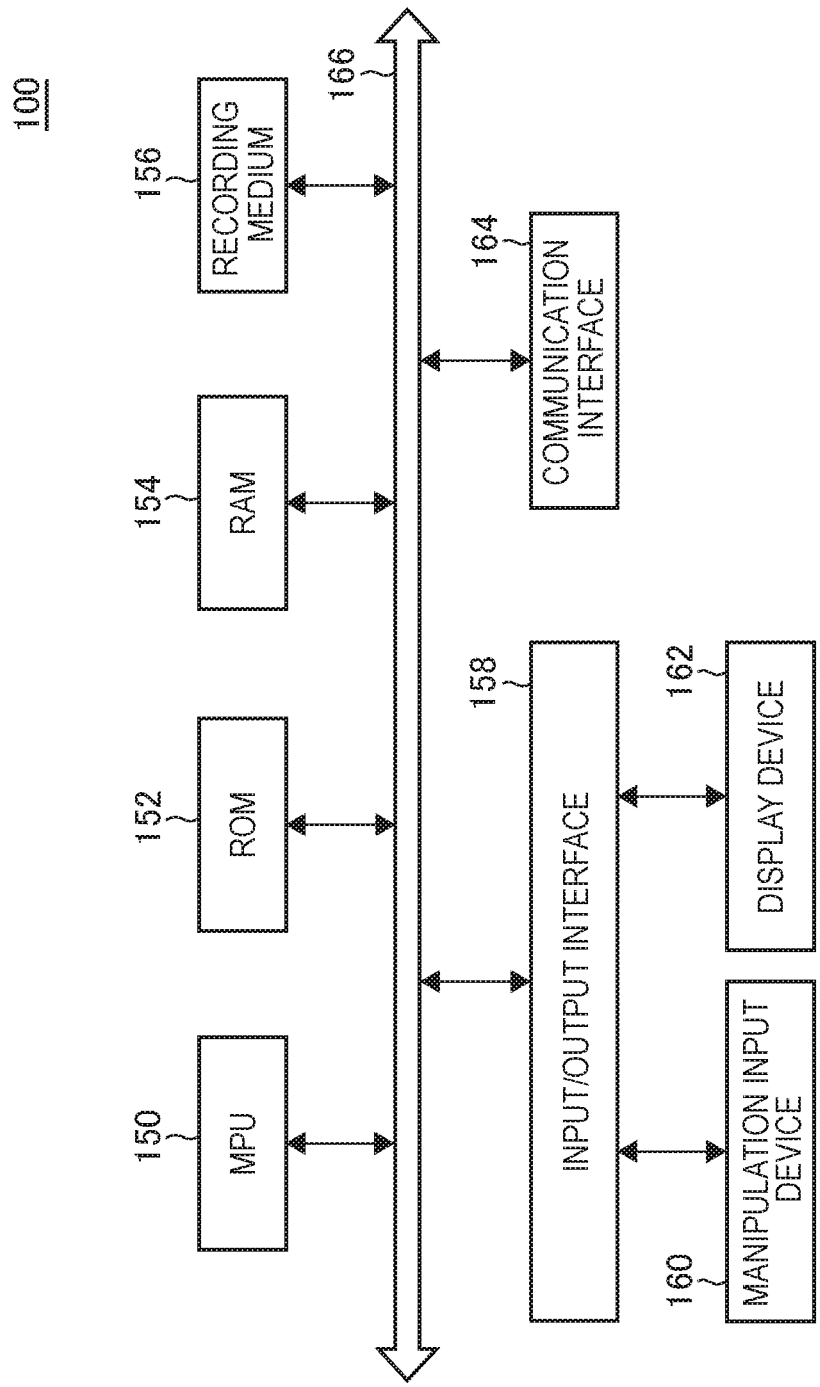

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2016/080485 filed on Oct. 14, 2016, which claims priority benefit of Japanese Patent Application No. JP 2016-011224 filed in the Japan Patent Office on Jan. 25, 2016. Each of the above-referenced applications is hereby incorporated herein by reference in its entirety.

TECHNICAL FIELD

The present disclosure relates to an information processing apparatus, an information processing method, and a program.

BACKGROUND ART

A technique of summarizing an electronic document has been developed. As a technique for summarizing an electronic document and adding a tag indicating copyright information to a generated summary, for example, there is a technique disclosed in Patent Literature 1.

CITATION LIST

Patent Literature

Patent Literature 1: JP 2001-167114A

DISCLOSURE OF INVENTION

Technical Problem

In a case in which a person speaking (hereinafter referred to as a "speaker") speaks, it is difficult for the speaker to speak only content which the speaker desires to convey.

For this reason, if a case in which communication is performed by speech is assumed, for example, often, "content other than the content which the speaker desires to convey (that is, unnecessary content) is conveyed to a partner performing communication in addition to the content which the speaker desires to convey." Therefore, in a case in which communication is performed by speech, it may "take time for a partner performing communication to understand content which the speaker desires to convey."

Further, if a case of translating content of speech into another language is assumed, for example, since "the speaker speakers content other than the content which the speaker desires to convey in addition to the content which the speaker desires to convey," for example, it may "take time to translate" or "a translation result which is not intended by the speaker" may be obtained.

Here, as a method of reducing a possibility of the occurrence of "an event caused by the speaker's difficulty speaking only the content which the speaker desires to convey" such as "it taking time for the partner performing the communication to understand content which the speaker desires to convey" or "it taking time to translate," there is a method to further simplify content of speech of the speaker.

The present disclosure proposes an information processing apparatus, an information processing method, and a program which are novel and improved and capable of summarizing content of speech.

Solution to Problem

According to the present disclosure, there is provided an information processing apparatus including: a processing unit configured to perform a summarization process of summarizing content of speech indicated by voice information based on speech of a user on a basis of acquired information indicating a weight related to a summary.

In addition, according to the present disclosure, there is provided an information processing method that is executed by an information processing apparatus, the information processing method including: a step of performing a summarization process of summarizing content of speech indicated by voice information based on speech of a user on a basis of acquired information indicating a weight related to a summary.

In addition, according to the present disclosure, there is provided a program for causing a computer to implement: a function of performing a summarization process of summarizing content of speech indicated by voice information based on speech of a user on a basis of acquired information indicating a weight related to a summary.

Advantageous Effects of Invention

According to the present disclosure, it is possible to summarize content of speech.

Note that the effects described above are not necessarily limitative. With or in the place of the above effects, there may be achieved any one of the effects described in this specification or other effects that may be grasped from this specification.

BRIEF DESCRIPTION OF DRAWINGS

FIGS. 3A, 3B, and 3C are explanatory diagrams for describing an example of a use case to which an information processing method of the present embodiment is applied.

FIG. 6 is an explanatory diagram illustrating an example of a table for setting a weight related to a summary according to the present embodiment.

FIG. 7 is an explanatory diagram illustrating an example of a table for setting a weight related to a summary according to the present embodiment.

FIG. 8 is an explanatory diagram illustrating an example of a table for setting a weight related to a summary according to the present embodiment.

FIGS. 9E and 9F are explanatory diagrams for describing an example of a summarization process according to a first information processing method.

FIGS. 19A and 19B are explanatory diagrams for describing an example of a notification control process according to the second information processing method.

FIG. 35 is an explanatory diagram illustrating an example of a hardware configuration of the information processing apparatus according to the embodiment.

MODE(S) FOR CARRYING OUT THE INVENTION

Figure 1:
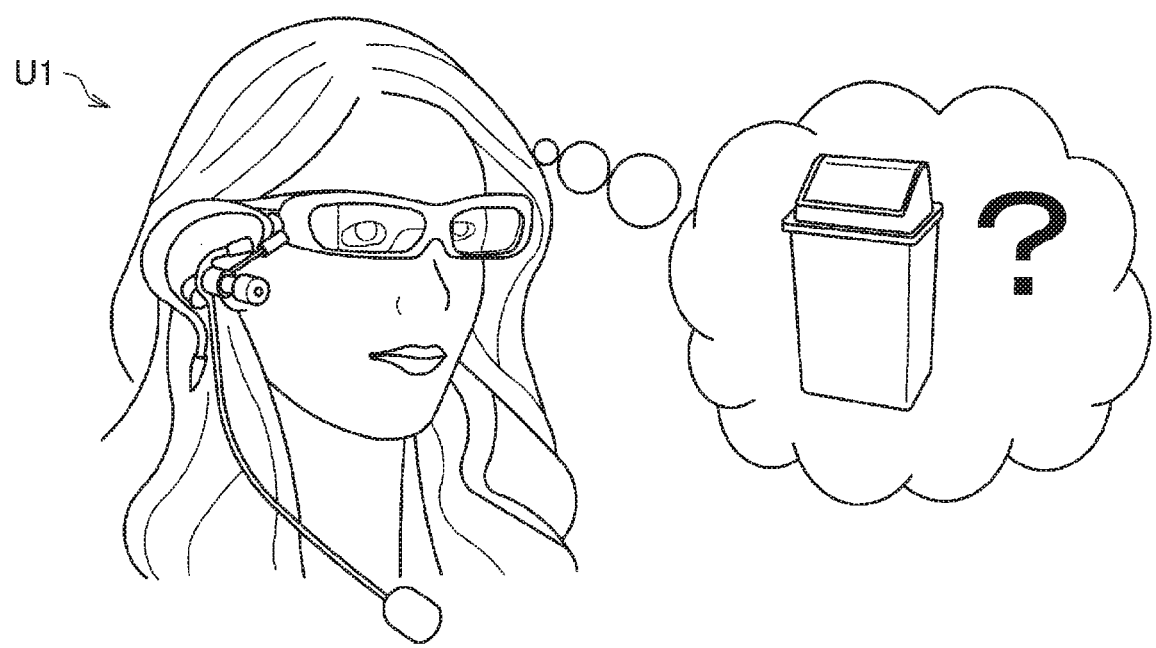
FIG. 1 is an explanatory diagram for describing an example of a use case to which an information processing method of the present embodiment is applied.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, the following description will proceed in the order described below.
1. Information processing method according to embodiment
2. Information processing apparatus according to embodiment
3. Program according to present embodiment
(Information Processing Method According to Present Embodiment)

First, an information processing method of the present embodiment will be described. A case in which a process according to an information processing method of the present embodiment is performed by an information processing apparatus according to the present embodiment will be described below as an example.

Further, the following description will proceed with an example in which the information processing method of the present embodiment is divided into a first information processing method and a second information processing method. Further, the following description will proceed mainly with a case in which the same information processing apparatus performs both a process according to the first information processing method and a process according to the second information processing method, but an information processing apparatus performing the process according to the first information processing method may be different from an information processing apparatus performing the process according to the second information processing method.

Further, in the following description, a person who is a target of the process according to the information processing method of the present embodiment is referred to as a "user." Examples of the user according to the present embodiment include a "speaker (or a person who can be a speaker)" (in a case in which the first information processing method to be described later is performed) or a "manipulator of a manipulation device related to a notification" (in a case in which the second information processing method to be described later is performed).

[1] Overview of Information Processing Method According to Present Embodiment

[1-1] Overview of First Information Processing Method

As mentioned above, as a method to further reduce the possibility of the occurrence of an "event caused by the speaker's difficulty speaking only the content which the speaker desires to convey," a method of further simplifying content of speech of the speaker is considered.

In this regard, the information processing apparatus according to the present embodiment performs a process of summarizing content of speech (hereinafter referred to as a "summarization process") as the process according to the first information processing method. The information processing apparatus according to the present embodiment summarizes content of speech indicated by voice information based on the speech of the user on the basis of acquired information indicating a weight related to a summary. Examples of the summarization according to the present embodiment include selecting content of speech on the basis of the weight related to the summary and extracting a part from content of speech on the basis of the weight related to the summary.

The information indicating the weight related to the summary is, for example, data indicating the weight related to the summary stored in a table (or a database; the same applies hereinafter) for setting the weight related to the summary to be described later. Further, the information indicating the weight related to the summary may be data indicating that the weight related to the summary is relatively large or small. For example, the information indicating the weight related to the summary is acquired with reference to the table for setting the weight related to the summary to be described later, or the like.

Here, the voice information according to the present embodiment is voice data including voice based on speech of the speaker. The voice information according to the present embodiment is generated, for example, by picking up voice based on the speech of the speaker through a voice input device such as a microphone. Further, the voice information according to the present embodiment may be a digital signal obtained by converting an analog signal generated in accordance with the voice picked up through the voice input device through an analog-to-digital (AD) converter. Further, the voice input device (or the voice input device and the AD converter) may be installed in the information processing apparatus according to the present embodiment or an external device of the information processing apparatus according to the present embodiment.

The content of the speech indicated by the voice information is, for example, a character string indicated by text data (hereinafter referred to as "voice text information") obtained as a result of performing an arbitrary voice recognition process on the voice information. The information processing apparatus according to the present embodiment recognizes the character string indicated by the voice text information as the content of the speech indicated by the voice information and summarizes the character string indicated by the voice text information.

Here, the voice recognition process on the voice information may be performed by the information processing apparatus according to the present embodiment or may be performed in an external apparatus of the information processing apparatus according to the present embodiment. In a case in which the information processing apparatus according to the present embodiment performs the voice recognition process, the information processing apparatus according to the present embodiment summarizes the character string indicated by the voice text information obtained as a result of performing the voice recognition process on the acquired voice information. Further, in a case in which the external apparatus of the information processing apparatus according to the present embodiment performs the voice recognition process, the information processing apparatus according to the present embodiment summarizes the character string indicated by the voice text information acquired from the external apparatus.

Further, in the information processing apparatus according to the present embodiment or the external apparatus, the voice recognition process may be repeated, for example, periodically/non-periodically or may be performed in accordance with a predetermined trigger such as a timing at which the voice information is acquired. Further, in the information processing apparatus according to the present embodiment or the external apparatus, the voice recognition process may be performed, for example, when a predetermined manipulation such as a manipulation of starting voice recognition related to a summary is performed.

The weight related to the summary according to the present embodiment is an index for extracting a more significant word (that is, a word which the speaker is considered to wish to convey) from the content of the speech indicated by the voice information. On the basis of the weight related to the summary according to the present embodiment, the content of the speech indicated by the voice information is summarized, and a more significant word corresponding to the weight related to the summary is included in the summarized content of the speech.

The weight related to the summary according to the present embodiment is set on the basis of at least one of, for example, the voice information, information related to the user, information related to an application, information related to an environment, and information related to a device (1 or more of these) which will be described below.

Here, the information related to the user according to the present embodiment includes at least one of, for example, state information of the user indicating a state of the user and manipulation information of the user based on a manipulation of the user.

Examples of the state of the user include a behavior performed by the user (including an action such as a gesture), an emotional state of the user, and the like. For example, the state of the user is estimated according to an arbitrary behavior estimation process or an arbitrary emotion estimation process using one or more of biometric information of the user obtained from an arbitrary biosensor, a detection result of a motion sensor such as a speed sensor or an angular velocity sensor, a captured image captured by an imaging device, and the like. The process related to the estimation of the state of the user may be performed by the information processing apparatus according to the present embodiment or may be performed in the external apparatus of the information processing apparatus according to the present embodiment. Further, the manipulation of the user includes, for example, various manipulations such as a manipulation of starting voice recognition related to a summary and a manipulation of activating a predetermined application.

Further, the information related to the application indicates, for example, an execution state of the application.

Further, the information related to the environment indicates, for example, a situation around the user (or a situation in which the user is placed). The information related to the environment is, for example, data indicating a level of noise around the user, and the like. For example, the level of the noise around the user is specified by extracting non-speech information from the voice information generated by the microphone and performing a threshold value process using one or more threshold values for level classification. A process related to acquisition of the information related to the environment may be performed by the information processing apparatus according to the present embodiment or may be performed in the external apparatus of the information processing apparatus according to the present embodiment.

Further, the information related to the device indicates, for example, either or both of a type of device and a state of the device. Examples of the state of the device include, for example, a processing load of a processor installed in the device.

A specific example of a process related to setting of the weight related to the summary will be described later.

As the summarization process according to the first information processing method is performed, the content of the speech indicated by the voice information is summarized. Therefore, it is possible to further simplify the content of the speech of the speaker indicated by the voice information.

Further, in the summarization process according to the first information processing method, for example, since the content of the speech is summarized on the basis of the weight related to the summary set as described above, more significant words corresponding to the weight related to the summary are included in the summarized content of the speech.

Therefore, when the summarization process according to the first information processing method is performed, it is possible to obtain a summarization result capable of reducing the possibility of the occurrence of "an event caused by the speaker's difficulty speaking only the content which the speaker desires to convey" such as "it taking time for the partner performing the communication to understand content which the speaker desires to convey" or "it taking time to translate."

[1-2] Overview of Second Information Processing Method

When the summarization process according to the first information processing method is performed, it is possible to obtain the content of the speech indicated by the summarized voice information.

The information processing apparatus according to the present embodiment performs a process of controlling a notification of notification content on the basis of summary information (hereinafter referred to as a "notification control process") as the process according to the second information processing method.

Here, the summary information according to the present embodiment indicates content of summarized speech corresponding to voice information based on speech of a first user. The summary information is obtained, for example, by performing the summarization process according to the first information processing method. Further, the summarized content of the speech indicated by the summary information is not limited to the above example and may be content of a summary obtained by an arbitrary method capable of summarizing the content of the speech indicated by the voice information based on the speech of the user. A case in which the summary information indicates the summarized content of the speech obtained by performing the summarization process according to the first information processing method will be described below as an example.

Further, the information processing apparatus according to the present embodiment controls a notification of notification content for a second user. Here, the notification content for the second user may be, for example, summarized content of the speech indicated by the summary information or may be something other than the summarized content of the speech indicated by the summary information such as content which is different from the summarized content of the speech in a notification order, or content obtained by translating the summarized content of the speech. Further, the first user according to the present embodiment and the second user according to the present embodiment may be different or may be the same. An example of a case in which the first user and the second user are different is a case in which the first user is a speaker, and the second user is a partner performing communication. Further, an example of a case in which the first user and the second user are the same is a case in which the first user and the second user are the same speaker.

The information processing apparatus according to the present embodiment causes a notification of the notification content to be given, for example, using either or both of a notification based on a visual method and a notification based on an auditory method.

In a case in which the notification is given using the visual method, the information processing apparatus according to the present embodiment gives the notification by, for example, causing the notification content to be displayed on a display screen of a display device. The information processing apparatus according to the present embodiment causes the notification content to be displayed on the display screen of the display device by transmitting a display control signal including display data corresponding to the notification content and a display command to the display device.

Here, examples of the display screen which is caused to display the notification content include a display device constituting a display unit (to be described later) of the information processing apparatus according to the present embodiment and an external display device of the information processing apparatus according to the present embodiment. In a case in which the display screen which is caused to display the notification content is the external display device, the information processing apparatus according to the present embodiment causes, for example, a communication unit (to be described later) installed in the information processing apparatus according to the present embodiment or an external communication device of the information processing apparatus according to the present embodiment to transmit the display control signal to the external display device.

Further, in a case in which the notification is given using the auditory method, the information processing apparatus according to the present embodiment gives the notification by causing, for example, the notification content to be output from a voice output device such as a speaker by voice (which may include music). The information processing apparatus according to the present embodiment causes the notification content to be output from the voice output device by voice by transmitting a voice output control signal including voice data indicating voice corresponding to the notification content and a voice output command to the voice output device.

Here, the voice output device which is caused to output the notification content by voice may be, for example, a voice output device installed in the information processing apparatus according to the present embodiment or may be an external voice output device of the information processing apparatus according to the present embodiment. In a case in which the voice output device which is caused to output the notification content by voice is the external voice output device, the information processing apparatus according to the present embodiment causes, for example, a communication unit (to be described later) installed in the information processing apparatus according to the present embodiment or an external communication device of the information processing apparatus according to the present embodiment to transmit the voice output control signal to the external voice output device.

Further, the notification content notification method in the information processing apparatus according to the present embodiment is not limited to one or both of the notification method using the visual method and the notification method using the auditory method. For example, the information processing apparatus according to the present embodiment can cause a notification of a delimiter in the notification content to be given using a haptic notification method, for example by causing a vibration device to vibrate, and the like.

For example, a notification of the notification content based on the summarized content of the speech obtained by the summarization process according to the first information processing method is given by performing a notification control process according to the second information processing method.

Here, as described above, the content of the summarized speech obtained by the summarization process according to the first information processing method corresponds to the summarization result capable of reducing the possibility of the occurrence of "an event caused by the speaker's difficulty speaking only the content which the speaker desires to convey."

Therefore, when the summarization process according to the second information processing method is performed, a notification of the notification content is given, and thus it is possible to reduce the possibility of the occurrence of "an event caused by the speaker's difficulty speaking only the content which the speaker desires to convey" such as "it taking time for the partner performing the communication to understand content which the speaker desires to convey" or "it taking time to translate."

[1-3] Other Processes According to Information Processing Method According to Present Embodiment Further, the process according to the information processing method of the present embodiment is not limited to the summarization process according to the first information processing method and the notification control process according to the second information processing method.

For example, the process according to the information processing method of the present embodiment may further include a process of translating the content of the speech summarized according to the summarization process according to the first information processing method into another language (hereinafter referred to as a "translation process"). When the translation process is performed, the summarized content of the speech is translated from a first language corresponding to the voice information based on the speech into a second language different from the first language. The translated summarized content of the speech obtained by performing the translation process is referred to as a "translation result."

Here, the translation process according to the present embodiment may be carried out as a part of the process according to the first information processing method or as a part of the process according to the second information processing method.

Further, the process according to the information processing method of the present embodiment may further include a recording control process of causing either or both of the result of the summarization process according to the first information processing method and the result of the translation process according to the present embodiment to be recorded in an arbitrary recording medium.

Further, in the recording control process, for example, "either or both of the result of the summarization process according to the first information processing method and the result of the translation process according to the present embodiment," and information related to the user such as "position information (to be described later) corresponding to the user and biometric information of the user obtained from an arbitrary biosensor or the like" may be associated with each other and recorded as a log. As the log is recorded in the recording medium, for example, an application in which "the user looks back later on recording of travel or the like" is implemented.

[2] One Example of Use Case to which Information Processing Method According to Present Embodiment is Applied Next, an example of the process according to the information processing method of the present embodiment will be described while describing an example of a use case to which the information processing method of the present embodiment is applied. As the use case to which the information processing method of the present embodiment is applied, a case in which the information processing method of the present embodiment is applied to "conversation support" (including a case in which translation is performed as will described later) will be described below.

Further, the use case to which the information processing method of the present embodiment is applied is not limited to the "conversation support." For example, the information processing method of the present embodiment can be applied to arbitrary use cases in which the content of the speech indicated by voice information is summarized as described below.

"Conference transcription" implemented by summarizing content of speech indicated by voice information indicating voice in a conference which is generated by an integrated circuit (IC) recorder or the like "Automatic program telop generation" implemented by summarizing content of speech indicated by voice information indicating voice in a television program Either or both of "automatic conference telop generation" and "conference transcription" implemented by summarizing content of speech indicated by voice information indicating voice in a television conference FIG. 1 to FIG. 5 are explanatory diagrams for describing an example of a use case to which the information processing method of the present embodiment is applied.

Figure 2:
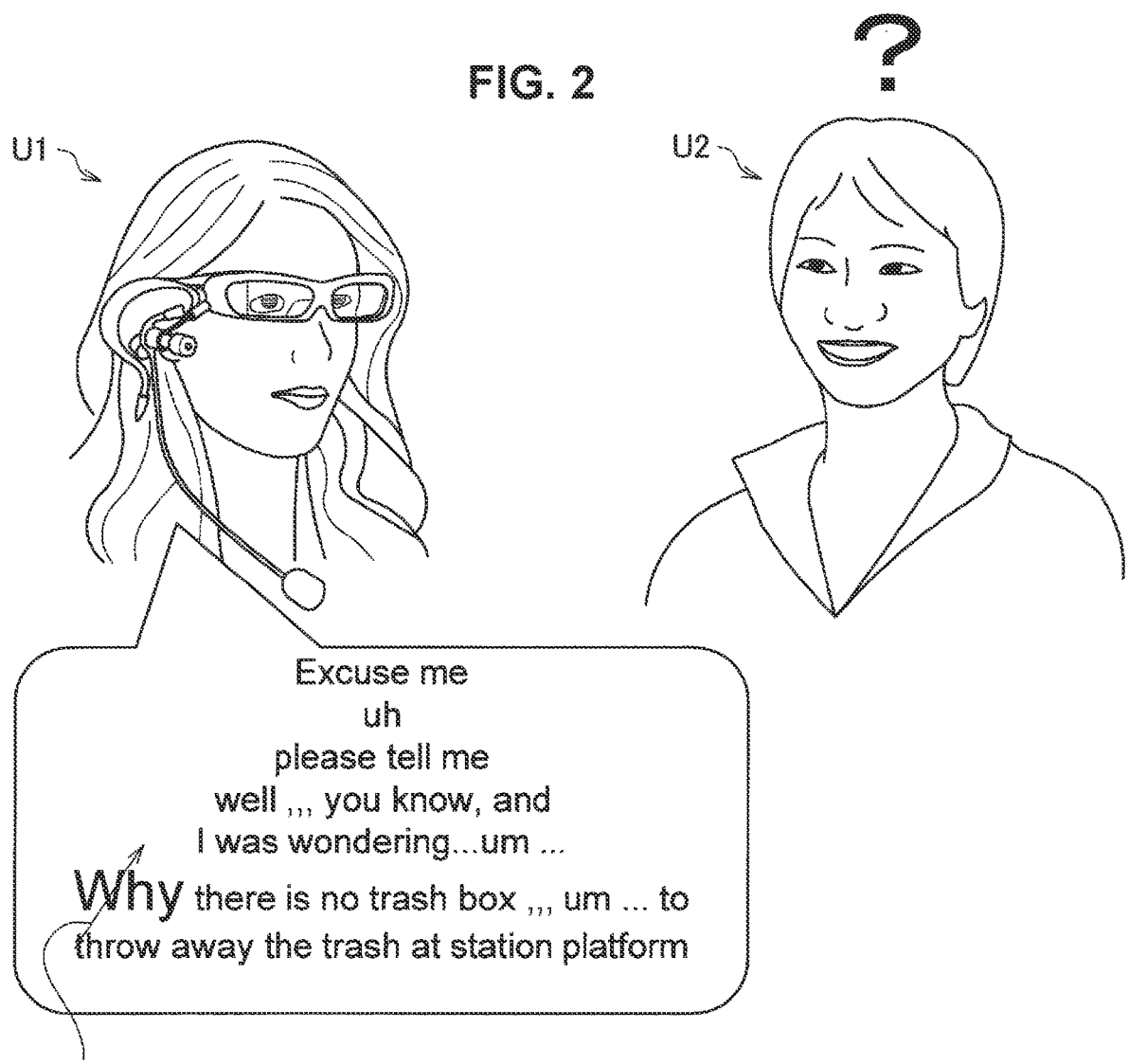
FIG. 2 is an explanatory diagram for describing an example of a use case to which an information processing method of the present embodiment is applied.
Figures 4A, 4B, 5:
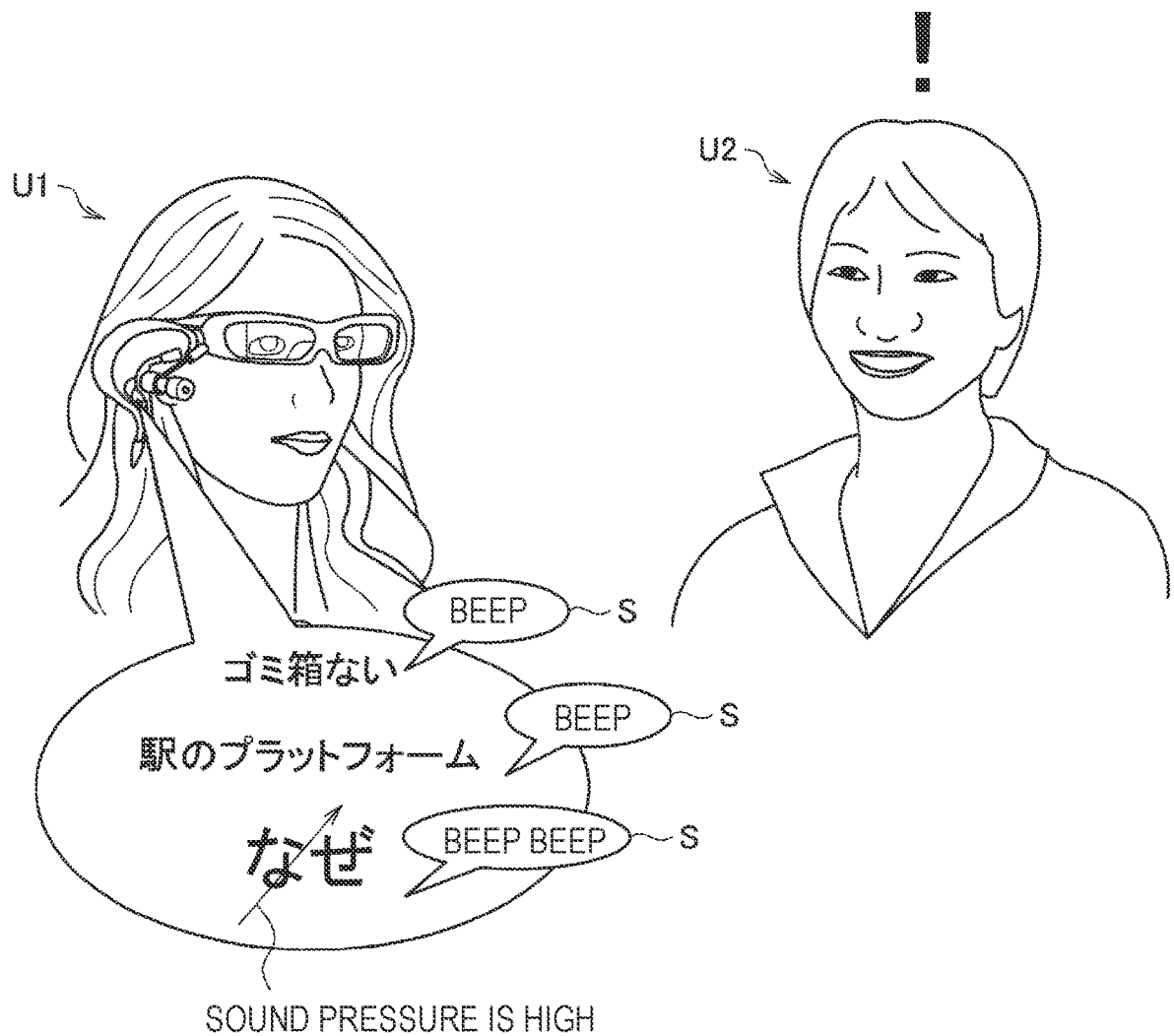
FIGS. 4A and 4B are explanatory diagrams for describing an example of a use case to which an information processing method of the present embodiment is applied.
FIG. 5 is an explanatory diagram for describing an example of a use case to which an information processing method of the present embodiment is applied.

A person indicated by "U1" in FIGS. 1, 2, and 5 corresponds to the user according to the present embodiment. Further, a person indicated by "U2" in FIG. 2 and FIG. 5 corresponds to a partner who performs communication with the user U1. Hereinafter, the person indicated by "U1" in FIGS. 1, 2, and 5 is referred to as a "user U1," and the person indicated by "U2" in FIGS. 2 and 5 is referred to as a "communication partner U2." Further, in the following description, a native language of the communication partner U2 is assumed to be Japanese.

In FIGS. 1, 2, and 5, an example in which the user U1 is wearing an eyewear type apparatus including a display screen is illustrated. Further, a voice input device such as a microphone, a voice output device such as a speaker, and an imaging device are connected to the eyewear type apparatus worn by the user U1 illustrated in FIGS. 1, 2, and 5.

Further, in an example of the use case described below, examples of the information processing apparatus according to the present embodiment include a wearable apparatus used in a state in which it is worn on the body of the user U1 such as the eyewear type apparatus illustrated in FIG. 1, a communication apparatus such as a smartphone, a computer such as a server, and the like. Further, the information processing apparatus according to the present embodiment is not limited to the example described above. An application example of the information processing apparatus according to the present embodiment will be described later.

An example of the use case to which the information processing method of the present embodiment is applied will be described below with reference to FIGS. 1, 2, 3A, 3B, 3C, 4A, 4B, and 5.

A case in which the user U1 speaking English arrives at an airport in Japan by airplane is assumed.

(a) Example of Process Related to Setting of Weight Related to Summary

The information processing apparatus according to the present embodiment, for example, sets a weight related to a summary using a table for setting the weight related to the summary. Here, the table for setting the weight related to the summary may be stored in a storage unit (to be described later) of the information processing apparatus according to the present embodiment or may be stored in an external recording medium of the information processing apparatus according to the present embodiment. The information processing apparatus according to the present embodiment uses, for example, the table for setting the weight related to the summary with reference to the storage unit (to be described later) or the external recording medium as appropriate.

Further, for example, the information processing apparatus according to the present embodiment can decide the weight related to the summary according to an arbitrary algorithm of deciding the weight related to the summary and set the weight related to the summary.

FIGS. 6 to 8 are explanatory diagrams illustrating an example of the table for setting the weight related to the summary according to the present embodiment.

FIG. 6 illustrates an example of a table for specifying the weight related to the summary and illustrates an example of a table in which a weight is assigned to each type of weight related to a summary for each word of a registered vocabulary. Here, in FIG. 6, a combination indicated by a value "1" among combinations of types of weight related to the summary and vocabulary words corresponds to a weighted combination. Further, in FIG. 6, a combination indicated with a value "0" among combinations of types of weight related to the summary and vocabulary words corresponds to a non-weighted combination.

Further, FIGS. 7 and 8 illustrate examples of tables for specifying types of the weight related to the summary. FIG. 7 illustrates an example of a table in which schedule content specified from a state of a scheduling application (or schedule content estimated from the state of the scheduling application) is associated with a type of weight related to the summary. Further, FIG. 8 illustrates an example of a table in which a behavior of the user (an example of the state of the user) is associated with a type of weight related to the summary.

For example, the information processing apparatus according to the present embodiment sets the weight related to the summary using both the tables for specifying the type of weight related to the summary as illustrated in FIGS. 7 and 8 and the table for specifying the weight related to the summary as illustrated in FIG. 6 as the table for setting the weight related to the summary.

Further, the example of the table for specifying the type of weight related to the summary according to the present embodiment is not limited to the examples illustrated in FIGS. 7 and 8, and the example of the table for specifying the weight related to the summary is not limited to the example illustrated in FIG. 6. Further, the table for setting the weight related to the summary according to the present embodiment may be provided in each language such as Japanese, English, Chinese, or the like.

Further, the information processing apparatus according to the present embodiment can set the weight related to the summary using only the table for specifying the weight related to the summary as illustrated in FIG. 6 in a case in which deciding the type of weight related to the summary on the basis of at least one of, for example, the voice information, the information related to the user, the information related to the application, the information related to the environment, and the information related to the device.

The information processing apparatus according to the present embodiment decides the type of weight related to the summary by selecting the type of weight related to the summary associated with a recognition result from the table for specifying the weight related to the summary illustrated in FIG. 6 on the basis of the recognition result based on at least one of, for example, the voice information, the information related to the user, the information related to the application, the information related to the environment, and the information related to the device. Then, for example, the information processing apparatus according to the present embodiment sets a weighting to a vocabulary word corresponding to the combination indicated by the value "1" among the combinations of decided types of weight related to the summary and vocabulary words with reference to the table for specifying the weight related to the summary as illustrated in FIG. 6.

As a specific example, the information processing apparatus according to the present embodiment sets the weight related to the summary, for example, by performing any of the following processes (a-1) to (a-5).

Further, an example related to the setting of the weight related to the summary is not limited to the examples described in the following processes (a-1) to (a-5). For example, the information processing apparatus according to the present embodiment can set the weight related to the summary in accordance with a language recognized on the basis of the voice information as well. As an example of the setting of the weight related to the summary according to the language, there are, for example, "increasing a weight of a verb in a case in which the language recognized on the basis of the voice information is Japanese," "increasing a weight of a noun if the language recognized on the basis of the voice information is English," and the like. Further, for example, the information processing apparatus according to the present embodiment may set each of the weight related to the summary according to the situation around the user indicated by the information related to the environment and the weight related to the summary according to content indicated by the information related to the device (for example, the type of device or the like).

(a-1) First Example of Setting of Weight Related to Summary: One Example of Setting of Weight Related to Summary Based on State of User Indicated by State Information of User Included in Information Related to User For example, if the user U1 manipulates an apparatus such as a smartphone to activate the scheduling application and checks a destination, the information processing apparatus according to the present embodiment recognizes that the user U1 is moving toward the destination. Then, the information processing apparatus according to the present embodiment sets the weight related to the summary corresponding to the recognition result with reference to the table for setting the weight related to the summary.

As a specific example, the information processing apparatus according to the present embodiment specifies "time" corresponding a behavior "moving" as the type of weight related to the summary from the table for specifying the type of weight related to the summary illustrated in FIG. 8 on the basis of the recognition result obtained as described above indicating that the user U1 is moving toward the destination. Further, the information processing apparatus according to the present embodiment sets a weighting to a vocabulary word corresponding to the combination indicated by the value "1" among the combinations of specified types of weight related to the summary and vocabulary words with reference to the table for specifying the weight related to the summary illustrated in FIG. 6. In a case in which the table for specifying the weight related to the summary illustrated in FIG. 6 is used, the weighting is set to the vocabulary "morning," "when," . . . .

Further, in a case in which the user U1 manipulates an apparatus such as a smartphone and activates the game application, the information processing apparatus according to the present embodiment recognizes that the user U1 is playing the game. Then, the information processing apparatus according to the present embodiment sets the weight related to the summary corresponding to the recognition result with reference to the table for setting the weight related to the summary.

For example, the information processing apparatus according to the present embodiment specifies "game terms" corresponding to a behavior "playing a game" as the type of weight related to the summary from the table for specifying the type of weight related to the summary illustrated in FIG. 8 on the basis of the recognition result obtained as described above indicating that the user U1 is playing a game. Further, the information processing apparatus according to the present embodiment sets a weighting to a vocabulary word corresponding to the combination indicated by the value "1" among the combinations of decided types of weight related to the summary and vocabulary words with reference to the table for specifying the weight related to the summary illustrated in FIG. 6.

Further, the information processing apparatus according to the present embodiment can decide the type of weight related to the summary associated with the recognition result such as "game terms" included in the table for specifying the weight related to the summary illustrated in FIG. 6 as the type of weight related to the summary on the basis of the recognition result obtained as described above indicating that the user U1 is playing a game. Further, the information processing apparatus according to the present embodiment sets a weighting to a vocabulary word corresponding to the combination indicated by the value "1" among the combinations of decided types of weight related to the summary and vocabulary words with reference to the table for specifying the weight related to the summary illustrated in FIG. 6.

Further, for example, the information processing apparatus according to the present embodiment can set the weight related to the summary on the basis of the recognition result of the state of the user U1 estimated on the basis of the detection result of the motion sensor such as the acceleration sensor or the angular velocity sensor installed in an apparatus such as a smartphone used by the user U1.

For example, in a case in which a recognition result indicating that the user U1 is eating is obtained on the basis of the detection result of the motion sensor, "dish" corresponding to a behavior "eating" is specified as the type of weight related to the summary from the table for specifying the type of weight related to the summary illustrated in FIG. 8. Further, the information processing apparatus according to the present embodiment sets a weighting to a vocabulary word corresponding to the combination indicated by the value "1" among the combinations of decided types of weight related to the summary and vocabulary words with reference to the table for specifying the weight related to the summary illustrated in FIG. 6.

(a-2) Second Example of Setting of Weight Related to Summary: One Example of Setting of Weight Related to Summary Based on Voice Information The information processing apparatus according to the present embodiment sets the weight related to the summary on the basis of the voice information.

The information processing apparatus according to the present embodiment decides the type of weight related to the summary on the basis of, for example, the voice information as described below.

In a case in which an average frequency band of the voice indicated by the voice information is, for example, 300 to 550 [Hz], "male" is decided as the type of weight related to the summary.

In a case in which the average frequency band of the voice indicated by the voice information is, for example, 400 to 700 [Hz], "female" is decided as the type of weight related to the summary.

In a case in which sound pressure and volume of the voice indicated by the voice information are equal to or larger than a set first threshold value or in a case in which the sound pressure and volume of the voice indicated by the voice information are larger than the first threshold value, either or both of "anger" and "joy" are decided as the type of weight related to the summary.

In a case in which the sound pressure and volume of the voice indicated by the voice information are equal to or less than a set second threshold value or in a case in which the sound pressure and volume of the voice indicated by the voice information are less than the second threshold value: one or more of "sadness," "discomfort," "distress," and "anxiety" are decided.

In a case in which a pitch (a sound pitch) or a speaking speed (amount of phoneme per unit time) of the voice indicated by the voice information is larger than a set third threshold value or in a case in which the pitch or the speaking speed of the voice indicated by voice information is equal to or larger than the third threshold value, "excitement" is decided as the type of weight related to the summary. In a case in which the pitch or the speaking speed of the voice indicated by voice information is less than a set fourth threshold value or in a case in which the pitch or the speaking speed of the voice indicated by voice information is equal to or less than the fourth threshold value, "balance" is decided as the type of weight related to the summary.

The first threshold value may be a fixed value such as, for example, 72 [dB]. Further, the second threshold value may be a fixed value such as, for example, 54 [dB]. Further, the first threshold value and the second threshold value may change dynamically depending on a distance between the user such as the user U1 and the partner performing communication such as the communication partner U2. As an example in which the first threshold value and the second threshold value change dynamically, for example, a "technique of increasing the threshold value by 6 [dB] each time the distance is reduced by 0.5 [m] and decreasing the threshold value by 6 [dB] each time the distance is increased by 0.5 [m]" may be used. The distance may be estimated, for example, by performing arbitrary image processing on a captured image captured by the imaging device or may be acquired by a distance sensor. In a case in which the distance is estimated, a process related to the estimation of the distance may be performed by the information processing apparatus according to the present embodiment or may be performed in the external apparatus of the information processing apparatus according to the present embodiment.

Further, the third threshold value and the fourth threshold value may be fixed values that are set in advance or may be variable values that can be changed on the basis of a manipulation of the user or the like.

Further, the type of weight related to the summary decided on the basis of the voice information is not limited to the above example.

For example, it is possible to estimate an emotion (for example, anger, joy, sadness, or the like) on the basis of either or both of the number of moras and a position of an accent obtained from the voice information and set the type of weight related to the summary corresponding to the estimated emotion. In a case in which the type of weight related to the summary corresponding to the estimated emotion is set, the information processing apparatus according to the present embodiment may change a strength of the weight related to the emotion on the basis of, for example, a change rate of a basic frequency, a change rate of a sound, a change rate of a speaking period, or the like obtained from the voice information.

Here, similarly to the first example described in (a-1), the information processing apparatus according to the present embodiment may decide the type of weight related to the summary using the tables for specifying the type of weight related to the summary as illustrated in FIGS. 7 and 8 or decide the weight related to the summary using only the table for specifying the weight related to the summary illustrated in FIG. 6.

If the weight related to the summary is decided, similarly to the first example described in (a-1), the information processing apparatus according to the present embodiment sets a weighting to a vocabulary corresponding to the combination indicated by the value "1" among the combinations of specified types of weight related to the summary and vocabularies with reference to the table for specifying the weight related to the summary as illustrated in FIG. 6.

(a-3) Third Example of Setting of Weight Related to Summary: One Example of Setting of Weight Related to Summary Based on Execution State of Application Indicated by Information Related to Application The information processing apparatus according to the present embodiment sets the weight related to the summary on the basis of the execution state of the application.

For example, in a case in which the user U1 manipulates an apparatus such as a smartphone to activate the scheduling application and checks the destination, the information processing apparatus according to the present embodiment specifies "time" and "place" corresponding to schedule content "changing places (biz)" as the type of weight related to the summary from the table for specifying the type of weight related to the summary illustrated in FIG. 7 on the basis of the execution state of the scheduling application. Further, the information processing apparatus according to the present embodiment sets a weighting to a vocabulary word corresponding to the combination indicated by the value "1" among the combinations of specified types of weight related to the summary and vocabulary words with reference to the table for specifying the weight related to the summary illustrated in FIG. 6. In a case in which the table for specifying the weight related to the summary illustrated in FIG. 6 is used, the weighting is set to the vocabulary "morning," "Shibuya," "when," "where," . . . .

Further, the information processing apparatus according to the present embodiment can decide the type of weight related to the summary on the basis of, for example, a property of an application being executed as described below and set the weight related to the summary.

In a case in which a map application is being executed, "time," "place," "personal name," or the like are decided as the type of weight related to the summary.

In a case in which a transfer guidance application is being executed: "time," "place," "train," or the like are decided as types of weight related to the summary.

In a case in which an application for smoothly asking questions about Japan is being executed, "question," "Japan," or the like are decided as the type of weight related to the summary.

(a-4) Fourth Example of Setting of Weight Related to Summary: One Example of Setting of Weight Related Summary Based on Manipulation of User Indicated by Manipulation Information of User Included in Information Related to User The information processing apparatus according to the present embodiment sets the weight related to the summary on the basis of the manipulation of the user.

For example, the information processing apparatus according to the present embodiment selects the type of weight related to the summary selected by a manipulation of selecting the type of weight related to the summary (an example of the manipulation of the user) as the type of weight related to the summary used for the setting of the weight related to the summary.

Further, for example, when a predetermined manipulation such as a manipulation of starting the voice recognition related to the summary is performed, the information processing apparatus according to the present embodiment may automatically set the type of weight related to the summary associated with the predetermined manipulation in advance. As an example, in a case in which the manipulation of starting the voice recognition related to the summary is performed, "question" or the like is decided as the type of weight related to the summary.

If the weight related to the summary is decided, similarly to the first example described in (a-1), the information processing apparatus according to the present embodiment sets a weighting to a vocabulary corresponding to the combination indicated by the value "1" among the combinations of specified types of weight related to the summary and vocabularies with reference to the table for specifying the weight related to the summary as illustrated in FIG. 6.

(a-5) Fifth Example of Setting of Weight Related to Summary

The information processing apparatus according to the present embodiment can set the weight related to the summary by combining two or more of (a-1) to (a-4) described above.

(b) Example of Summarization Process According to First Information Processing Method For example, a case in which when the user U1 desires to throw trash at a station while moving towards the destination, because there is no trash can at the station, the user U1 asks the communication partner U2 about a "reason why there is no trash can at the station" in English (FIGS. 1 and 2) is assumed Here, in a case in which the communication partner U2 is unable to fully understand English, it is highly likely that the communication partner U2 is unable to fully understand content which the user U1 is visiting.

In this regard, the information processing apparatus according to the present embodiment performs the summarization process according to the first information processing method, and summarizes the content of the speech indicated by the voice information generated by the microphone connected to, for example, the eyewear type apparatus illustrated in FIG. 1. The information processing apparatus according to the present embodiment summarizes, for example, a character string indicated by voice text information based on the voice information as described above.

More specifically, the information processing apparatus according to the present embodiment summarizes the content of the speech according to an objective function using the weight related to the summary set according to, for example, the process described in (a) as indicated in the following Formula 1.

[Math. 1]

$$D = \arg\max_y \left( \sum_a \sum_W \sum_y a_i \cdot W_{jy_i} \cdot z_{y_i} \right) \quad \text{(Formula 1)}$$

Here, "W" in Formula 1 indicates the weight related to the summary. Further, "$a_i$" in Formula 1 indicates a parameter for adjusting a contribution rate of each of the weights related to summary, and has a real number of, for example, 0 to 1. Further, "$z_{y_i}$" in Formula 1 indicates a binary variable indicating "1" if a phrase $y_i$ is included and "0" if the phrase $y_i$ is not included.

Further, the information processing apparatus according to the present embodiment is not limited to the method using the objective function using the weight related to the summary indicated by Formula 1, and an arbitrary method capable of summarizing the content of the speech using the set weight related to the summary can be used.

FIGS. 3A and 3B illustrate an example of a result of the summarization process according to the first information processing method. FIG. 3A illustrates an example of the content of the speech before being summarized. Further, FIG. 3B illustrates an example of the summarized content of the speech, and FIG. 3C illustrates another example of the summarized content of the speech.

As the content of the speech is summarized as illustrated in FIG. 3B, the content of the speech is more simplified than before the content of the speech is summarized. Therefore, even in a case in which the communication partner U2 is unable to fully understand English, since the content of the speech is summarized as illustrated in FIG. 3B, it is highly likely that the communication partner U2 can understands the content which the user U1 is visiting.

Further, FIG. 3C illustrates an "example in which the information processing apparatus according to the present embodiment performs further morphological analysis on the summarization result illustrated in FIG. 3B and sets divisional texts obtained by dividing the summarization result illustrated in FIG. 3B in units in which morphemes based on a result of performing morphological analysis are combined as the summarized content of the speech."

For example, in a case in which the language of the character string indicated by the voice text information corresponding to the content of the speech is Japanese, the information processing apparatus according to the present embodiment generates the divisional texts in units in which main parts of speech (a noun, a verb, an adjective, and an adverb) and the other morphemes are combined. Further, for example, in a case in which the language of the character string indicated by the voice text information corresponding to the content of the speech is English, the information processing apparatus according to the present embodiment further sets 5W1H as the divisional text.

As the content of the speech is summarized as illustrated in FIG. 3C, the content of the speech is simplified more than the summarization result illustrated in FIG. 3B. Therefore, even in a case in which the communication partner U2 is unable to sufficiently understand English, since the content of the speech is summarized as illustrated in FIG. 3C, it is possible to further increase the possibility that the communication partner U2 can understands the content which the user U1 is visiting.

(c) An Example of Translation Process

The information processing apparatus according to the present embodiment may further translate, for example, the content of the speech summarized according to the summarization process described in (b) into another language. As described above, the information processing apparatus according to the present embodiment translates a first language corresponding to the speech into a second language different from the first language.

For example, the information processing apparatus according to the present embodiment identifies a position at which the user U1 is located, and translates the summarized content of the speech into an official language in a case in which the language of the character string indicated by the voice text information corresponding to the content of the speech is different from the official language at the specified position. The position at which the user U1 is located is, for example, specified on the basis of position information acquired from a wearable apparatus worn by the user U1 such as the eyewear type apparatus illustrated in FIG. 1, a communication apparatus such as a smartphone possessed by the user U1, or the like. The position information is, for example, data indicating a detection result of a device capable of specifying a position such as a global navigation satellite system (GNSS) device (or data indicating an estimation result of a device capable of estimating a position according to an arbitrary method).

Further, for example, in a case in which the language of character string indicated by the voice text information corresponding to the content of the speech is different from the set language, the information processing apparatus according to the present embodiment may translate the summarized content of the speech into the set language.

The information processing apparatus according to the present embodiment translates the summarized content of the speech into another language according to a process of an arbitrary algorithm capable of translating into another language.

FIGS. 4A and 4B illustrate an example of a result of the translation process according to the present embodiment. FIG. 4A illustrates the summarization result illustrated in FIG. 3C as an example of the summarized content of the speech before being translated. Further, FIG. 4B illustrates an example of a translation result of translating the summarization result illustrated in FIG. 3C into Japanese as an example of content in which the summarization result illustrated in FIG. 3C is translated into another language according to the translation process. Hereinafter, the translation result obtained by translating the divisional text such as the summarization result illustrated in FIG. 3C is also referred to as "divisional translation text."

As illustrated in FIG. 4B, the summarized content of the speech is translated into Japanese which is the native language of the communication partner U2, and thus the possibility that the communication partner U2 can understand the content which the user U1 is visiting can be further increased as compared with a case in which the summarized content of the speech is not translated.

(d) Example of Notification Control Process According to Second Information Processing Method The information processing apparatus according to the present embodiment causes a notification of the content of the speech which is indicated by the voice information and summarized according to the summarization process described in (b) to be given. Further, the translation process described in (c) is further performed, and in a case in which the summarized content of the speech is translated into another language, the information processing apparatus according to the present embodiment causes a notification of the translation result to be given.

As described above, the information processing apparatus according to the present embodiment may cause a notification of the summarized content of the speech (or the translation result) to be given as the notification content according to, for example, either or both of the notification based on the visual method and the notification based on the auditory method.

FIG. 5 illustrates an example of a result of the notification control process according to the present embodiment. FIG. 5 illustrates an "example in which an auditory notification of the translation result is given by outputting a voice indicating the translation result from the voice output device connected to the eyewear type apparatus worn by the user U1." Further, FIG. 5 illustrates an example in which a notification of the translation result illustrated in of FIG. 4B is given.

FIG. 5 illustrates an example in which sound pressure of a part corresponding to a speech part in which the sound pressure is strong (a part of "why" illustrated in FIG. 5) is caused to be stronger than the other parts on the basis of the voice information.

Further, FIG. 5 illustrates an example in which, when the voice indicating the translation result is output, a notification of the delimiter of the divisional text is given by inserting a sound feedback indicated by a reference numeral "S" in FIG. 5.

Further, the example of the notification implemented according to the notification control process according to the second information processing method is not limited to the example illustrated in FIG. 5. Another example of the notification implemented according to the notification control process according to the second information processing method will be described later.

For example, as illustrated in FIG. 5, the summarized content of the speech translated into Japanese which is the native language of the communication partner U2 (the translation result) is output as the notification content from the voice output device by voice, and thus it is easier to cause the communication partner U2 to understand the content which the user U1 is visiting.

The use case to which the information processing method of the present embodiment is applied includes the use case of the "conversation support" (including the case in which translation is performed). Further, needless to say, the use case to which the information processing method of the present embodiment is applied is not limited to the "conversation support."

[3] Process Related to Information Processing Method According to Present Embodiment Next, a process according to the information processing method of the present embodiment will be described in further detail. The summarization process according to the first information processing method, the translation process according to the present embodiment, and the notification control process according to the second information processing method will be described below.

[3-1] Summarization Process According to First Information Processing Method

The information processing apparatus according to the present embodiment summarizes the content of the speech indicated by the voice information based on the speech of the user on the basis of the information indicating the weight related to the summary.

As described above, the weight related to the summary is set on the basis of one or more of, for example, the voice information, the state of the user, the execution state of the application, and the manipulation of the user. Further, as described above, the information processing apparatus according to the present embodiment summarizes the content of the speech according to, for example, an objective function using the weight related to the summary set as indicated in Formula 1.

Further, for example, the information processing apparatus according to the present embodiment can perform one or more of the following processes (1) to (3) as the summarization process.

(1) First Example of Summarization Process: Start Timing of Summarization Process The information processing apparatus according to the present embodiment performs the summarization process in a case in which a set predetermined condition is satisfied.

Examples of the start condition of the summarization process according to the present embodiment include the following examples.

A conditions related to a non-speaking period in which a non-speech state is continued. A condition related to a state of the voice recognition for acquiring the content of the speech from the voice information.

A conditions related to the content of the speech

A conditions related to an elapsed time since the voice information is obtained

FIGS. 9A, 9B, 9C, 9D, 9E, and 9F are explanatory diagrams for describing an example of the summarization process according to the first information processing method, and illustrates an overview of a start timing of the summarization process. An example of a process in each start condition will be described below with reference to FIGS. 9A 9B, 9C, 9D, 9E, and 9F.

(1-1) First Example of Start Condition: Example in a Case in which Start Condition is Condition Related to Non-Speaking Period The condition related to the non-speaking period is, for example, a condition related to a length of the non-speaking period. In a case in which the predetermined start condition is a condition related to the non-speaking period, the information processing apparatus according to the present embodiment determines that the start condition is satisfied in a case in which the non-speaking period exceeds a set predetermined period or in a case in which the non-speaking period it is equal to or longer than a set predetermined period.

Here, the period according to the first example of the start condition may be a preset fixed period or may be a variable period that can be changed on the basis of the manipulation of the user or the like.

Figure 9A:
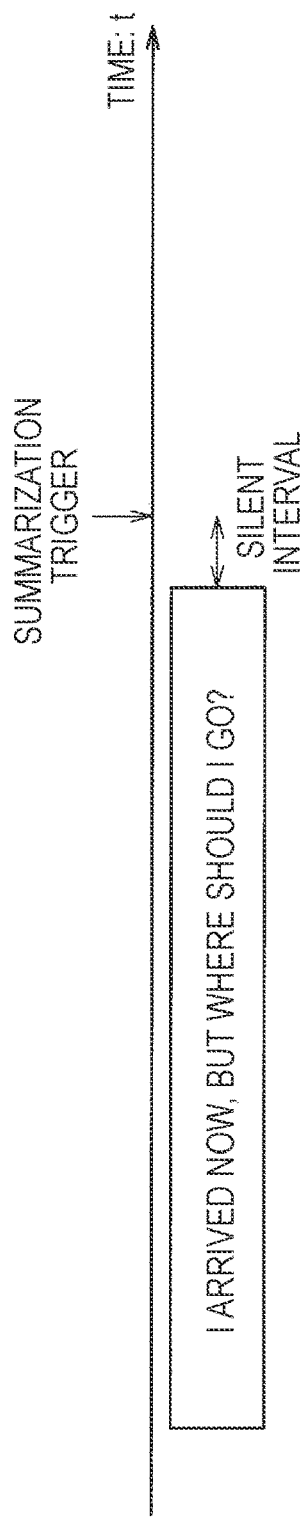
FIGS. 9A and 9B are explanatory diagrams for describing an example of a summarization process according to a first information processing method.

Referring to FIG. 9A, a "silent interval" illustrated of FIG. 9A corresponds to the non-speaking period.

The information processing apparatus according to the present embodiment, for example, detects a voice interval in which there is a voice on the basis of the voice information. Then, in a case in which the silent interval is detected during a set time or more after the voice section is detected or in a case in which the silent interval of a set time or more is detected, the information processing apparatus according to the present embodiment regards it as a start trigger of the summarization process (hereinafter referred to as a "summarization trigger") and starts the summarization process.

(1-2) Second Example of Start Condition: Example in a Case in which Start Condition is First Condition Related to a State of Voice Recognition A first condition related to the state of the voice recognition may be a condition related to detection of a voice recognition stop request. In a case in which a predetermined start condition is the first condition related to the state of the voice recognition, the information processing apparatus according to the present embodiment determines that the start condition is satisfied on the basis of the detection of the voice recognition stop request. The information processing apparatus according to the present embodiment determines that the start condition is satisfied, for example, in a case in which the voice recognition stop request is detected.

Figure 9B:
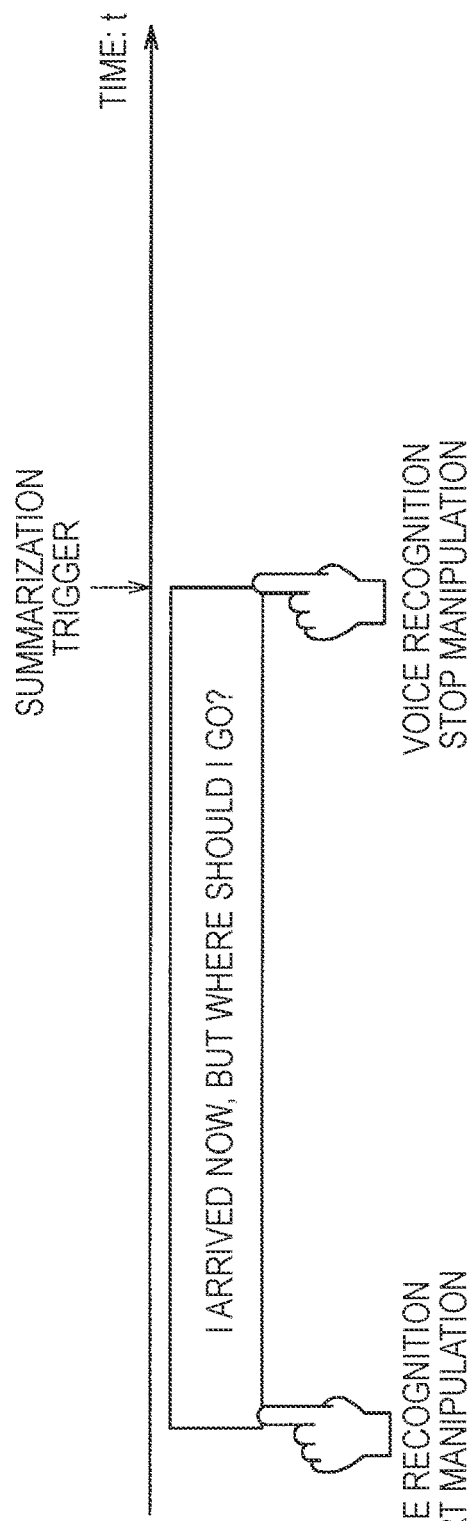

Referring to FIG. 9B, for example, in a case in which the voice recognition stop request including a voice recognition stop command based on a "manipulation of stopping the voice recognition" illustrated in FIG. 9B after the voice recognition is started on the basis of a "voice recognition start manipulation" illustrated in FIG. 9B, the information processing apparatus according to the present embodiment regards it as the summarization trigger and starts the summarization process. Here, the voice recognition start manipulation and the voice recognition stop manipulation may be, for example, a manipulation on an arbitrary user interface (UI) related to the voice recognition.

Further, the voice recognition stop request according to the present embodiment is not limited to one obtained on the basis of the voice recognition stop manipulation. For example, the voice recognition stop request may be generated by an apparatus or the like performing the voice recognition process, for example, in a case in which an error occurs during the voice recognition process, in a case in which an interrupt process is performed during the voice recognition process, or the like.

(1-3) Third Example of Start Condition: Example in a Case in which Start Condition is Second Condition Related to State of Voice Recognition A second condition related to the state of the voice recognition is a condition related to completion of the voice recognition. In a case in which a predetermined start condition is the second condition related to the state of the voice recognition, the information processing apparatus according to the present embodiment determines that the start condition is satisfied on the basis of detection of the completion of the voice recognition. The information processing apparatus according to the present embodiment determines that the start condition is satisfied, for example, in a case in which the completion of the voice recognition is detected.

Figure 9C:
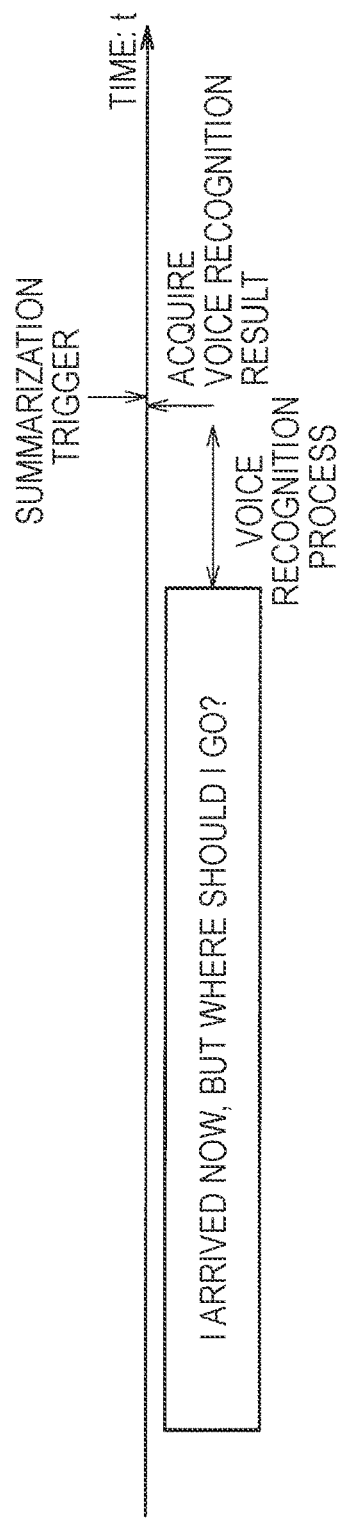
FIGS. 9C and 9D are explanatory diagrams for describing an example of a summarization process according to a first information processing method.

Referring to FIG. 9C, for example, in a case in which a result of the voice recognition process is obtained as indicated by "voice recognition result acquisition" in FIG. 9C, the information processing apparatus according to the present embodiment regards it as the summarization trigger and starts the summarization process.

(1-4) Fourth Example of Start Condition: Example in a Case in which Start Condition is First Condition Related to Content of Speech A first condition related to the content of the speech may be a condition related to detection of a predetermined word from the content of the speech indicated by the voice information. In a case in which a predetermined start condition is the first condition related to the content of the speech, the information processing apparatus according to the present embodiment determines that the starts condition is satisfied on the basis of detection of a predetermined word from the content of the speech indicated by the voice information. The information processing apparatus according to the present embodiment determines that the start condition is satisfied, for example, in a case in which a predetermined word is detected from the content of the speech indicated by the voice information.

The predetermined word related to the first condition related to the content of the speech may be, for example, a word called a filler word. The predetermined word related to the first condition related to the content of the speech may be a preset fixed word which is unable to be added, deleted, changed, or the like or may be added, deleted, or changed on the basis of a manipulation of the user.

Figure 9D:
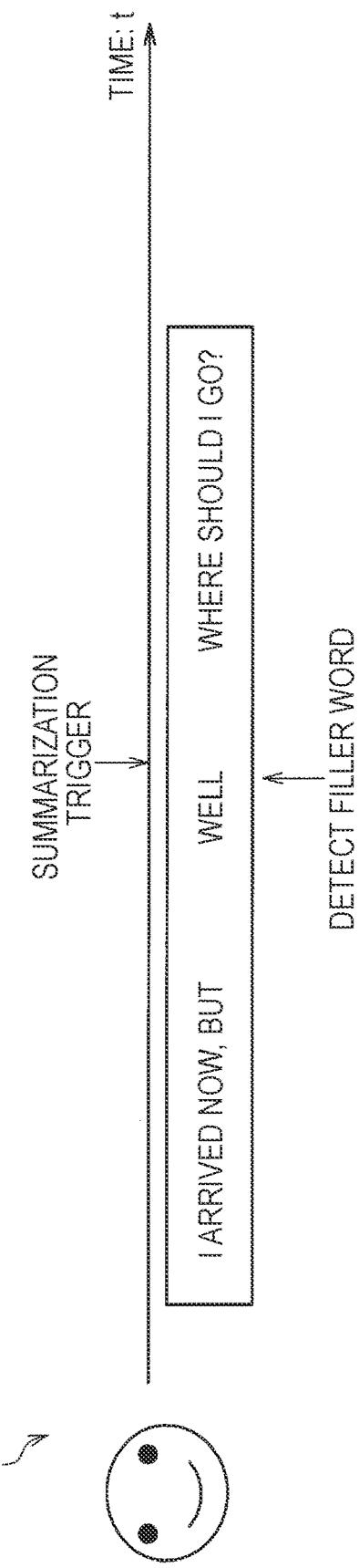

Referring to FIG. 9D, "well" illustrated in FIG. 9D corresponds to an example of the filler word (an example of a predetermined word).

The information processing apparatus according to the present embodiment starts the summarization process using, for example, a case in which the filler word is detected from the character string indicated by the voice text information obtained on the basis of the voice information as the summarization trigger.

(1-5) Fifth Example of Start Condition: Example in a Case in which Start Condition is Second Condition Related to Content of Speech A second condition related to the content of the speech is a condition related to detection of hesitation to speak from the content of the speech indicated by the voice information. In a case in which the predetermined start condition is a second condition related to the content of the speech, the information processing apparatus according to the present embodiment determines that the start condition is satisfied on the basis of the detection of the hesitation to speak on the basis of the voice information. The information processing apparatus according to the present embodiment determines that the start condition is satisfied, for example, in a case in which the hesitation to speak is detected on the basis of the voice information.

The information processing apparatus according to the present embodiment detects the hesitation to speak on the basis of the voice information according to an arbitrary method capable of detecting the hesitation to speak on the basis of the voice information or estimating the hesitation to speak on the basis of the voice information such as, for example, a "method of detecting a voiced pause (including delay of a syllable as well) from the voice information" or a "method of detecting a word associated with the hesitation to speak from a character string indicated by the voice text information obtained on the basis of the voice information."

Referring to FIG. 9E, the information processing apparatus according to the present embodiment starts the summarization process using, for example, a case in which it is estimated that there is hesitation to speak as the summarization trigger.

(1-6) Sixth Example of Start Condition: Example in a Case in which Start Condition is Condition Related to Elapsed Time after Voice Information is Obtained A condition related to the elapsed time since the voice information is obtained may be a condition on the length of the elapsed time. In a case in which the predetermined start condition is a condition related to the elapsed time since the voice information is obtained, the information processing apparatus according to the present embodiment determines that the start condition is satisfied in a case in which the elapsed time exceeds a set predetermined period or in a case in which the elapsed time is a set predetermined period or more.

Here, the period according to the sixth example of the start condition may be a preset fixed period or may be a variable period that can be changed on the basis of the manipulation of the user or the like.

Referring to of FIG. 9F, the information processing apparatus according to the present embodiment starts the summarization process using, for example, a case in which a set certain time elapses since the acquisition of the voice information is detected as the summarization trigger.

(1-7) Seventh Example of Start Condition

The start condition may be a condition in which two or more of the start conditions according to the first to sixth examples described in (1-1) to (1-6) are combined. The information processing apparatus according to the present embodiment starts the summarization process using, for example, a case in which any one of the combined start conditions is satisfied as the summarization trigger.

(2) Second Example of Summarization Process: Exception Process in which Summarization Process is not Performed The information processing apparatus according to the present embodiment does not perform the summarization process in a case in which a set summarization process exclusion condition (hereinafter referred to as "summarization exclusion condition") is determined to be satisfied.

The summarization exclusion condition according to the present embodiment may be, for example, a condition related to detection of a gesture. The information processing apparatus according to the present embodiment determines that the summarization exclusion condition is satisfied in a case in which a set predetermined gesture is detected.

The predetermined gesture related to the summarization exclusion condition may be a preset fixed gesture or may be added, deleted or changed on the basis of the manipulation of the user or the like. The information processing apparatus according to the present embodiment determines whether or not the predetermined gesture related to the summarization exclusion condition is performed, for example, by performing image processing on a captured image obtained according to imaging by an imaging device, estimating a motion on the basis of a detection result of a motion sensor such as an acceleration sensor or an angular velocity sensor, or the like.

Further, the summarization exclusion condition according to the present embodiment is not limited to the conditions related to the detection of the gesture described above.

For example, the summarization exclusion condition according to the present embodiment may be an arbitrary condition set as the summarization exclusion condition such as "detection of a manipulation of disabling a function of performing the summarization process" such as "pressing of a button for disabling the function of performing the summarization process," a "state in which the processing load of the information processing apparatus according to the present embodiment is larger than a set threshold value."

(3) Third Example of Summarization Process: Process of Dynamically Changing Summarization Level The information processing apparatus according to the present embodiment changes a summarization level of the content of the speech (or a summarization degree of the content of the speech; The same applies hereinafter) on the basis of either or both of the speaking period specified on the basis of the voice information and the number of characters specified on the basis of the voice information. In other words, the information processing apparatus according to the present embodiment changes the summarization level of the content of the speech on the basis of at least one of the speaking period specified on the basis of the voice information and the number of characters specified on the basis of the voice information.

The information processing apparatus according to the present embodiment changes the summarization level of the content of the speech, for example, by limiting the number of characters indicated by the summarized content of the speech. The information processing apparatus according to the present embodiment limits the number of characters indicated by the summarized content of the speech by causing the number of characters indicated by the summarized content of the speech not to exceed a set upper limit value. Since the number of characters indicated by the summarized content of the speech is limited, it is possible to automatically reduce the number of characters indicated by the summarized content of the speech, that is, a summarization amount.

Here, the speaking period is specified, for example, by detecting the voice interval in which there is a voice on the basis of the voice information. Further, the number of characters corresponding to the speech is specified by counting the number of characters of the character string indicated by the voice text information based on the voice information.

In a case in which the summarization level of the content of the speech is changed on the basis of the speaking period, the information processing apparatus according to the present embodiment changes the summarization level of the content of the speech, for example, in a case in which the speaking period exceeds a set predetermined period or in a case in which the speaking period is a set predetermined period or more. Here, the period in the case in which the summarization level of the content of the speech is changed on the basis of the speaking period may be a preset fixed period or may be a variable period that can be changed on the basis of the manipulation of the user or the like.

Further, in a case in which the summarization level of the content of the speech is changed on the basis of the number of characters specified on the basis of the voice information, the information processing apparatus according to the present embodiment changes the summarization level of the content of the speech, for example, in a case in which the number of characters is larger than a set threshold value or in a case in which the number of characters is a set threshold value or more. Here, the threshold value in the case in which the summarization level of the content of the speech is changed on the basis of the number of characters specified on the basis of the voice information may be a preset fixed threshold value or may be a variable threshold value that can be changed on the basis of the manipulation of the user or the like.

[3-2] Translation Process According to Present Embodiment

As described in (c), the information processing apparatus according to the present embodiment can further perform the translation process of translating the content of the speech summarized according to the summarization process according to the first information processing method into another language. As described above, the information processing apparatus according to the present embodiment translates the first language corresponding to the speech into the second language different from the first language.

Further, in the translation process, a degree of reliability of the translation result may be set for each translation unit.

The translation unit is a unit in which translation is performed in the translation process. The translation unit may be, for example, a fixed unit set for each word, every one or two or more clauses, or the like. Further, for example, the translation unit may be dynamically set in accordance with the language (first language) corresponding to the speech. Further, the translation unit may be changeable on the basis of, for example, a setting manipulation of the user.

The degree of reliability of the translation result is, for example, an index indicating certainty of the translation result and indicated by, for example, a value of 0 [%] (indicating that the degree of reliability is lowest) to 100 [%] (the degree of reliability is highest). The degree of reliability of the translation result can be obtained using a result of arbitrary machine learning such as a result of machine learning using a result of feedback with respect to the translation result. Further, the degree of reliability of the translation result is not limited to one obtained using the machine learning and may be obtained according to an arbitrary method capable of obtaining the certainty of the translation result.

Further, the information processing apparatus according to the present embodiment can perform either or both of the following processes (i) and (ii) as the translation process.

(i) First Example of Translation Process: Exception Process in which Translation Process is not Performed In a case in which a set translation process exclusion condition is determined to be satisfied, the information processing apparatus according to the present embodiment does not perform the translation process.

The exclusion condition of the translation process according to the present embodiment may be, for example, a condition related to detection of a gesture. The information processing apparatus according to the present embodiment determines that the translation process is satisfied in a case in which a set predetermined gesture is detected.

The predetermined gesture related to the translation process may be a fixed gesture set in advance or may be added, deleted or changed on the basis of the manipulation of the user or the like. The fixed gesture set in advance may be, for example, a body gesture, a hand gesture, or the like related to non-verbal communication such as a hand sign. The information processing apparatus according to the present embodiment determines whether or not the predetermined gesture related to the translation process is performed, for example, by performing image processing on a captured image obtained according to imaging by an imaging device or estimating a motion on the basis of a detection result of a motion sensor such as an acceleration sensor or an angular velocity sensor.

Further, the translation process exclusion condition according to the present embodiment is not limited to the condition related to the detection of the gesture described above.

For example, the translation process exclusion condition according to the present embodiment may be an arbitrary condition set as the translation process exclusion condition such as "detection of a manipulation of disabling a function of performing the translation process" such as "pressing of a button for disabling the function of performing the translation process," a "state in which the processing load of the information processing apparatus according to the present embodiment is larger than a set threshold value." Further, the translation process exclusion condition according to the present embodiment may be the same condition as or a different condition from the summarization exclusion condition according to the present embodiment described above.

(ii) Second Example of Translation Process: Processing in Retranslation

The information processing apparatus according to the present embodiment can also retranslate the content translated into another language into the language before the translation.

In the information processing apparatus according to the present embodiment retranslates the content translated into another language into the language before the translation, for example, in a case in which a manipulation of performing a retranslation process such as pressing of a button for performing a retranslation is detected.

Further, the retranslation trigger is not limited to the detection of the manipulation of performing the retranslation process. For example, the information processing apparatus according to the present embodiment can automatically perform the retranslation on the basis of the degree of reliability of the translation result set for each translation unit. The information processing apparatus according to the present embodiment performs the retranslation using, for example, a case in which there is a degree of reliability equal to or less than a set threshold value or there is a degree of reliability smaller than the threshold value among the degrees of reliability of the translation result set for each translation unit as the retranslation trigger.

Further, in a case in which the content translated into another language is retranslated into the language before the translation, the information processing apparatus according to the present embodiment may perform the summarization process using a retranslation result.

As an example, the information processing apparatus according to the present embodiment includes a word included in content after the retranslation in the summarized content of the speech, for example, in a case in which there is a word included in the content after the retranslation in the content of the speech indicated by the voice information acquired after the retranslation. Since the summarization process using the retranslation result is performed, for example, an "adjustment of causing the same word as before the retranslation not to be deleted in a summary corresponding to a current speech in a case in which the same word as before the retranslation appears in content spoken by the user" is implemented.

[3-3] Notification Control Process According to Second Information Processing Method The information processing apparatus according to the present embodiment causes a notification of the content of the speech indicated by the voice information summarized according to the summarization process according to the first information processing method to be given.

In a case in which the summarized content of the speech is translated into another language according to the translation process according to the present embodiment as described above, the information processing apparatus according to the present embodiment causes a notification of the translation result to be given.

Further, as described above, the information processing apparatus according to the present embodiment causes a notification of the notification content to be given, for example, according to either or both the notification based on the visual method and the notification based on the auditory method.

Figure 10:
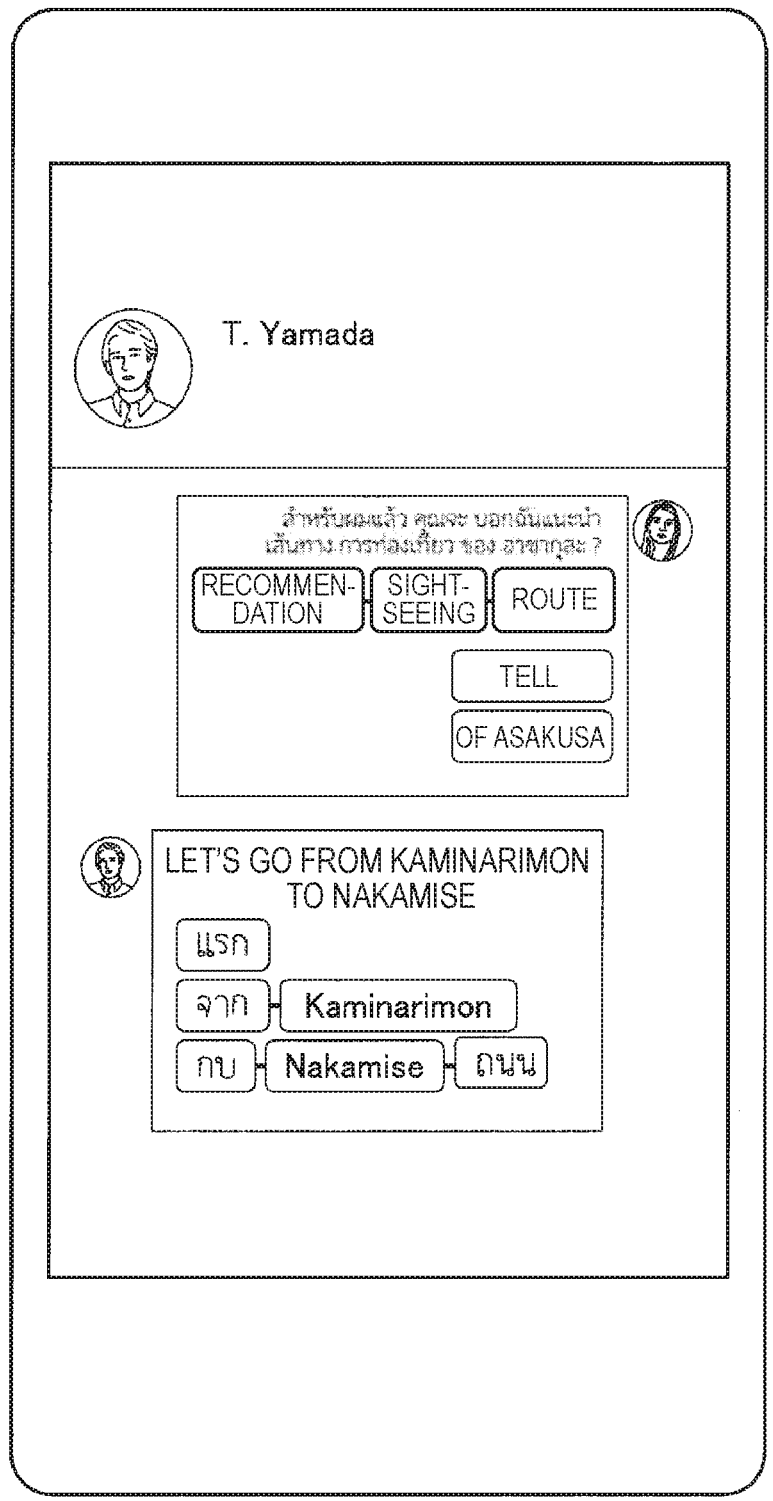
FIG. 10 is an explanatory diagram illustrating an example of a notification by a visual method implemented by a notification control process according to a second information processing method.

FIG. 10 is an explanatory diagram illustrating an example of notification by a visual method implemented by a notification control process according to the second information processing method. FIG. 10 illustrates an example in which the information processing apparatus according to the present embodiment causes the translation result to be displayed on the display screen of the smartphone.

Further, the information processing apparatus according to the present embodiment can perform one or more of the following processes (I) to (VII) as the notification control process. A case in which the information processing apparatus according to the present embodiment causes a notification of the translation result to be given will be described as an example. Further, the information processing apparatus according to the present embodiment can cause a notification of the summarized content of the speech before the translation to be given, similarly to the case of causing a notification of the translation result to be given.

FIGS. 11, 12, 13, 14, 15, 16A, 16B, 16C, 16D, 16E, 16F, 17, 18, 19A, 19B, 20A, 20B, 21A, 21B and 21C are explanatory diagrams for describing an example of the notification control process according to the second information processing method. An example of the notification control process according to the second information processing method will be described below with reference to FIGS. 11, 12, 13, 14, 15, 16A, 16B, 16C, 16D, 16E, 16F, 17, 18, 19A, 19B, 20A, 20B, 21A, 21B and 21C as appropriate.

(I) First Example of Notification Control Process: Word Order Notice of Translation Language The information processing apparatus according to the present embodiment causes a notification of the translation result to be given in a word order corresponding to another language which is translated.

For example, in the summarization process, when the content of the speech is summarized into the divisional text illustrated in FIG. 3C, in a case in which another language is English, the information processing apparatus according to the present embodiment causes a notification of the translation result to be given in the following order:
noun
verb
adjective
adverb
others Further, for example, in the summarization process, when the content of the speech is summarized into the divisional text illustrated in FIG. 3C, in a case in which another language is Japanese, the information processing apparatus according to the present embodiment causes a notification of the translation result to be given in the following order:
verb
noun
adjective
adverb
others Since a notification of the translation result is caused to be given in the word order corresponding to another language which is translated as described above, for example, it is possible to change the word order of the translation result illustrated in FIG. 4B and the word order the auditory notification as illustrated in FIG. 5.

Here, the word order corresponding to another language which is translated may be a preset fixed word order or may be changeable on the basis of the manipulation of the user or the like.

(II) Second Example of Notification Control Process: Notification Control Process Based on a Degree of Reliability of Each Translation Unit As described above, in the translation process, the degree of reliability of the translation result can be set for each translation unit. In the translation process, in a case in which the degree of reliability of the translation result is set for each translation unit, the information processing apparatus according to the present embodiment causes a notification of the translation result to be given on the basis of the degree of reliability of each translation unit in the summarized content of the speech.

The information processing apparatus according to the present embodiment causes a notification of the translation result to be given on the basis of the degree of reliability of each translation unit by performing, for example, either or both of the following processes (II-1) and (II-2).

(II-1) First Example of Notification Control Process Based on Basis of Degree of Reliability of Each Translation Unit The information processing apparatus according to the present embodiment causes a notification of a translation result with a high degree of reliability to be given with priority.

For example, in a case in which a visual notification is given by causing the translation result to be displayed on the display screen of the display device, the information processing apparatus according to the present embodiment implements a preferential notification of the translation result with the high degree of reliability depending on a display method. Further, in a case in which an auditory notification of the translation result is given through a voice from the voice output device, the information processing apparatus according to the present embodiment may implement the preferential notification of the translation result with the high degree of reliability in accordance with, for example, a notification order.

An example of the notification implemented by the notification control process based on the degree of reliability of each translation unit according to a first example will be described below using a case in which a visual notification is given by causing the translation result to be displayed on the display screen of the display device as an example.

Figure 11:
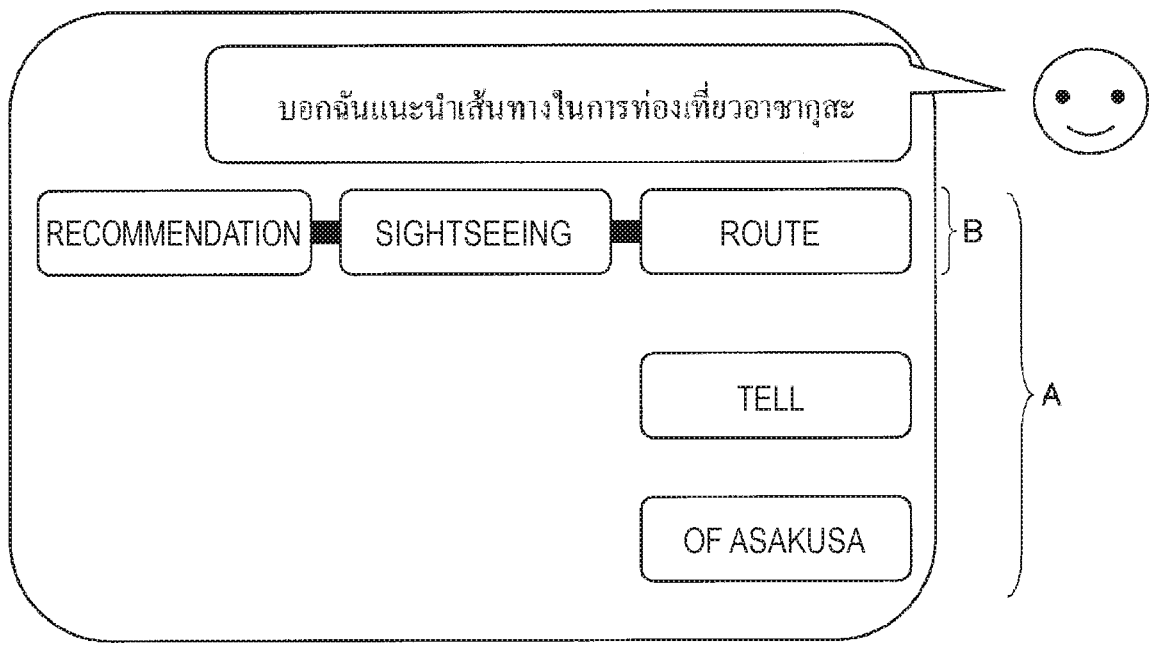
FIG. 11 is an explanatory diagram for describing an example of a notification control process according to the second information processing method.

FIG. 11 illustrates a first example of causing the translation result to be displayed on the display screen of the display device, and illustrates an example of a case in which a notification of the translation result with a high degree of reliability is given with priority. In the example illustrated in FIG. 11, each of "recommendation," "sightseeing," "route," "tell," and "Asakusa" corresponds to the translation results of each translation unit. Further, FIG. 11 illustrates an example in which the degree of reliability to be set decreases in the order of "recommendation," "sightseeing," "route," "tell," and "Asakusa."

The information processing apparatus according to the present embodiment causes the translation result of each translation unit to be displayed so that the translation result of each translation unit is hierarchically displayed in the descending order of the degrees of reliability, for example, as illustrated in A of FIG. 11.

Here, the hierarchical display is implemented by, for example, a threshold value process using the degree of reliability of each translation unit and one or more threshold values related to decision of a layer on which display is performed. Here, the threshold value related to the hierarchical display may be a preset fixed value or may be a variable value that can be changed on the basis of the manipulation of the user or the like.

In a case in which the translation results of every two or more translation units is displayed on the same layer as a result of the threshold value process, the information processing apparatus according to the present embodiment causes the translation results of every two or more translation units to be displayed in a set predetermined order, for example, "in which the translation results are arranged in the descending order of the degrees of reliability from the left to the right in a region of the display screen corresponding to the layer."

Further, in a case in which there are a plurality of translation results in which the degree of reliability is larger than a predetermined threshold value or a plurality of translation results in which the degree of reliability is equal to or larger than a predetermined threshold value as a result of the threshold value process, the information processing apparatus according to the present embodiment may cause a plurality of existing translation results to be displayed together in a predetermined region of the display screen, for example, as illustrated in B of FIG. 11. Here, as the predetermined threshold value, one or more threshold values among one or more threshold values used for the threshold value process may be used. Further, the predetermined region may be, for example, a "region of the display screen corresponding to a layer associated with a threshold value process using a predetermined threshold value."

For example, as the display is performed as illustrated in FIG. 11, it is implemented that "the translation result of each translation unit in which a high degree of reliability (corresponding to a score) is set in the translation process is displayed on a high level, and in a case in which the degree of reliability exceeds a predetermined threshold value, the translation results of each translation unit are displayed together." Further, needless to say, the example of the display in a case in which a notification of the translation result with the high degree of reliability is given with priority is not limited to the example illustrated in FIG. 11.

(II-2) Second Example of Notification Control Process Based on Degree of Reliability of Each Translation Unit The information processing apparatus according to the present embodiment causes a notification of the translation result to be given so that emphasis is performed in accordance with the degree of reliability.

For example, in a case in which the visual notification is given by causing the translation result to be displayed on the display screen of the display device, the information processing apparatus according to the present embodiment implements a notification emphasized in accordance with the degree of reliability depending on the display method. Further, in a case in which the auditory notification is given through a voice from the voice output device, the information processing apparatus according to the present embodiment may implement a notification emphasized in accordance with the degree of reliability, for example, by changing the sound pressure, the volume, or the like of the voice on the basis of the degree of reliability.

An example of the notification implemented by the notification control process based on the degree of reliability of each translation unit according to a second example will be described below using a case in which a visual notification is given by causing the translation result to be displayed on the display screen of the display device as an example.

The information processing apparatus according to the present embodiment causes the translation result to be emphatically displayed in accordance with the degree of reliability by, for example, "causing each translation result of each translation unit to be displayed with a size corresponding to the degree of reliability."

Figure 12:
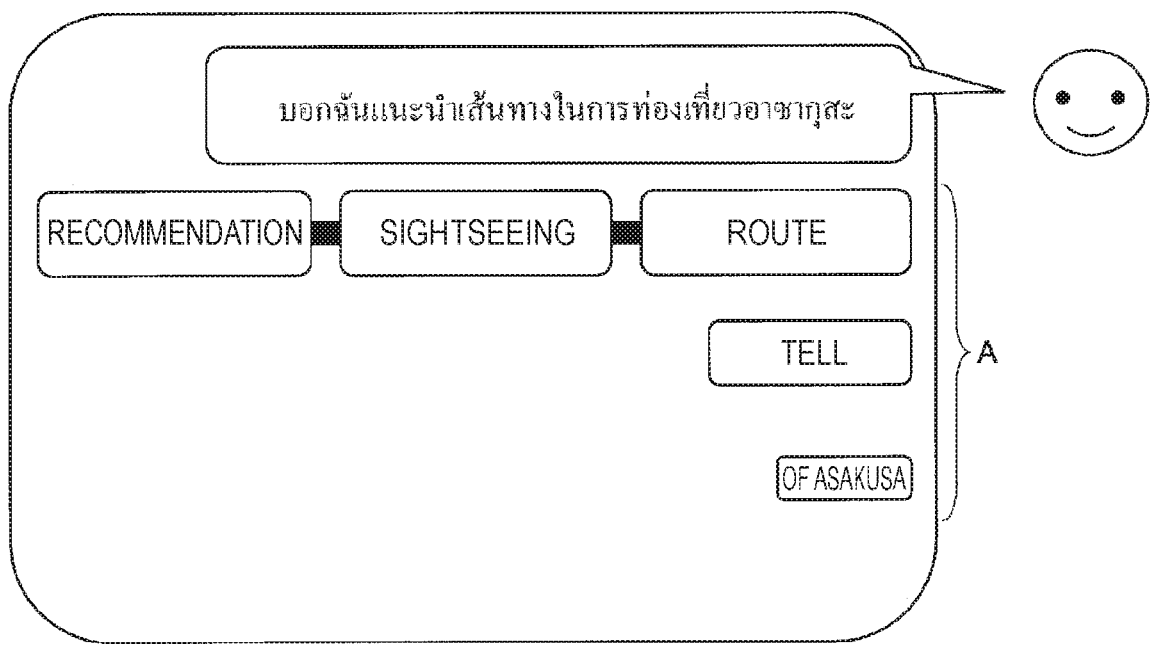
FIG. 12 is an explanatory diagram for describing an example of a notification control process according to the second information processing method.

FIG. 12 illustrates a second example in which the translation result is displayed on the display screen of the display device, and illustrates a first example in which the translation result is emphatically displayed in accordance with the degree of reliability. In the example illustrated in FIG. 12, each of "recommendation," "sightseeing," "route," "tell," and "Asakusa" corresponds to the translation results of each translation unit. Further, FIG. 12 illustrates an example in which the degree of reliability to be set decreases in the order of "recommendation," "sightseeing," "route," "tell," and "Asakusa."

Further, FIG. 12 illustrates an example in which the information processing apparatus according to the present embodiment further causes each translation result of each translation unit to be displayed with the size corresponding to the degree of reliability in addition to the notification control process based on the degree of reliability of each translation unit according to the first example. Further, needless to say, "in a case in which the notification control process based on the degree of reliability of each translation unit according to the second example is performed, the information processing apparatus according to the present embodiment may cause a notification of the translation result with the high degree of reliability not to be given with priority unlike the hierarchical display as illustrated in FIG. 11."

In the information processing apparatus according to the present embodiment causes each translation result of each translation unit to be displayed with the size corresponding to the degree of reliability, for example, as illustrated in A of FIG. 12. The information processing apparatus according to the present embodiment causes each translation result of each translation unit to be displayed with the size corresponding to the degree of reliability with reference to, for example, a "table (or a database) in which the degree of reliability is associated with the display size for causing the translation result of each translation unit to be displayed on the display screen."

For example, as the display is performed as illustrated in FIG. 12, it is implemented that "the translation result of each translation unit in which a high degree of reliability (corresponding to a score) is set in the translation process is displayed on a high level, and the size is changed so that the translation result of each translation unit displayed on the higher level is noticeable." Further, needless to say, the example of the display in a case in which each translation result of each translation unit is caused to be displayed with the size corresponding to the degree of reliability is not limited to the example illustrated in FIG. 12.

Further, for example, the information processing apparatus according to the present embodiment may cause the translation result to be emphatically displayed in accordance with the degree of reliability by, for example, "causing each translation result of each translation unit to be displayed such that the translation result with the high degree of reliability is displayed on a front side in the display screen."

Figure 13:
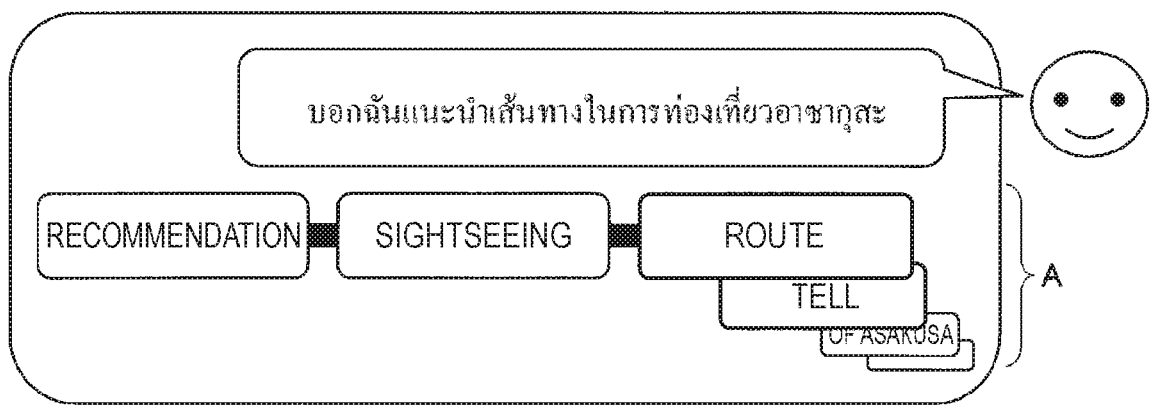
FIG. 13 is an explanatory diagram for describing an example of a notification control process according to the second information processing method.

FIG. 13 illustrates a third example in which the translation result is displayed on the display screen of the display device, and illustrates a second example in which the translation result is emphatically displayed in accordance with the degree of reliability. In the example illustrated in FIG. 13, each of "recommendation," "sightseeing," "route," "tell," and "Asakusa," . . . corresponds to the translation results of each translation unit. Further, FIG. 13 illustrates an example in which the degree of reliability to be set decreases in the order of "recommendation," "sightseeing," "route," "tell," and "Asakusa," . . . .

Further, FIG. 13 illustrates an example in which the information processing apparatus according to the present embodiment further causes the translation result with the high degree of reliability to be displayed on a front side in the display screen in addition to the notification control process based on the degree of reliability of each translation unit according to the first example. Further, as described above, needless to say, "in a case in which the notification control process based on the degree of reliability of each translation unit according to the second example is performed, the information processing apparatus according to the present embodiment may cause a notification of the translation result with the high degree of reliability not to be given with priority unlike the hierarchical display as illustrated in FIG. 11."

In the information processing apparatus according to the present embodiment causes the translation result with the high degree of reliability to be displayed on a front side in the display screen, for example, as illustrated in A of FIG. 13. The information processing apparatus according to the present embodiment causes each translation result of each translation unit to be displayed such that the translation result with the high degree of reliability is displayed on a front side in the display screen with reference to, for example, a "table (or a database) in which the degree of reliability is associated with a coordinate value in a depth direction when the translation result of each translation unit is caused to be displayed on the display screen."

For example, as the display is performed as illustrated in FIG. 13, it is implemented "that the translation result of each translation unit in which a high degree of reliability (corresponding to a score) is set in the translation process is displayed on a front side in the depth direction in the display screen, and thus the translation result of each translation unit in which the high degree of reliability is set is caused to be noticeable." Further, needless to say, the example of the display in a case in which each translation result of each translation unit is caused to be displayed such that the translation result with the high degree of reliability is displayed on a front side in the display screen is not limited to the example illustrated in FIG. 13.

Further, the information processing apparatus according to the present embodiment may cause the translation result to be emphatically displayed in accordance with the degree of reliability by, for example, "causing each translation result of each translation unit to be displayed in either or both of a color corresponding to the degree of reliability and transparency corresponding to the degree of reliability."

Figure 14:
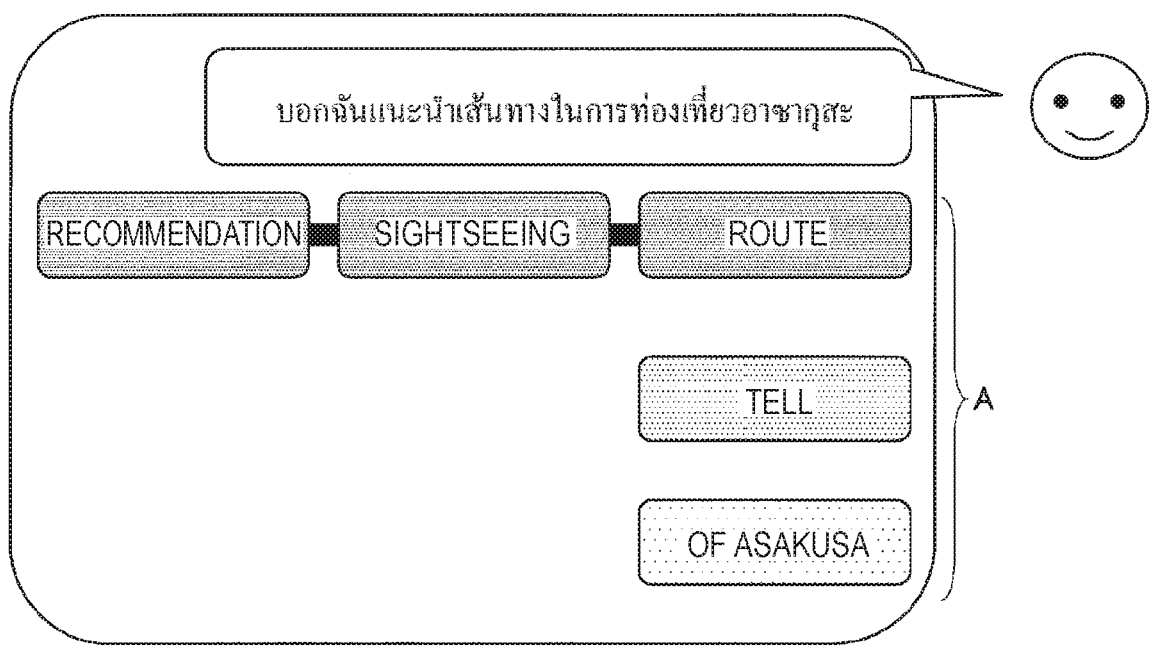
FIG. 14 is an explanatory diagram for describing an example of a notification control process according to the second information processing method.

FIG. 14 illustrates a fourth example in which the translation result is displayed on the display screen of the display device, and illustrates a third example in which the translation result is emphatically displayed in accordance with the degree of reliability. In the example illustrated in FIG. 14, each of "recommendation," "sightseeing," "route," "tell," and "Asakusa" corresponds to the translation results of each translation unit. Further, FIG. 14 illustrates an example in which the degree of reliability to be set decreases in the order of "recommendation," "sightseeing," "route," "tell," and "Asakusa."

Further, FIG. 14 illustrates an example in which the information processing apparatus according to the present embodiment further causes each translation result of each translation unit to be displayed in either or both of a color corresponding to the degree of reliability and transparency corresponding to the degree of reliability in addition to the notification control process based on the degree of reliability of each translation unit according to the first example. Further, as described above, needless to say, "in a case in which the notification control process based on the degree of reliability of each translation unit according to the second example is performed, the information processing apparatus according to the present embodiment may cause a notification of the translation result with the high degree of reliability not to be given with priority unlike the hierarchical display as illustrated in FIG. 11."

The information processing apparatus according to the present embodiment causes each translation result of each translation unit to be displayed in a color corresponding to the degree of reliability, for example, as illustrated in A of FIG. 14. Further, the information processing apparatus according to the present embodiment may cause each translation result of each translation unit to be displayed with transparency corresponding to the degree of reliability. Further, the information processing apparatus according to the present embodiment can also cause each translation result of each translation unit to be displayed in both of the color corresponding to the degree of reliability and the transparency corresponding to the degree of reliability.

The information processing apparatus according to the present embodiment causes each translation result of each translation unit to be displayed in either or both of the color corresponding to the degree of reliability and the transparency corresponding to the degree of reliability with reference to, for example, a "table (or a database) in which the degree of reliability, the color for causing the translation result of each translation unit to be displayed, and the transparency for causing the translation result of each translation unit to be displayed on the display screen are associated with one another."

For example, as the display is performed as illustrated in FIG. 14, it is implemented that "the translation result of each translation unit is emphasized by either or both of the color and the transparency so that the translation result of each translation unit in which a higher degree of reliability (corresponding to a score) is set in the translation process is more noticeable." Further, needless to say, the example of the display in a case in which each translation result of each translation unit is caused to be displayed in either or both of the color corresponding to the degree of reliability and the transparency corresponding to the degree of reliability is not limited to the example illustrated in FIG. 14.

(III) Third Example of Notification Control Process: Notification Control Process Based on Voice Information In a case in which the visual notification is given by causing the notification content to be displayed on the display screen of the display device, the information processing apparatus according to the present embodiment controls a method of displaying the notification content on the basis of the voice information.

The information processing apparatus according to the present embodiment controls a method of displaying the notification content on the basis of the voice information by, for example, "causing the notification content to be displayed with a size corresponding to the sound pressure or the volume specified from the voice information." The information processing apparatus according to the present embodiment causes the notification content to be displayed with the size corresponding to the sound pressure or the volume specified from the voice information with reference to, for example, a "table (or a database) in which the sound pressure or the sound volume, a display size for causing the divisional text to be displayed, and a font size are associated with one another."

Further, in a case in which the summarized content of the speech is translated into another language according to the translation process according to the present embodiment, the information processing apparatus according to the present embodiment can control the method of displaying the translation result on the basis of the voice information, similarly to the case of controlling the method of displaying the notification content.

Figure 15:
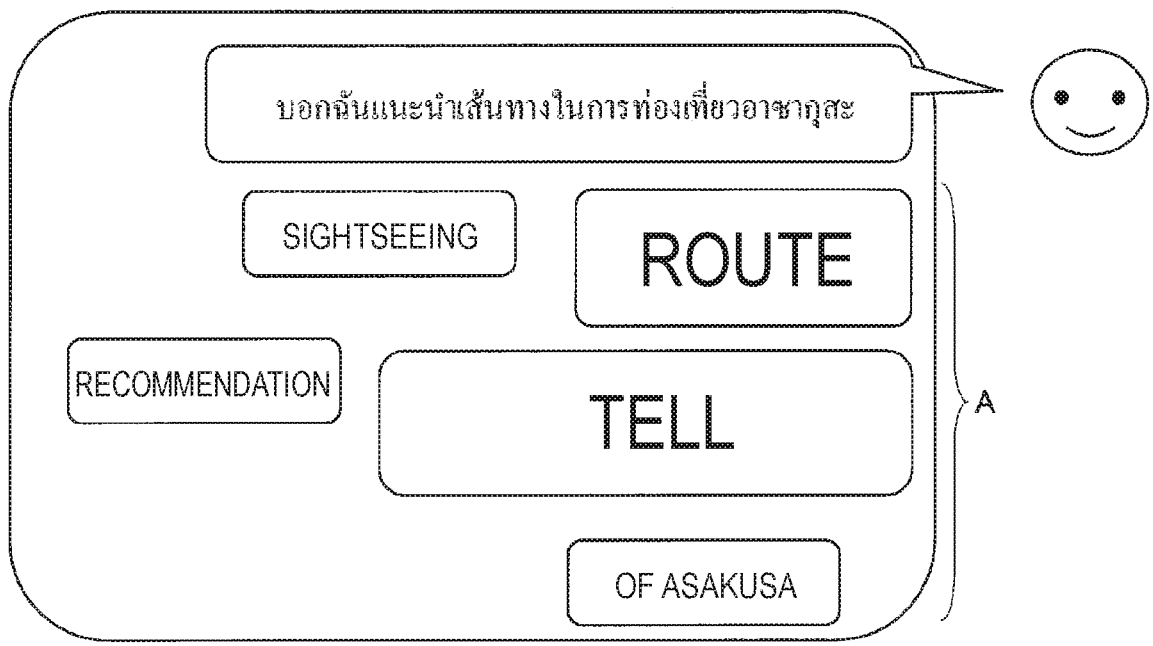
FIG. 15 is an explanatory diagram for describing an example of a notification control process according to the second information processing method.

FIG. 15 illustrates a fifth example in which the translation result is displayed on the display screen of the display device, and illustrates an example in which the translation result is emphatically displayed on the basis of the voice information. In the example illustrated in FIG. 15, each of "recommendation," "sightseeing," "route," "tell," and "Asakusa" corresponds to the translation results of each translation unit. Further, FIG. 15 illustrates an example in which the sound pressure or the sound volume decreases, for example, in the order of "tell," "route," "recommendation," "sightseeing," and "Asakusa."

The information processing apparatus according to the present embodiment causes the translation result of each translation unit (the translated summarized content of the speech) to be displayed with the size corresponding to the sound pressure or the volume specified from the voice information, for example, as illustrated in A of FIG. 15. The information processing apparatus according to the present embodiment causes the translation result to be displayed with the size corresponding to the sound pressure or the volume specified from the voice information with reference to, for example, a "table (or a database) in which the sound pressure or the sound volume, a display size for causing the translation result of each translation unit to be displayed, and a font size are associated with one another."

For example, as the display is performed as illustrated in FIG. 15, it is implemented "that the display is performed with the font size and the display size are increased so that the translation result with the higher sound pressure (or volume) is more noticeable." Further, needless to say, the example of the display in a case in which the display method is controlled on the basis of the voice information is not limited to the example illustrated in FIG. 15.

(IV) Fourth Example of Notification Control Process: Notification Control Process Based on Manipulation Performed on Display Screen In a case in which the visual notification is given by causing the notification content to be displayed on the display screen of the display device, the information processing apparatus according to the present embodiment causes content being displayed on the display screen to be changed on the basis of a manipulation performed on the display screen.

Here, as the manipulation performed on the display screen, an arbitrary manipulation which can be performed on the display screen such as a manipulation using a manipulation input device such as a button, a direction key, a mouse, or a keyboard, a manipulation on the display screen (in a case in which the display device is a touch panel) may be used.

The information processing apparatus according to the present embodiment causes the content being displayed on the display screen to be changed on the basis of the manipulation performed on the display screen, for example, by performing either or both of the following processes (IV-1) and (IV-2).

(IV-1) First Example of Notification Control Process Based on Manipulation Performed on Display Screen The information processing apparatus according to the present embodiment causes the content displayed on the display screen to be changed on the basis of the manipulation performed on the display screen. As an example of causing the content being displayed on the display screen according to the present embodiment to be changed, one or more of examples described below may be used.

Change of a display position of the notification content on the display screen (or change of a display position of the translation result on the display screen)

Deletion of some of the notification content being displayed on the display screen (or deletion of some of the translation results being displayed on the display screen)

The information processing apparatus according to the present embodiment can manually change, for example, the content to be presented to the communication partner by causing the display position of the notification content on the display screen (or the display position of the translation result on the display screen) to be changed on the basis of the manipulation performed on the display screen. Further, the information processing apparatus according to the present embodiment can manually delete, for example, the erroneous translation result or the like by causing a part of the notification content being displayed on the display screen (or a part of the translation result being displayed on the display screen) to be deleted on the basis of the manipulation performed on the display screen.

Figure 16A:
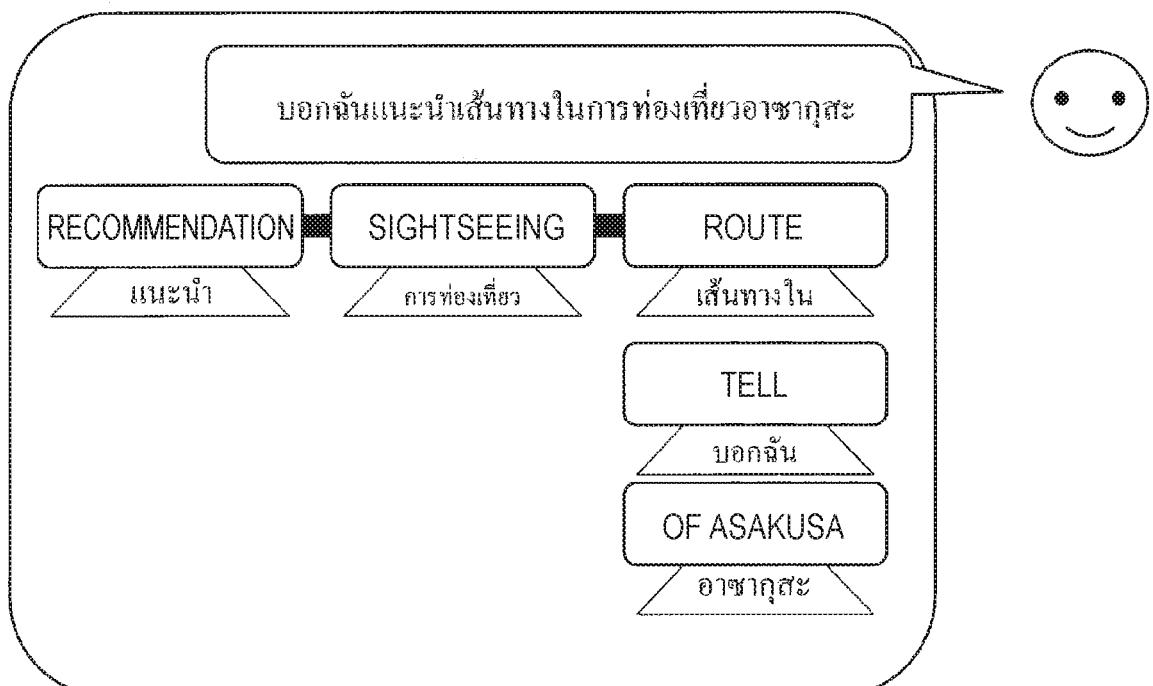
FIG. 16A is an explanatory diagram for describing an example of a notification control process according to the second information processing method.
Figure 16B:
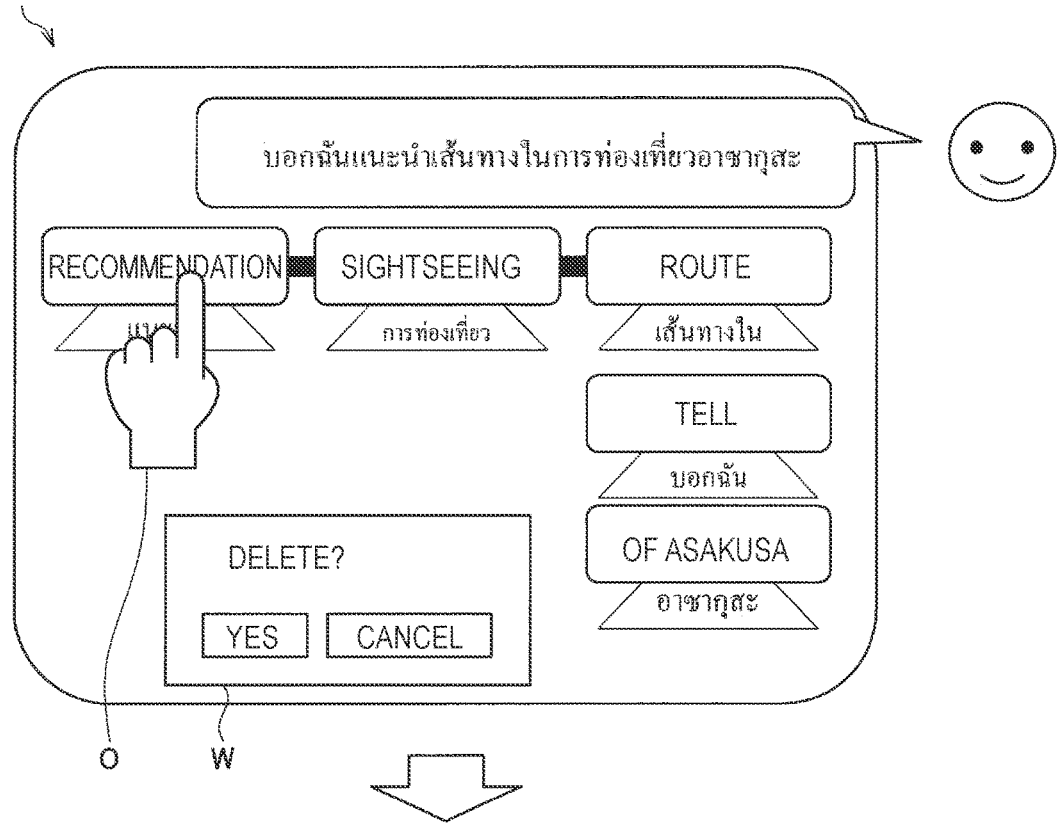
FIGS. 16B and 16C are explanatory diagrams for describing an example of a notification control process according to the second information processing method.
Figure 16C:
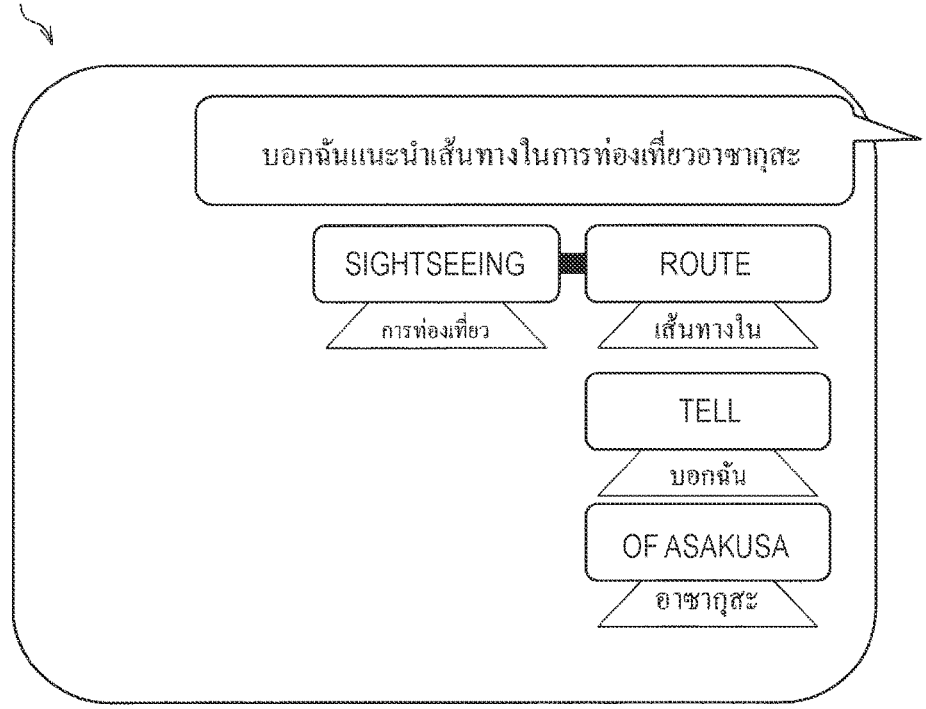
Figure 16D:
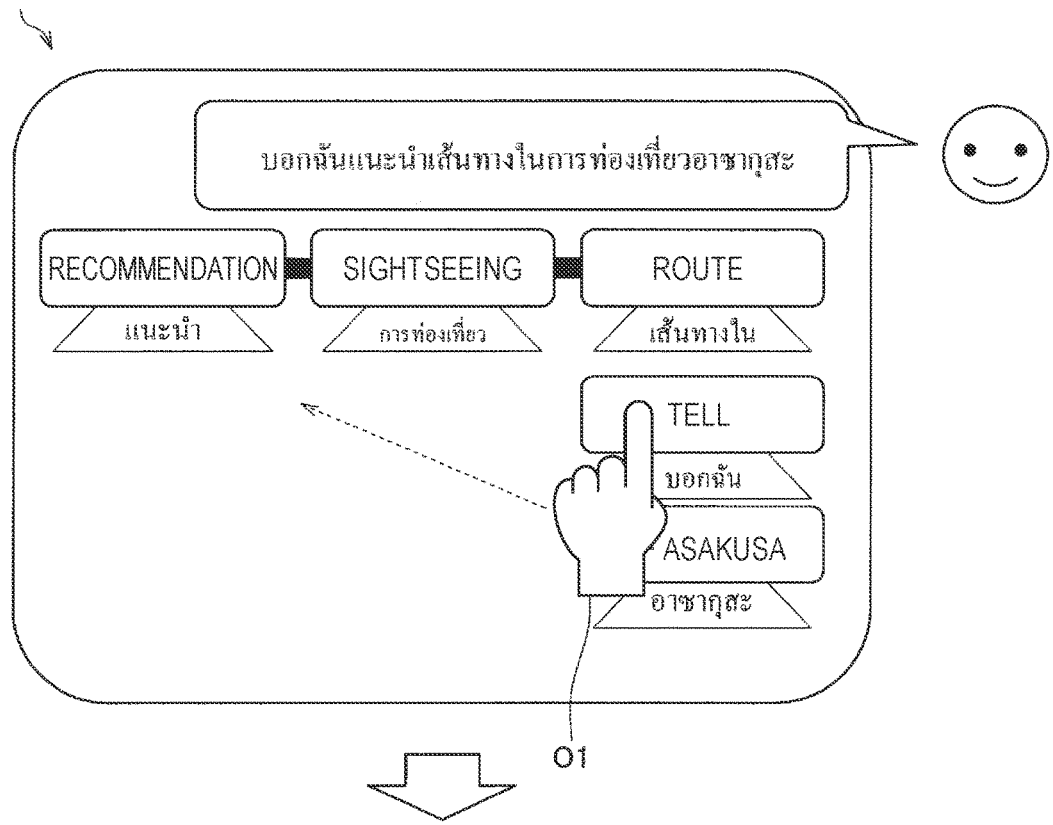
FIGS. 16D and 16E are explanatory diagrams for describing an example of a notification control process according to the second information processing method.
Figure 16E:
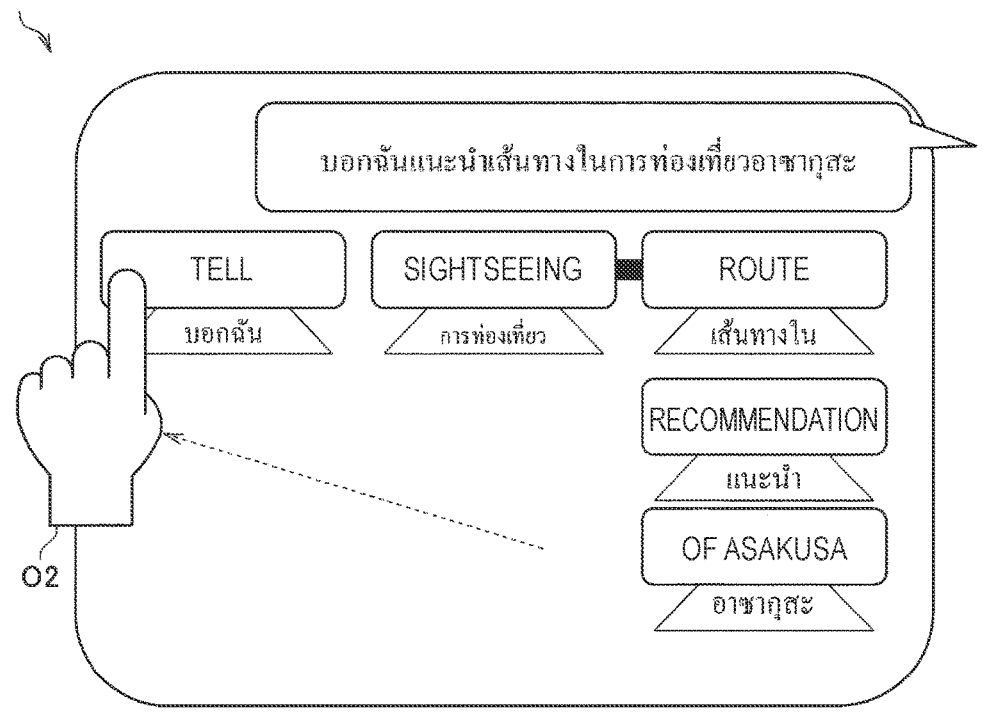

FIGS. 16A, 16B, 16C, 16D, and 16E illustrate examples of the display screen in the case of causing the content being displayed on the display screen to be changed on the basis of the manipulation performed on the display screen. Here, FIG. 16A illustrates an example of display in a case in which the translation result of each translation unit according to the translation process is retranslated. Further, FIGS. 16B and 16C illustrate an example of display in a case in which a part of the translation result of each translation unit (the translated summarized content of the speech) being displayed on the display screen are deleted. Further, FIGS. 16D and 16E illustrate an example of display in a case in which the display position of the translation result of each translation unit (the translated summarized content of the speech) being displayed on the display screen is changed.

For example, a case in which the user desires to delete "recommendation" which is a part of translation result of each translation unit being displayed on display screen will be described as an example. If the user selects "recommendation" as indicated by reference numeral O in FIG. 16B, a window W for selecting whether to delete is displayed as illustrated in FIG. 16B. Further, if the user selects "Yes" in the window W, "recommendation" which is a part of the translation result is deleted as illustrated in FIG. 16C. Further, needless to say, an example of deleting a part of the translation result of each translation unit being displayed on the display screen is not limited to the example illustrated in FIGS. 16B and 16C.

Further, for example, a case in which the user desires to change the display positions of "recommendation" and "tell" in the translation result of each translation unit being displayed on the display screen will be described as an example. For example, if the user selects "tell" as indicated by reference numeral O1 in FIG. 16D and then designates a position indicated by reference numeral O2 in FIG. 16E according to a drag manipulation, the display positions of "recommendation" and "tell" are switched as illustrated in FIG. 16E. Further, needless to say, the example of changing the display position of the translation result of each translation unit being displayed on the display screen is not limited to the example illustrated in FIGS. 16D and 16E.

(IV-2) Second Example of Notification Control Process Based on Manipulation Performed on Display Screen In a case in which the summarized content of the speech (or the translation result) is caused to be displayed on the display screen of the display device as the notification content, the summarized content of the speech (or the translation result) may be unable to be displayed on a single screen. In a case in which the summarized content of the speech (or the translation result) is unable to be displayed on a single screen as described above, the information processing apparatus according to the present embodiment causes a part of the notification content to be displayed on the display screen.

Further, in a case in which a part of the notification content is being displayed on the display screen, the information processing apparatus according to the present embodiment causes the content being displayed on the display screen to be changed on the basis of the manipulation performed on the display screen. The information processing apparatus according to the present embodiment causes the content being displayed on the display screen to be changed by, for example, causing the notification content being displayed on the display screen from the part to another part.

Figure 17:
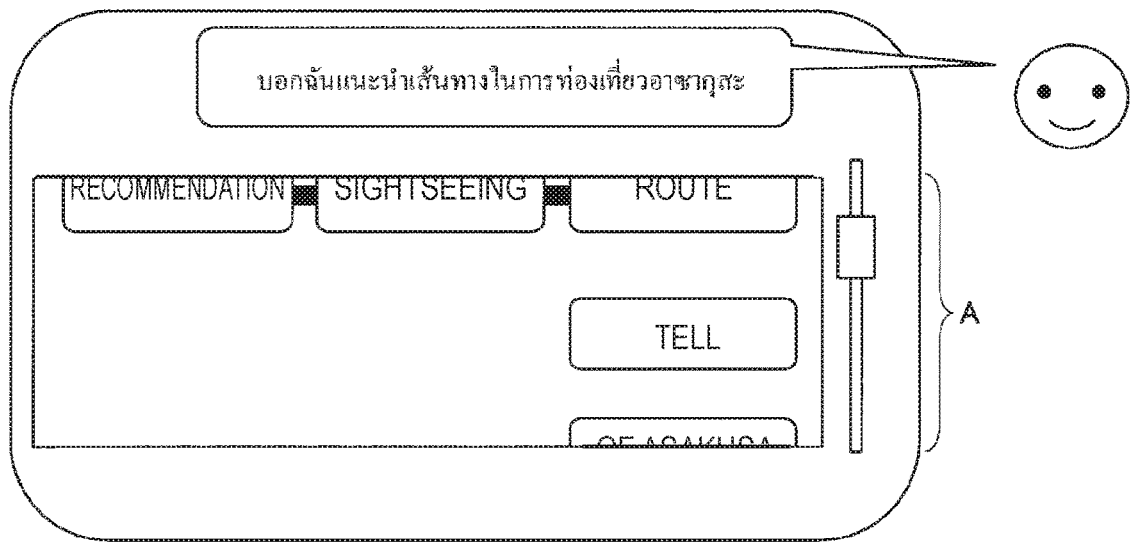
FIG. 17 is an explanatory diagram for describing an example of a notification control process according to the second information processing method.
Figure 18:
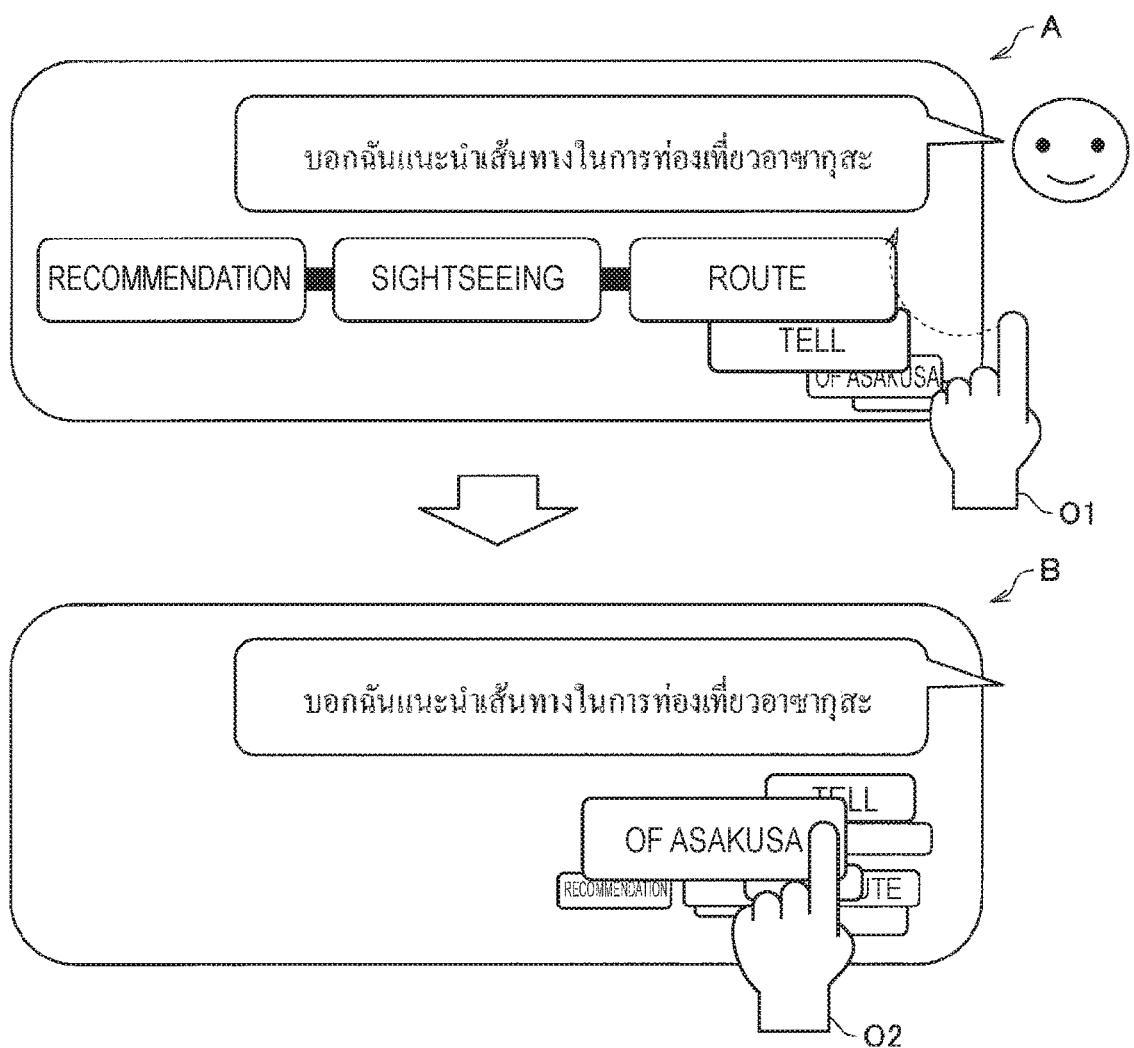
FIG. 18 is an explanatory diagram for describing an example of a notification control process according to the second information processing method.

FIGS. 17 and 18 illustrate examples of the display screen in the case of causing the translation result of each translation unit obtained according to the translation process (the translated summarized content of the speech) to be changed on the basis of the manipulation performed on display screen. Here, FIG. 17 illustrates an example of a display screen in which it is possible to cause the content being displayed on the display screen to be changed through a slider type UI as illustrated in A of FIG. 17. Further, FIG. 18 illustrates an example of a display screen in which it is possible to cause the content being displayed on the display screen to be changed through a revolver type UI in which a display is changed while rotating in the depth direction of the display screen.

For example, a case in which the user desires to change content being displayed on the display screen in a state in which the display illustrated in FIG. 17 is performed will be described as an example. For example, the user causes the translation result being displayed on the display screen to be changed from a part to another part by manipulating the slider type UI according to a touch manipulation or the like of touching an arbitrary part of the slider illustrated in A of FIG. 17.

Further, for example, a case in which the user changes the content being displayed on the display screen in a state in which the display illustrated in FIG. 18 is performed will be described as an example. For example, the user causes the translation result being displayed on the display screen to be changed from a part to another part by manipulating the revolver type UI by performing a flick manipulation indicated by reference numeral O1 in FIG. 18 or the like.

Further, needless to say, the example of changing the translation result being displayed on the display screen is not limited to the example illustrated in FIGS. 17 and 18.

(V) Fifth Example of Notification Control Process: Notification Control Process Based on Voice-Based Manipulation The information processing apparatus according to the present embodiment may cause an auditory notification of the translation result to be given through a voice from the voice output device on the basis of a voice-based manipulation.

FIGS. 19A and 19B illustrate an example of a case in which an auditory notification of the translation result is given on the basis of the voice-based manipulation. FIGS. 19A and 19B illustrate an example of a case in which content whose notification is given to the communication partner is selected from the translation result of each translation unit obtained according to the translation process on the basis of the voice-based manipulation.

For example, in a case in which the translation result for each translation unit obtained according to the translation process includes "recommendation," "sightseeing" "route," and "tell," the information processing apparatus according to the present embodiment causes a notification of a retranslation result to be given through a voice as indicated by reference numeral "I1" in FIG. 19A as illustrated in FIG. 19A. At this time, as illustrated in FIG. 19A, the information processing apparatus according to the present embodiment may insert a sound feedback indicated by reference numeral "S" in FIG. 19A in the delimiter of the divisional text.

In a case in which a voice-based manipulation as indicated by reference numeral "O" in FIG. 19B is detected after a notification of the retranslation result is given through a voice, the information processing apparatus according to the present embodiment causes a voice indicating the translation result corresponding to the voice-based selection manipulation to be output from the voice output device as indicated by reference numeral "I2" in FIG. 19B. Here, FIG. 19B illustrates an example of the voice-based selection manipulation for designating content whose notification is given to the communication partner using a number. Further, needless to say, the example of the voice-based selection manipulation according to the present embodiment is not limited to the above example.

Figure 20B:
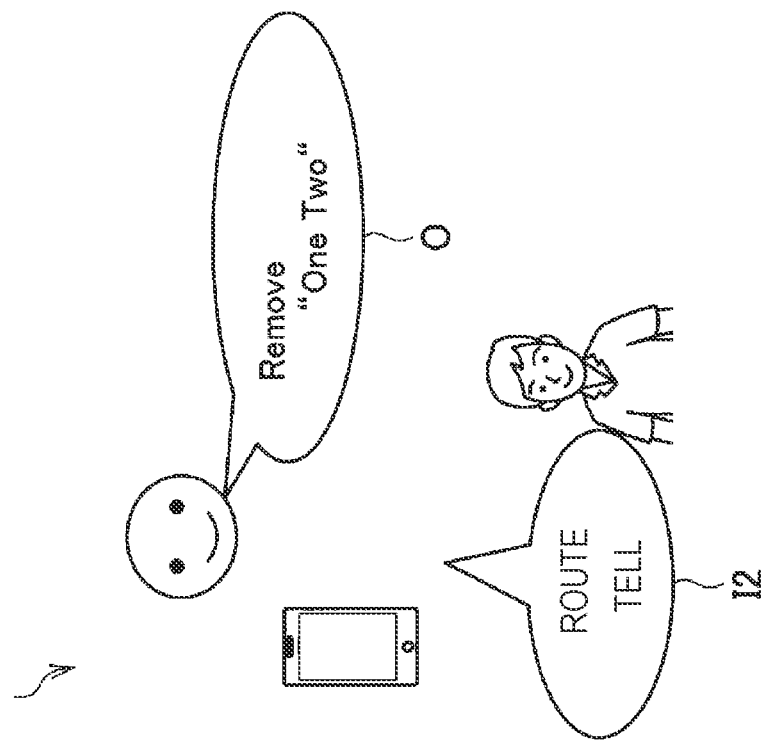
FIGS. 20A and 20B are explanatory diagrams for describing an example of a notification control process according to the second information processing method.
Figure 20A:
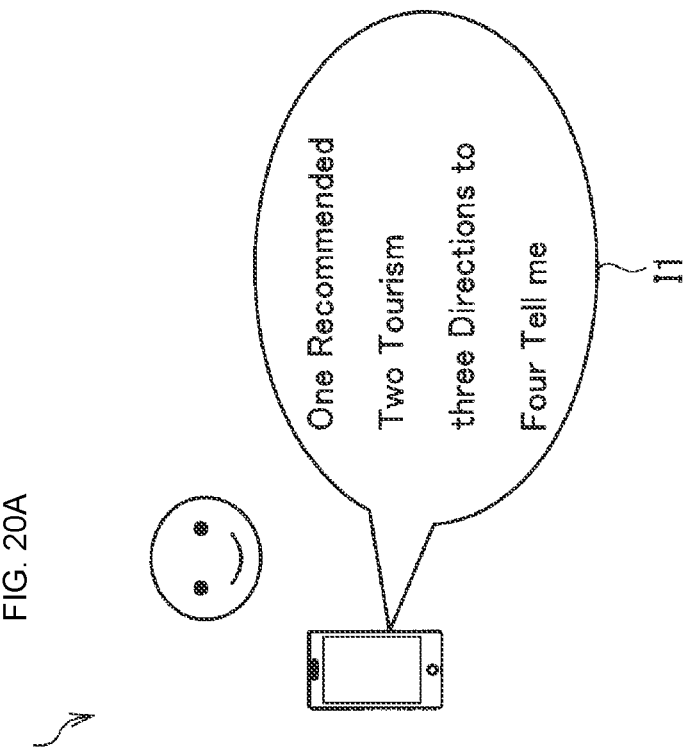

FIGS. 20A and 20B illustrate another example of a case in which an auditory notification of the translation result is given on the basis of the voice-based manipulation. FIGS. 20A and 20B illustrate an example of a case in which content whose notification is given to the communication partner is excluded from the translation result of each translation unit obtained according to the translation process on the basis of the voice-based manipulation.

For example, in a case in which the translation result for each translation unit obtained according to the translation process includes "recommendation," "sightseeing" "route," and "tell," the information processing apparatus according to the present embodiment causes a notification of a retranslation result to be given through a voice as indicated by reference numeral "I1" in FIG. 20A as illustrated in FIG. 20A. Further, similarly to FIG. 19A, the information processing apparatus according to the present embodiment may insert a sound feedback in the delimiter of the divisional text.

In a case in which a voice-based exclusion manipulation indicated by reference numeral "O" in of FIG. 20B is detected after a notification of the retranslation result is given through a voice, the information processing apparatus according to the present embodiment causes a voice indicating the translation result corresponding to the voice-based selection manipulation to be output from the voice output device as indicated by reference numeral "I2" in FIG. 20B. Here, FIG. 20B illustrates an example of the voice-based exclusion manipulation for designating content whose notification need not be given to the communication partner using a number. Further, needless to say, the example of the voice-based exclusion manipulation according to the present embodiment is not limited to the above example.

Further, needless to say, the example of the voice-based manipulation and the example of the notification based on the voice-based manipulation is not limited to the examples illustrated in FIGS. 19A 19B, 20A, and 20B.

(VI) Sixth Example of Notification Control Process: Notification Control Process in Case in which Notification Order is Dynamically Controlled The information processing apparatus according to the present embodiment can also dynamically control the notification order of the notification content.

The information processing apparatus according to the present embodiment controls the notification order of the notification content, for example, on the basis of at least one of information corresponding to a first user and information corresponding to a second user. The information corresponding to the first user includes, for example, at least one of information related to the first user, information related to an application, and information related to a device. Further, the information corresponding to the second user includes at least one of information related to the second user, information related to an application, and information related to a device.

The information related to the first user indicates, for example, either or both of a situation in which the first user is placed and a state of the first user. Further, the information related to the second user indicates, for example, either or both of a situation in which the second user is placed and a state of the second user. Further, the information related to the application indicates, for example, the execution state of the application as described above. Further, the information related to the device indicates, for example, either or both of the type of device and the state of the device as described above.

The situation in which the user (the first user or the second user) is placed is estimated by an arbitrary method capable of estimating the situation in which the user is placed such as, for example, a method of estimating on the basis of noise around the user (for example, a sound other than the voice based on the speech) detected from the voice information or a method of estimating the situation in which the user is placed on the basis of the position indicated by the position information. The process of estimating the situation in which the user is placed may be performed by the information processing apparatus according to the present embodiment or may be performed in the external apparatus of the information processing apparatus according to the present embodiment.

Further, as described above, the state of the user is estimated according to an arbitrary behavior estimation process or an arbitrary emotion estimation process using one or more of biometric information of the user, a detection result of a motion sensor, a captured image captured by an imaging device, and the like.

Figure 21A:
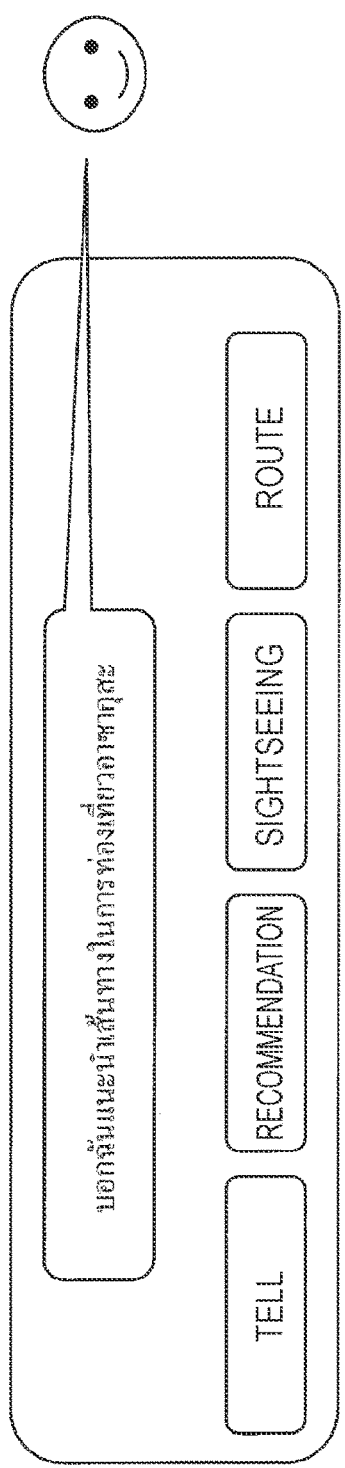
FIGS. 21A, 21B, and 21C are explanatory diagrams for describing an example of a notification control process according to the second information processing method.
Figure 21B:
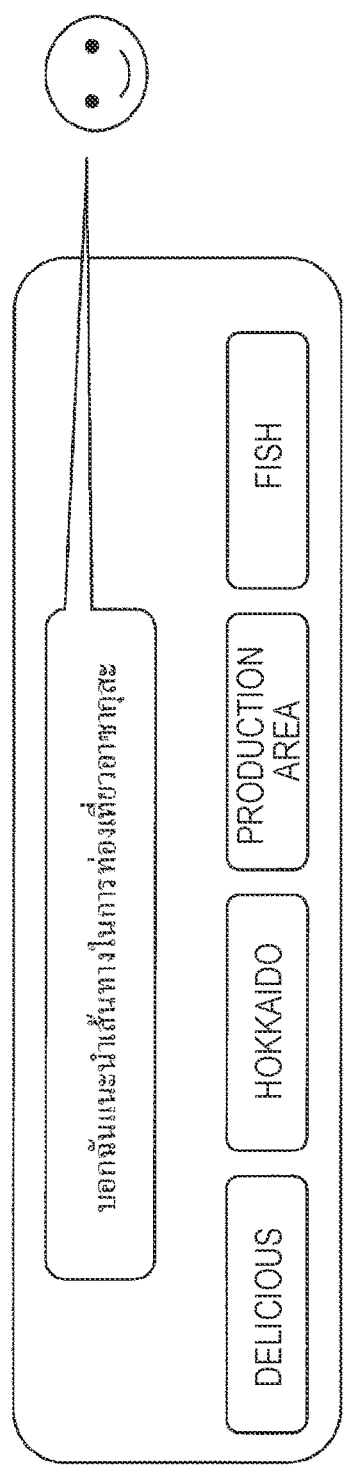
Figure 21C:
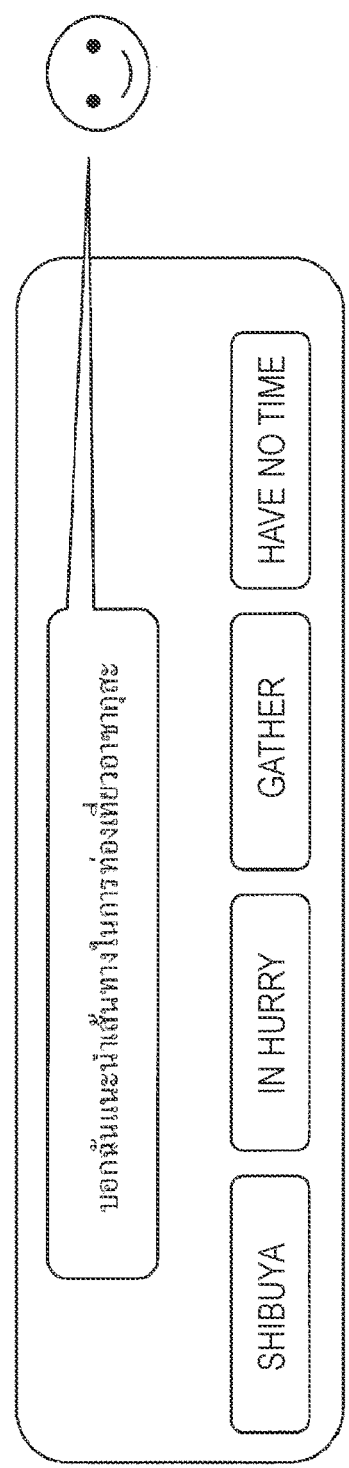

FIGS. 21A, 21B, and 21C illustrate an example of display in a case in which the notification order is dynamically controlled. FIG. 21A illustrates an example in which the translation result of each translation unit obtained according to the translation process (the translated summarized content of the speech) is displayed on the basis of the state of the user. Further, FIG. 21B illustrates an example in which the translation result of each translation unit obtained according to the translation process is displayed on the basis of the execution state of the application. Further, FIG. 21C illustrates an example in which the translation result of each translation unit obtained according to the translation process is displayed on the basis of the situation in which the user is placed.

FIG. 21A illustrates an example of display based on the state of the user in a case in which the translation result of each translation unit includes "recommendation," "sightseeing," "route," and "tell."

For example, in a case in which the state of the user is recognized as "impatience" on the basis of the biometric information, the detection result of the motion sensor, or the like, the information processing apparatus according to the present embodiment causes a verb to be displayed with priority by displaying a verb to be displayed on the leftmost side of the display screen as illustrated in FIG. 21A. The information processing apparatus according to the present embodiment specifies the notification order with reference to, for example, a "table (or a database)" in which the state of the user is associated with information indicating the display order.

FIG. 21B illustrates an example of display based on the execution state of the application in a case in which the translation result of each translation unit includes "Hokkaido," "production area," "delicious," and "fish."

For example, in a case in which the type of application being executed is recognized as a "meal browser" in an apparatus associated with the user such as the smartphone possessed by the user, the information processing apparatus according to the present embodiment causes an adjective to be displayed with priority by displaying an adjective to be displayed on the leftmost side of the display screen as illustrated in FIG. 21B. The information processing apparatus according to the present embodiment specifies the notification order with reference to, for example, a "table (or a database)" in which the type of application is associated with the information indicating the display order.

FIG. 21C illustrates an example of display based on the situation in which the user is placed in a case in which the translation result of each translation unit includes "in hurry," "Shibuya," "gather," and "have no time".

For example, in a case in which the noise detected from the voice information (for example, a sound other than the voice based on the speech) is larger than a set threshold value, the information processing apparatus according to the present embodiment recognizes that the user is in a noisy situation. Then, the information processing apparatus according to the present embodiment causes a noun (or a proper noun) to be displayed with priority by displaying a noun (or a proper noun) to be displayed on the leftmost side of the display screen as illustrated in FIG. 21C. The information processing apparatus according to the present embodiment specifies the notification order with reference to, for example, a "table (or a database)" in which an environment in which user is placed is associated with the information indicating the display order.

Further, the example of dynamically controlling the notification order is not limited to the example illustrated in FIGS. 21A, 21B, and 21C.

For example, in a case in which the notification order is dynamically controlled on the basis of two or more of the situation in which the user is placed, the state of the user, and the execution state of the application (an example of a case in which the notification order is dynamically changed on the basis of a plurality of pieces of information), the information processing apparatus according to the present embodiment specifies the notification order on the basis of a priority (or a priority order) set in each of the situation in which the user is placed, the state of the user, and the execution state of the application. The information processing apparatus according to the present embodiment causes a notification of the notification content corresponding to an index having a high priority (or priority order) to be given with priority.

Further, FIGS. 21A, 21B, and 21C illustrate the example of the notification based on the visual method, but as described above, the information processing apparatus according to the present embodiment can also give a notification based on the auditory method.

Further, the information processing apparatus according to the present embodiment can dynamically control the notification order on the basis of each piece of information related to the device as described above. As an example of dynamically controlling the notification order on the basis of the information related to the device, for example, the notification order may be dynamically controlled in accordance with a processing load of a processor.

(VII) Sixth Example of Notification Control Process: Notification Control Process in a Case in which Notification Content is Dynamically Controlled The information processing apparatus according to the present embodiment can dynamically control an information amount of the notification content.

The information processing apparatus according to the present embodiment dynamically controls an information amount of the notification content on the basis of one or more of, for example, summary information, the information corresponding to the first user, the information corresponding to the second user, and the voice information. An example of dynamically changing the information amount, for example, the following examples (VII-1) to (VII-5) may be used. Further, needless to say, the example of dynamically changing the information amount is not limited to the following examples (VII-1) to (VII-5).

(VII-1) Example of Dynamically Changing Notification Content Based on Summary Information For example, in a case in which a demonstrative such as "that" or "it" is included in the summarized content of the speech indicated by the summary information, the information processing apparatus according to the present embodiment causes a notification of the demonstrative (or the translation result of the demonstrative) not to be given.

For example, in a case in which a word corresponding to a greeting is included in the summarized content of the speech indicated by the summary information, the information processing apparatus according to the present embodiment causes a notification of the word corresponding to the greeting (or the translation result of the word corresponding to the greeting) not to be given.

(VII-2) Example of Dynamically Changing Notification Content Based on Information Corresponding to First User For example, in a case in which a facial expression of the first user is determined to be a smile, the information processing apparatus according to the present embodiment reduces the information amount in a case in which a notification of the notification content is given. For example, in a case in which the line of sight of the first user is determined to face upward (an example of a case in which it is determined to be close to a monologue), the information processing apparatus according to the present embodiment causes a notification of the notification content not to be given. For example, in a case in which a gesture corresponding to a demonstrative such as "that," "it," or "this" (for example, a pointing gesture or the like) is detected, the information processing apparatus according to the present embodiment causes a notification of the notification content not to be given. For example, in a case in which the first user is determined to be placed in a situation in which the noise is large, the information processing apparatus according to the present embodiment causes notifications of all the notification content to be given.

(VII-3) Example of Dynamically Changing Notification Content Based on Information Corresponding to Second User For example, in a case in which the facial expression of the second user is determined to be a smile, the information processing apparatus according to the present embodiment reduces the information amount when a notification of the notification content is given.

In a case in which the second user is the communication partner, for example, when it is determined that there is a possibility that the second user does not understand the content of the speech (for example, when it is determined that the line of sight of the second user does not face the first user), the information processing apparatus according to the present embodiment increases the information amount when a notification of the notification content is given.

In a case in which the second user is the communication partner, for example, when it is determined that the second user is yawning (for example, when it is determined that the second user feels bored or the like), the information processing apparatus according to the present embodiment decreases the information amount when a notification of the notification content is given.

In a case in which the second user is the communication partner, for example, when it is determined the second user nods or agrees enthusiastically, the information processing apparatus according to the present embodiment increases the information amount when a notification of the notification content is given.

In a case in which the second user is the communication partner, for example, when it is determined that the size of the pupil of the second user is larger than a predetermined size or when it is determined that the size of the pupil is equal to or larger than a predetermined size (an example of a case in which the user is determined to be interested in), the information processing apparatus according to the present embodiment increases the information amount when a notification of the notification content is given.

In a case in which the second user is the communication partner, for example, when it is determined that there is a possibility that the second user does not understand the content of the speech (for example, when it is determined that the hand of the second user is not moving or the like), the information processing apparatus according to the present embodiment increases the information amount when a notification of the notification content is given.

In a case in which the second user is the communication partner, for example, when it is determined that an inclination state of the body of the second user is leaning forward (an example in a case in which the user is determined to be interested in), the information processing apparatus according to the present embodiment increases the information amount when a notification of the notification content is given.

For example, in a case in which it is determined that the second user is placed in a situation in which the noise is large, the information processing apparatus according to the present embodiment causes notifications of all the notification content to be given.

(VII-4) Example of dynamically changing notification content based on voice information For example, in a case in which the volume of the speech detected from the voice information is larger than a predetermined threshold value or in a case in which the volume of the speech is equal to or more than a predetermined threshold value, the information processing apparatus according to the present embodiment causes a notification of the notification content not to be given. For example, in a case in which the volume of the speech detected from the voice information is larger than a predetermined threshold value or in a case in which the volume of the speech is equal to or more than a predetermined threshold value, the information processing apparatus according to the present embodiment causes a notification of a part or all of the notification content to be given.

(VII-5) Example of Dynamically Changing Notification Content Based on Combination of Plural Information In a case in which the first user and the second user are different from each other, for example, when it is determined that the line of sight of the first user matches the line of sight of the second user, the information processing apparatus according to the present embodiment increases the information amount when a notification of the notification content is given (an example of dynamic changing the notification content on the basis of the information corresponding to the first user and the information corresponding to the second user).

Specific example of process according to information processing method according to present embodiment Next, a specific example of the process according to the information processing method of the present embodiment described above will be described. An example of the process in the use case described with reference to FIGS. 1, 2, 3A, 3B, 3C, 4A, 4B, and 5 will be described below as a specific example of the process according to the information processing method of the present embodiment.

FIGS. 22 to 33 are flowcharts illustrating an example of the process according to the information processing method of the present embodiment. An example of the process according to the information processing method of the present embodiment will be described below with reference to FIGS. 22 and 33.

The information processing apparatus according to the present embodiment sets the weight related to the summary (hereinafter also referred to as a "weight related to a summarization function" or referred to simply as a "weight") (S100) (presetting). The information processing apparatus according to the present embodiment sets the weight related to the summary by deciding the weight related to the summary and holding the weight related to the summary in a recording medium such as a storage unit (to be described later). As the process of step S100, for example, the process illustrated in FIG. 23 may be performed.

Figure 23:
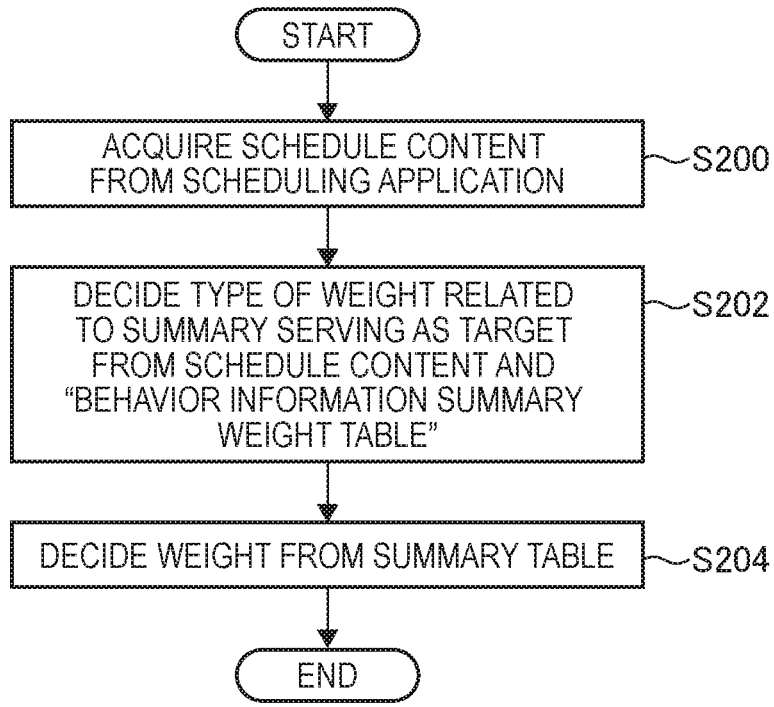
FIG. 23 is a flowchart illustrating an example of a process according to an information processing method of the present embodiment.

Referring to FIG. 23, the information processing apparatus according to the present embodiment acquires data indicating schedule content from the scheduling application (S200).

The information processing apparatus according to the present embodiment decides the type of weight related to the summary on the basis of a behavior recognized from the data indicating the acquired schedule content and a table for specifying the type of weight related to the summary illustrated in FIG. 8 (hereinafter referred to as "behavior information summary weight table") (S202).

Then, the information processing apparatus according to the present embodiment decides the weight related to the summary on the basis of the type of weight related to the summary decided in step S202 and a table for specifying the weight related to the summary illustrated in FIG. 6 (hereinafter also referred to as a "summary table") (S204).

Figure 22:
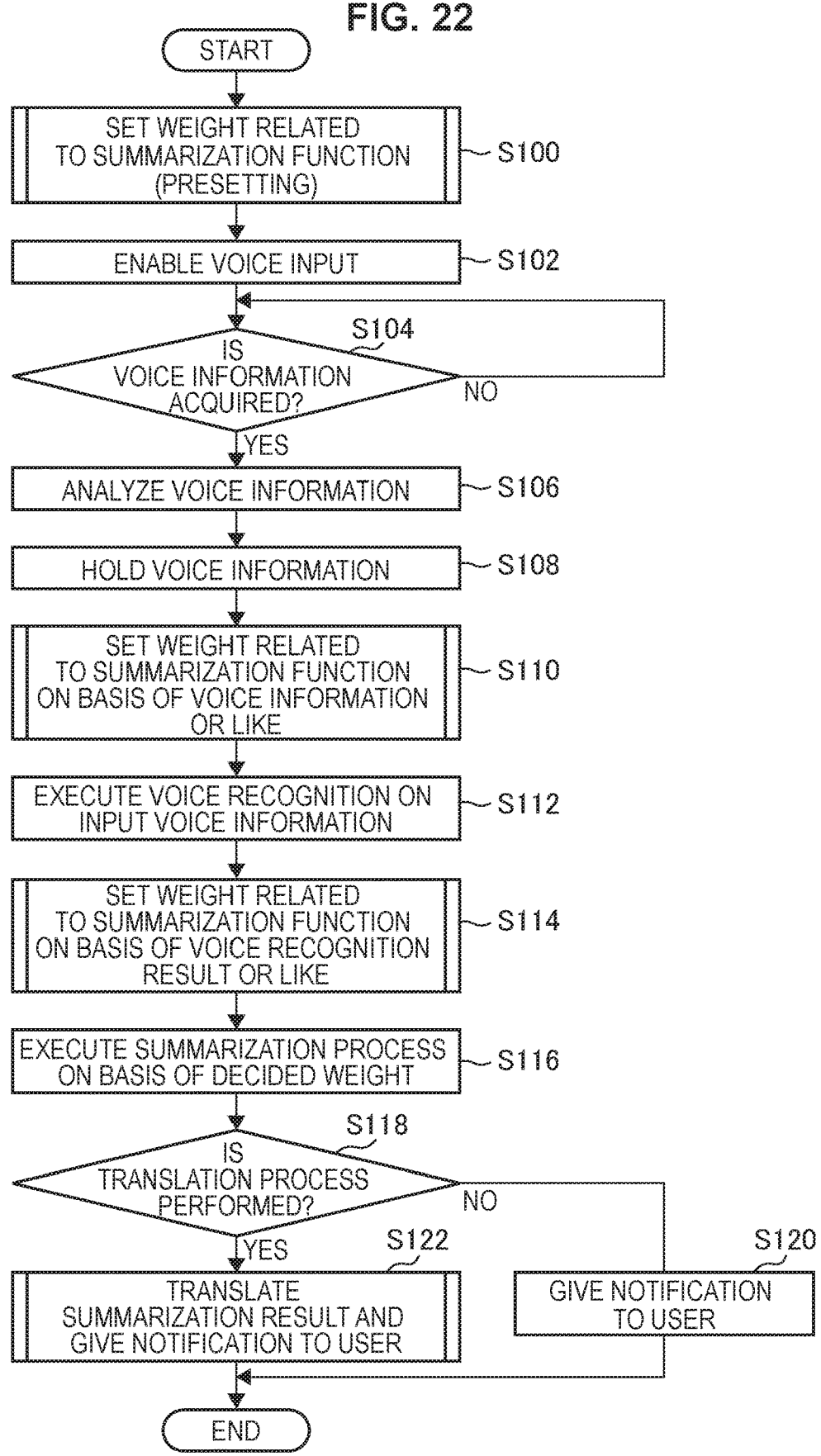
FIG. 22 is a flowchart illustrating an example of a process according to an information processing method of the present embodiment.

The information processing apparatus according to the present embodiment performs, for example, the process illustrated in FIG. 23 as the process of step S100 in FIG. 22. Further, needless to say, the process of step S100 in FIG. 22 is not limited to the process illustrated in FIG. 23.

An example of the process according to the information processing method of the present embodiment will be described with reference to FIG. 22 again. The information processing apparatus according to the present embodiment enables a voice input (S102), for example, when an application related to the voice input is activated.

The information processing apparatus according to the present embodiment determines whether or not the voice information is acquired (S104). In a case in which it is determined in step S104 that the voice information is not acquired, the information processing apparatus according to the present embodiment does not proceed with the process of step S106 and subsequent steps, for example, until it is determined that the voice information is acquired.

Further, in a case in which it is determined in step S104 that the voice information is acquired, the information processing apparatus according to the present embodiment analyzes the voice information (S106). The information processing apparatus according to the present embodiment analyzes the voice information and obtains, for example, the sound pressure, the pitch, the average frequency band, and the like. Further, the information processing apparatus according to the present embodiment holds the voice information in a recording medium such as a storage unit (to be described later) (S108).

The information processing apparatus according to the present embodiment sets the weight related to the summary on the basis of the voice information or the like (S110). As the process of step S110, for example, the process illustrated in FIG. 24 may be performed.

Figure 24:
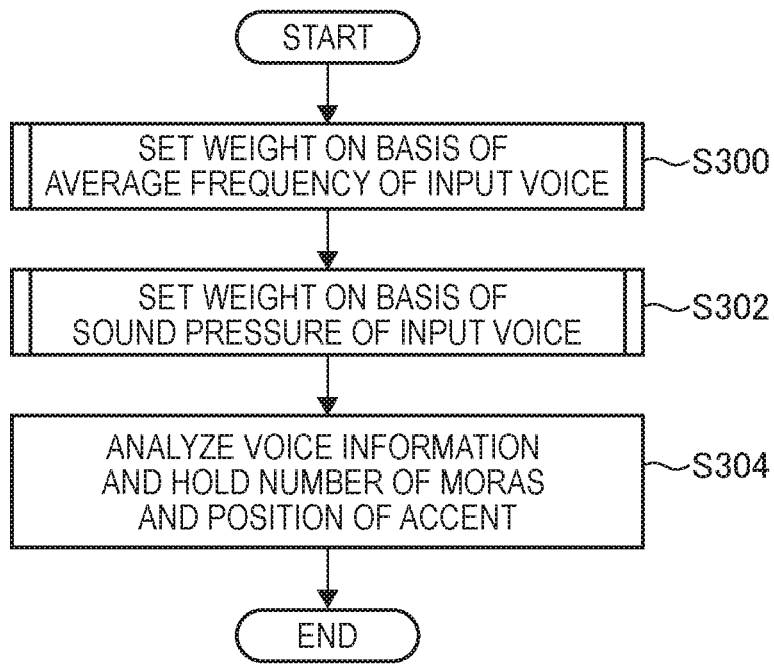
FIG. 24 is a flowchart illustrating an example of a process according to an information processing method of the present embodiment.

Referring to FIG. 24, the information processing apparatus according to the present embodiment sets the weight related to the summary on the basis of the average frequency of the voice indicated by the voice information (hereinafter also referred to as an "input voice") (S300). As the process of step S300, for example, the process illustrated in FIG. 25 may be performed.

Further, FIG. 24 illustrates the example in which the process of step S302 is performed after the process of step S300, but the process of step S110 of FIG. 22 is not limited to the process illustrated in FIG. 24. For example, since the process of step S300 and the process of step S302 are independent processes, the information processing apparatus according to the present embodiment can perform the process of step S304 after the process of step S302 or can perform the process of step S300 and the process of step S302 in parallel.

Figure 25:
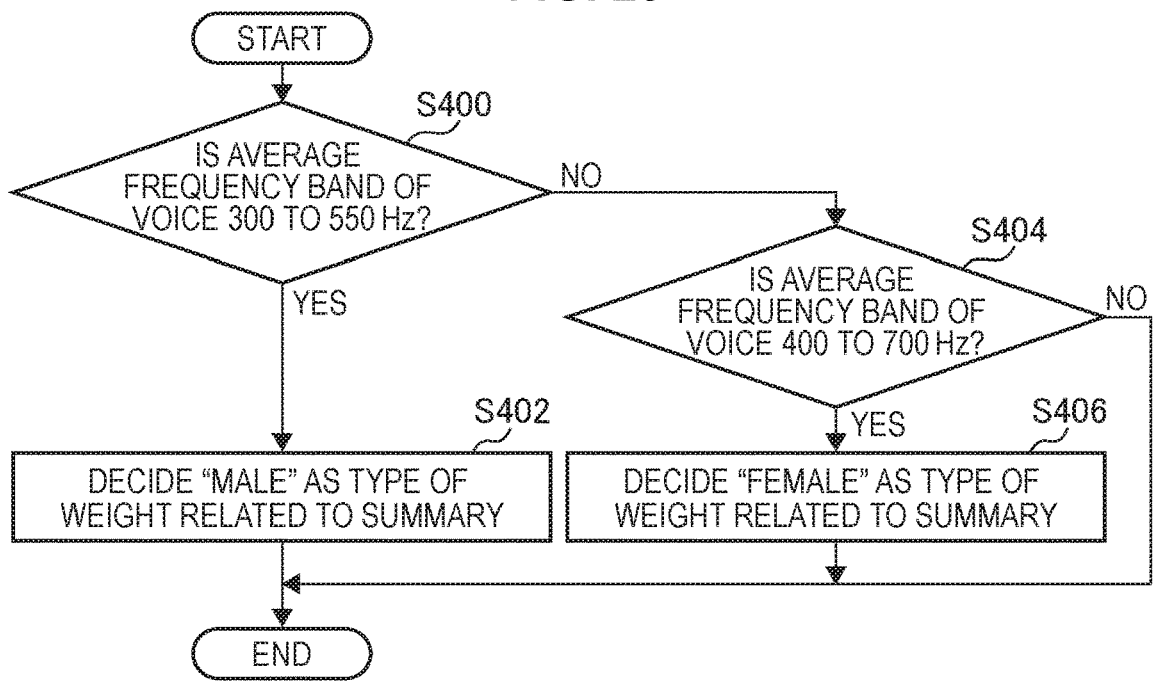
FIG. 25 is a flowchart illustrating an example of a process according to an information processing method of the present embodiment.

Referring to FIG. 25, the information processing apparatus according to the present embodiment determines whether or not the average frequency band of the voice is 300 [Hz] to 550 [Hz] (S400).

In a case in which it is determined in step S400 that the average frequency band of the voice is 300 [Hz] to 550 [Hz], the information processing apparatus according to the present embodiment decides "male" as the type of weight related to the summary (S402).

Further, in a case in which it is determined in step S400 that the average frequency band of the voice is not 300 [Hz] to 550 [Hz], the information processing apparatus according to the present embodiment determines whether or not the average frequency band of the voice is, 400 [Hz] to 700 [Hz] (S404).

In a case in which it is determined in step S404 that the average frequency band of the voice is 400 [Hz] to 700 [Hz], the information processing apparatus according to the present embodiment decides "female" as the type of weight related to the summary (S406).

Further, in a case in which it is determined in step S404 that the average frequency band of the voice is not 400 [Hz] to 700 [Hz], the information processing apparatus according to the present embodiment does not decide the weight related to the summary.

The information processing apparatus according to the present embodiment performs, for example, the process illustrated in FIG. 25 as the process of step S300 in FIG. 24. Further, needless to say, the process of step S300 in FIG. 24 is not limited to the process illustrated in FIG. 25.

An example of the process of step S110 in FIG. 22 will be described with reference to FIG. 24 again. The information processing apparatus according to the present embodiment sets the weight related to the summary on the basis of the sound pressure of the voice indicated by the voice information (S302). As the process of step S302, for example, the process illustrated in FIG. 26 may be performed.

Figure 26:
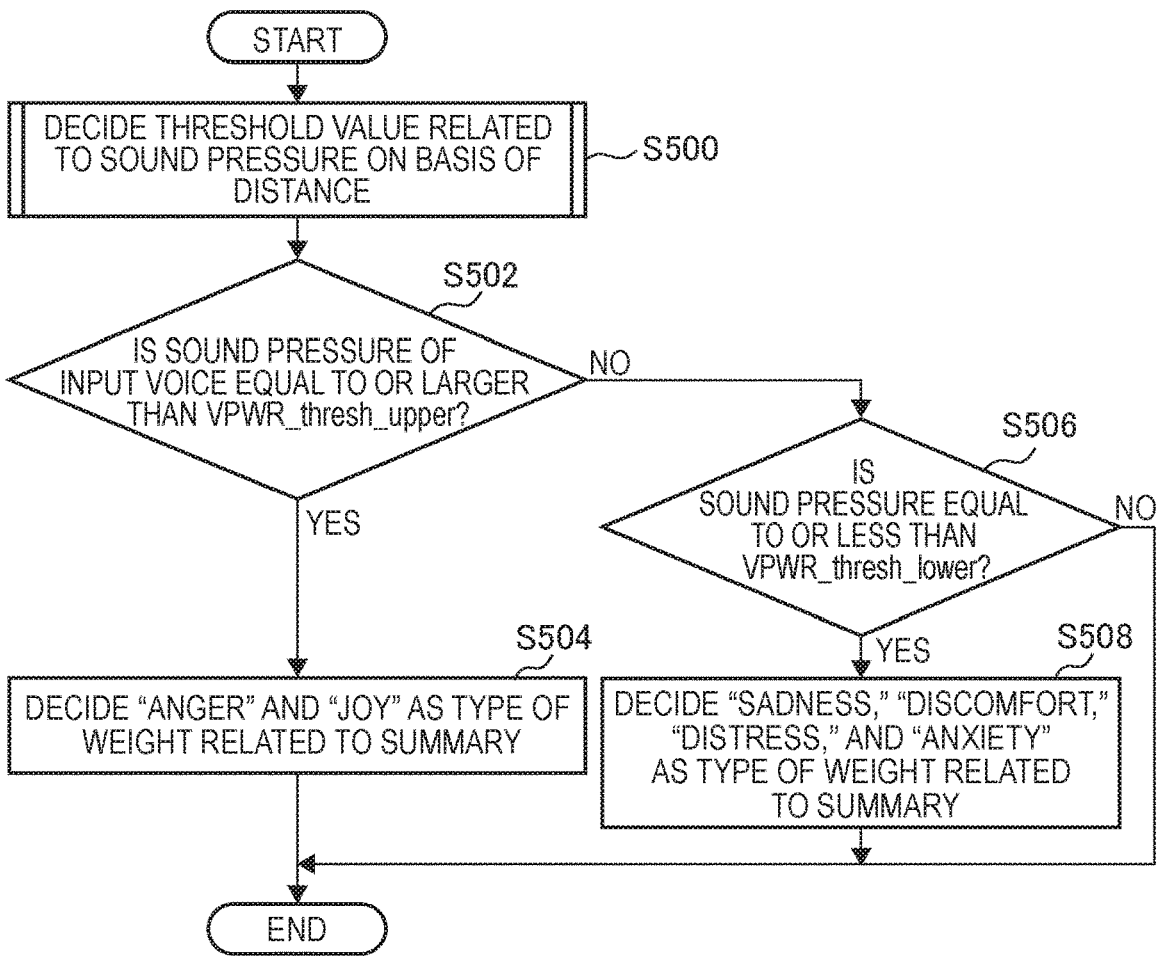
FIG. 26 is a flowchart illustrating an example of a process according to an information processing method of the present embodiment.

Referring to FIG. 26, the information processing apparatus according to the present embodiment decides a threshold value related to the sound pressure on the basis of a distance between the user of the speaker and the communication partner (S500). As the process of step S500, for example, the process illustrated in FIG. 27 may be performed.

Figure 27:
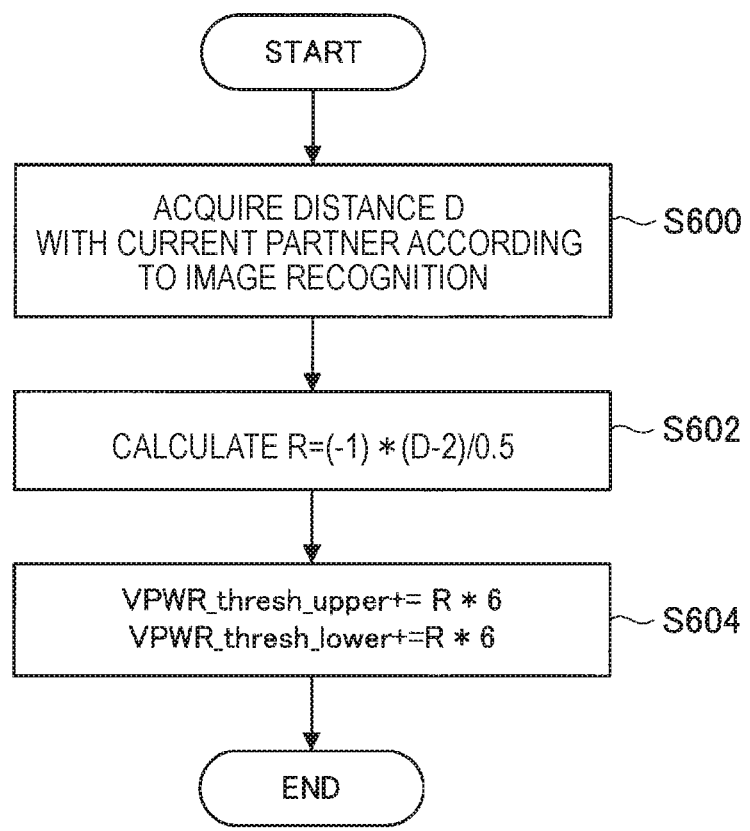
FIG. 27 is a flowchart illustrating an example of a process according to an information processing method of the present embodiment.

Referring to FIG. 27, the information processing apparatus according to the present embodiment acquires a distance D from the current communication partner according to image recognition based on the captured image captured by the imaging device (S600).

The information processing apparatus according to the present embodiment performs, for example, an operation of the following Formula 2 (S602).

[Math. 2]

$$R = (-1) \cdot \frac{(D-1)}{0.5} \quad \text{(Formula 2)}$$

Then, the information processing apparatus according to the present embodiment performs, for example, an operation of the following Formula 3, and decides a threshold value related to the sound pressure by adjusting a threshold value VPWR_thresh_upper related to the sound pressure and a threshold value VPWR_thresh_lower related to the sound pressure (S604).

[Math. 3]

$$\begin{cases} \text{VPWR\_thresh\_upper+} = R \cdot 6 \\ \text{VPWR\_thresh\_lower+} = R \cdot 6 \end{cases} \quad \text{(Formula 3)}$$

The information processing apparatus according to the present embodiment performs, for example, the process illustrated in FIG. 27 as the process of step S500 in FIG. 26. Further, needless to say, the process of step S500 in FIG. 26 is not limited to the process illustrated in FIG. 27.

An example of the process of step S302 of FIG. 24 will be described with reference to FIG. 26 again. The information processing apparatus according to the present embodiment determines whether or not the sound pressure of the voice indicated by the voice information is equal to or larger than the threshold value VPWR_thresh_upper related to the sound pressure (S502).

In a case in which it is determined in step S502 that the sound pressure of the voice indicated by the voice information is equal to or larger than the threshold value VPWR_thresh_upper related to the sound pressure, the information processing apparatus according to the present embodiment decides "anger" and "joy" as the type of weight related to the summary (S504).

Further, in a case in which it is determined in step S502 that the sound pressure of the voice indicated by the voice information is neither equal to nor larger than the threshold value VPWR_thresh_upper related to the sound pressure, the information processing apparatus according to the present embodiment determines whether or not the sound pressure of the voice indicated by the voice information is equal to or less than the threshold value VPWR_thresh_lower related to the sound pressure (S506).

In a case in which it is determined in step S506 that the sound pressure of the voice indicated by the voice information is equal to or less than the threshold value VPWR_thresh_lower related to the sound pressure, the information processing apparatus according to the present embodiment decides "sadness," "discomfort," "distress," and "anxiety" as the type of weight related to the summary (S508).

Further, in a case in which it is determined in step S506 that the sound pressure of the voice indicated by the voice information is neither equal to nor less than the threshold value VPWR_thresh_lower related to the sound pressure, the information processing apparatus according to the present embodiment does not decide the weight related to the summary.

The information processing apparatus according to the present embodiment performs, for example, the process illustrated in FIG. 26 as the process of step S302 in FIG. 24. Further, needless to say, the process of step S302 in FIG. 24 is not limited to the process illustrated in FIG. 26.

An example of the process of step S110 of FIG. 22 will be described with reference to FIG. 24 again. The information processing apparatus according to the present embodiment analyzes, for example, the voice information and holds the number of moras and the position of the accent (S304). Further, the process of step S304 may be performed in the process of step S106 of FIG. 22.

The information processing apparatus according to the present embodiment performs, for example, the process illustrated in FIG. 24 as the process of step S110 in FIG. 22. Further, needless to say, the process of step S110 in FIG. 22 is not limited to the process illustrated in FIG. 24.

An example of the process according to the information processing method of the present embodiment will be described with reference to FIG. 22 again. The information processing apparatus according to the present embodiment performs the voice recognition on the voice information (S112). As the process of step S112 is performed, the voice text information is acquired.

If the process of step S112 is performed, the information processing apparatus according to the present embodiment sets the weight related to the summary on the basis of the voice recognition result or the like (S114). As the process of step S114, for example, the process illustrated in FIG. 28 may be performed.

Figure 28:
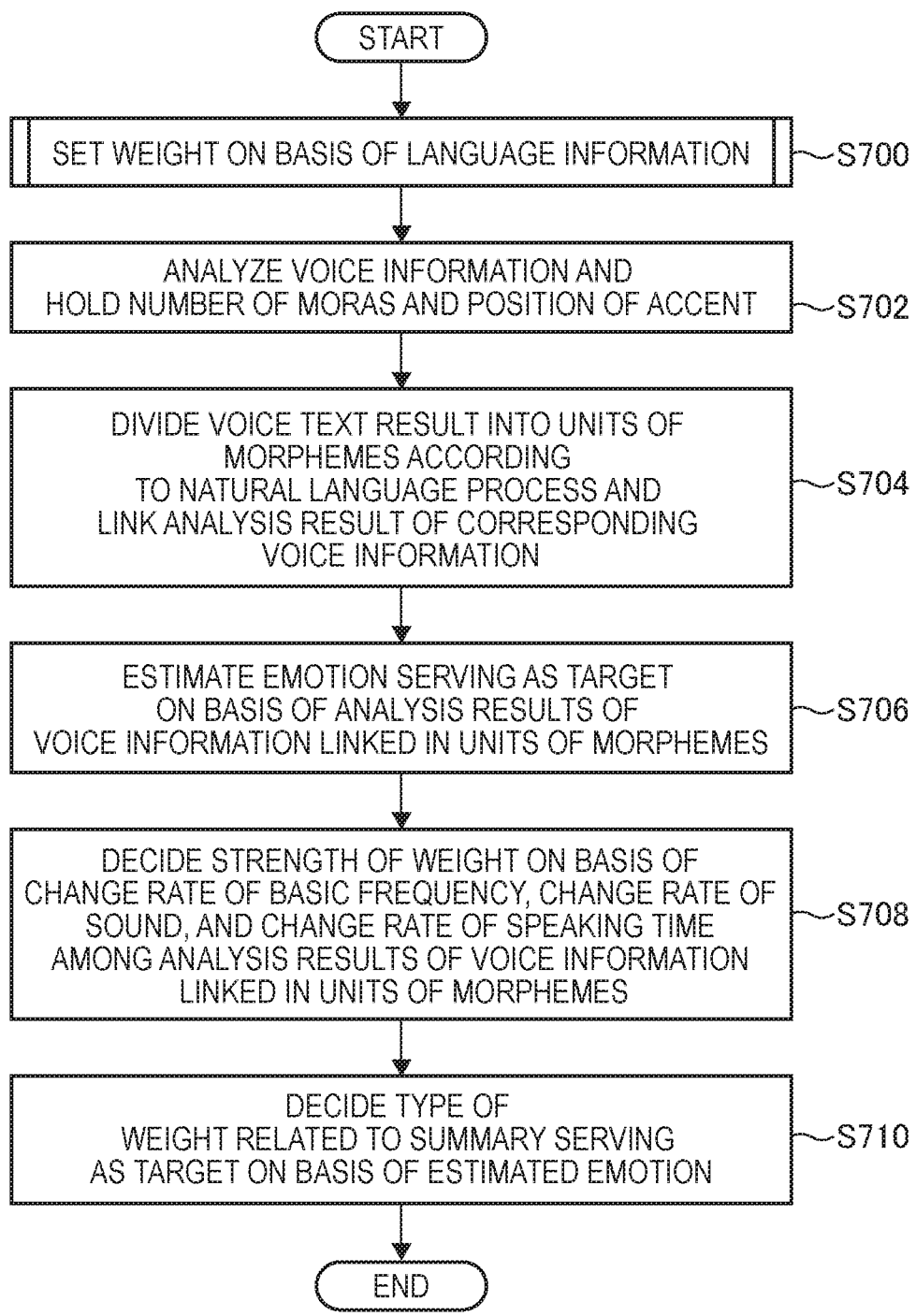
FIG. 28 is a flowchart illustrating an example of a process according to an information processing method of the present embodiment.

Referring to FIG. 28, the information processing apparatus according to the present embodiment sets the weight related to the summary on the basis of the language of the character string indicated by the voice text information (S700). As the process of step S700, for example, the process illustrated in FIG. 29 may be performed.

Further, FIG. 28 illustrates the example in which the processes of steps S704 to S710 are performed after the processes of steps S700 and S702, but the process of step S114 of FIG. 22 is not limited to the process illustrated in FIG. 28. For example, since the processes of steps S700 and S702 and the processes of steps S704 to S710 are independent processes, the information processing apparatus according to the present embodiment can perform the processes of steps S700 and S702 after the processes of steps S704 to S710 or can perform the processes of steps S700 and S702 and the processes of steps S704 to S710 in parallel.

Figure 29:
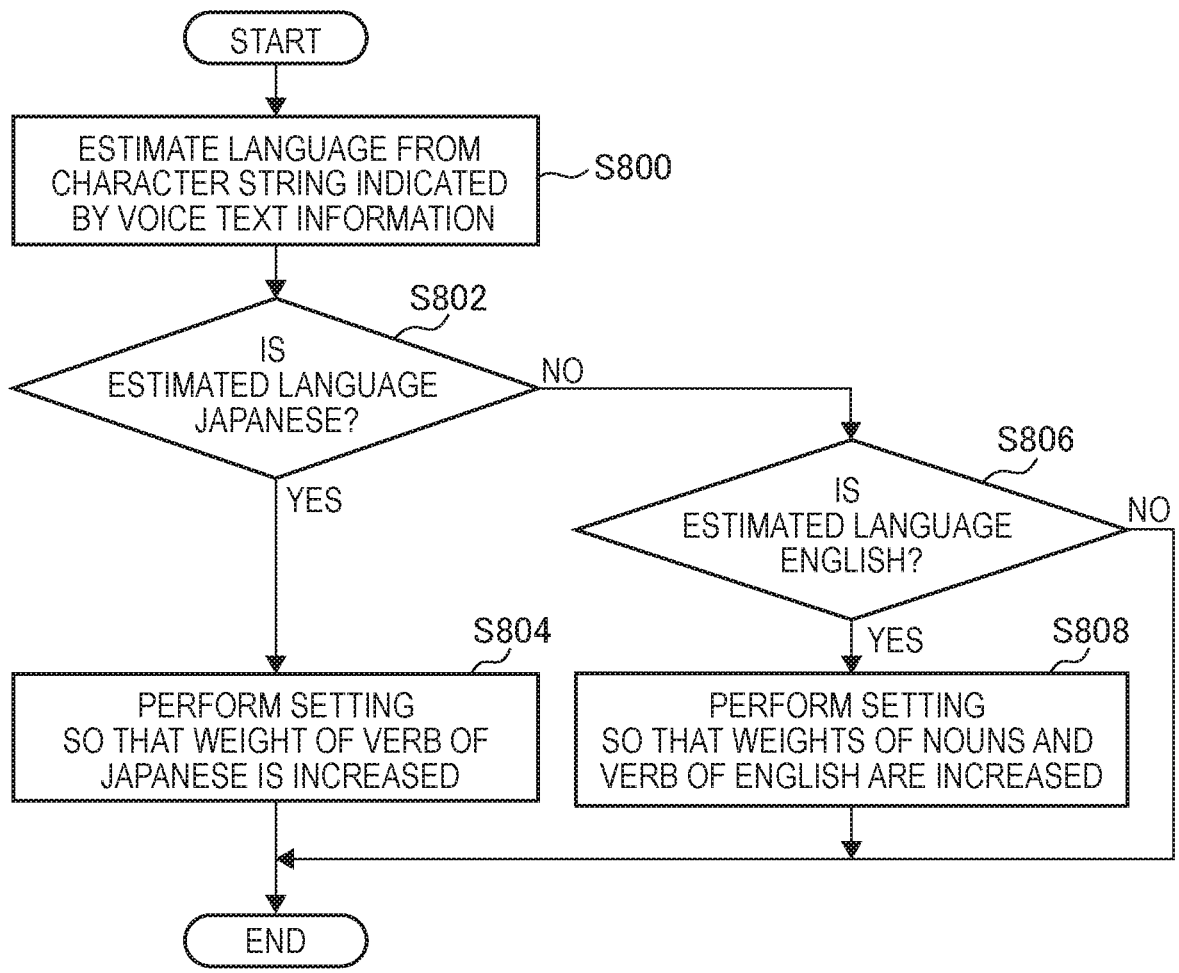
FIG. 29 is a flowchart illustrating an example of a process according to an information processing method of the present embodiment.

Referring to FIG. 29, the information processing apparatus according to the present embodiment estimates the language of the character string indicated by the voice text information (S800). The information processing apparatus according to the present embodiment estimates the language according to a process according to an arbitrary method capable of estimating the language from the character string such as estimation by matching with a language dictionary If the language is estimated in step S800, the information processing apparatus according to the present embodiment determines whether or not the estimated language is Japanese (S802).

In a case in which it is determined in step S802 that the estimated language is Japanese, the information processing apparatus according to the present embodiment decides the weight related to the summary so that the weight of "a verb of Japanese" is increased (S804).

Further, in a case in which it is determined in step S802 that the estimated language is not Japanese, the information processing apparatus according to the present embodiment determines whether or not the estimated language is English (S806).

In a case in which it is determined in step S806 that the estimated language is English, the information processing apparatus according to the present embodiment decides the weight related to the summary so that the weights of "a noun and a verb of English" are increased (S808).

Further, in a case in which it is determined in step S806 that the estimated language is not English, the information processing apparatus according to the present embodiment does not decide the weight related to the summary.

The information processing apparatus according to the present embodiment performs, for example, the process illustrated in FIG. 29 as the process of step S700 in FIG. 28. Further, needless to say, the process of step S700 in FIG. 28 is not limited to the process illustrated in FIG. 29.

An example of the process of step S114 of FIG. 22 will be described with reference to FIG. 28 again. The information processing apparatus according to the present embodiment analyzes, for example, the voice information and holds the number of moras and the position of the accent (S702). Further, the process of step S702 may be performed in the process of step S106 of FIG. 22.

The information processing apparatus according to the present embodiment divides the character string indicated by the voice text information (hereinafter also referred to as a "voice text result") into units of morphemes according to a natural language process and links analysis results of corresponding voice information (S704).

The information processing apparatus according to the present embodiment estimates an emotion on the basis of the analysis results of the voice information linked in units of morphemes in step S704 (S706). The information processing apparatus according to the present embodiment can estimate emotion using an arbitrary method capable of estimating the emotion using the analysis result of the voice information such as a method of using a table in which the analysis result of the voice information is associated with the emotion.

Further, the information processing apparatus according to the present embodiment decides the strength of the weight related to the summary (the strength of the weight related to the emotion) on the basis of the analysis results of the voice information linked in units of morphemes in step S704 (S708). The information processing apparatus according to the present embodiment decides the strength of the weight related to the summary on the basis of, for example, a change rate of a basic frequency, a change rate of a sound, a change rate of a speaking time among the analysis results of the voice information. The information processing apparatus according to the present embodiment decides the strength of the weight related to the summary using an arbitrary method capable of deciding the strength of the weight related to the summary using the analysis result of the voice information such as a method of using a table in which the analysis result of the voice information is associated with the strength of the weight related to the summary.

The information processing apparatus according to the present embodiment decides the weight related to the summary on the basis of the emotion estimated in step S706 (S710). Further, the information processing apparatus according to the present embodiment may adjust the weight related to the summary decided on the basis of the estimated emotion in accordance with the strength of the weight related to the summary decided in step S708.

The information processing apparatus according to the present embodiment performs, for example, the process illustrated in FIG. 28 as the process of step S114 in FIG. 22. Further, needless to say, the process of step S114 in FIG. 22 is not limited to the process illustrated in FIG. 28.

An example of the process according to the information processing method of the present embodiment will be described will be described with reference to FIG. 22 again. The information processing apparatus according to the present embodiment performs the summarization process on the basis of the weight related to the summary decided in each of steps S100, S110, and S114 (S116).

If the process of step S116 is completed, the information processing apparatus according to the present embodiment determines whether or not the translation process is performed (S118).

In a case in which it is determined in step S118 that the translation process is not to be performed, the information processing apparatus according to the present embodiment causes a notification of the summarization result to be given according to the notification control process (S120).

Further, in a case in which it is determined in step S118 that the translation process is performed, the information processing apparatus according to the present embodiment performs the translation process on the summarization result and causes a notification of the translation result to be given according to the notification control process (S122). As the process of step S122, for example, the process illustrated in FIG. 30 may be performed.

Figure 30:
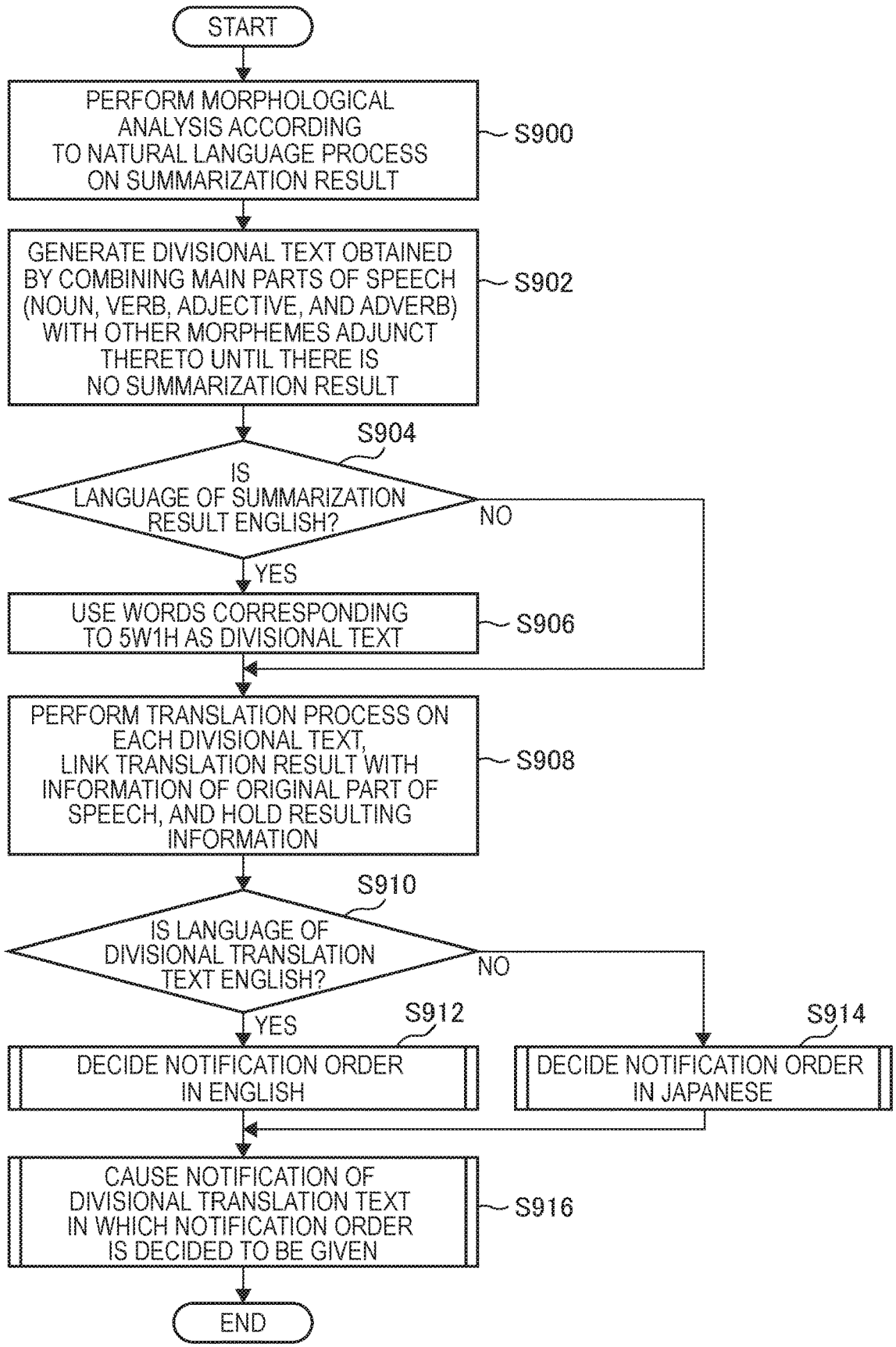
FIG. 30 is a flowchart illustrating an example of a process according to an information processing method of the present embodiment.

Referring to FIG. 30, the information processing apparatus according to the present embodiment performs the morphological analysis by performing, for example, the natural language process on the summarization result (S900).

The information processing apparatus according to the present embodiment generates the divisional text obtained by combining the main parts of speech (a noun, a verb, an adjective, and an adverb) with other morphemes until there is no unprocessed summarization result (S902).

The information processing apparatus according to the present embodiment determines whether or not the language of the summarization result is English (S904).

In a case in which it is determined in step S904 that the language of the summarization result is not English, the information processing apparatus according to the present embodiment performs a process of step S908 to be described later.

Further, in a case in which it is determined in step S904 that the language of the summarization result is English, the information processing apparatus according to the present embodiment uses words corresponding to 5W1H as the divisional text (S906).

In a case in which it is determined in step S904 that the language of the summarization result is not English or if the process of step S906 is performed, the information processing apparatus according to the present embodiment performs the translation process on each divisional text, links the translation result with information of the original part of speech before translation, and holds the resulting information (S908).

The information processing apparatus according to the present embodiment determines whether or not the language of the divisional translation text (an example of the translation result) is English (S910).

In a case in which it is determined in step S910 that the language of the divisional translation text is English, the information processing apparatus according to the present embodiment decides the notification order in English (S912). As the process of step S912, for example, the process illustrated in FIG. 31 may be performed.

Figure 31:
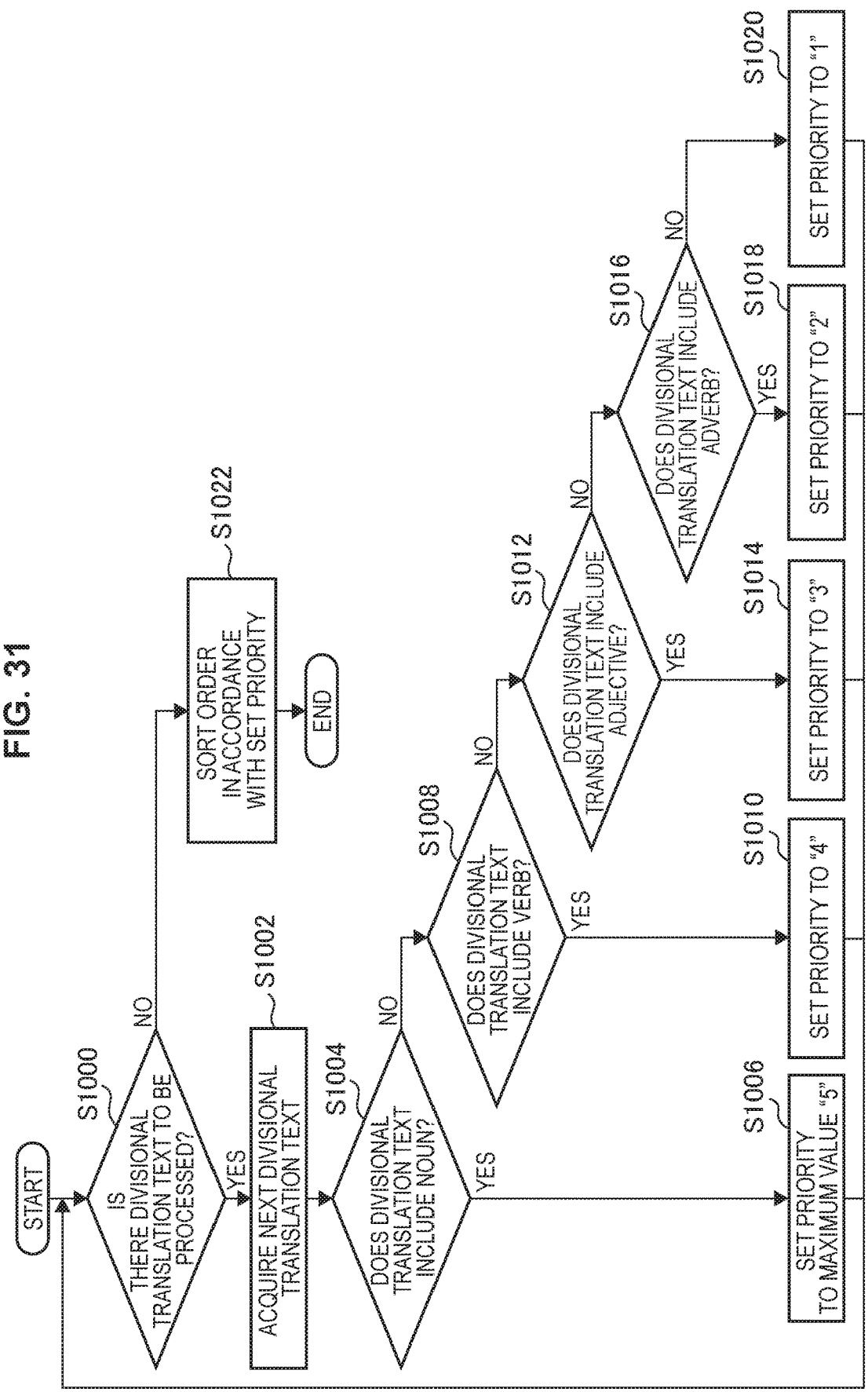
FIG. 31 is a flowchart illustrating an example of a process according to an information processing method of the present embodiment.

Referring to FIG. 31, the information processing apparatus according to the present embodiment determines whether or not there is a divisional translation text to be processed (S1000). Here, an unprocessed translation result among the translation results of each translation unit corresponds to the divisional translation text to be processed in step S1000. For example, the information processing apparatus according to the present embodiment determines that there is a divisional translation text to be processed in a case in which there is an unprocessed translation result, and determines that there is no divisional translation text to be processed in a case in which there is no unprocessed translation result.

In a case in which it is determined in step S1000 that there is a divisional translation text to be processed, the information processing apparatus according to the present embodiment acquires the divisional translation text to be processed next (S1002).

The information processing apparatus according to the present embodiment determines whether or not the divisional translation text to be processed includes a noun (S1004).

In a case in which it is determined in step S1004 that the divisional translation text to be processed includes a noun, the information processing apparatus according to the present embodiment sets the priority to a maximum value "5" (S1006). Then, the information processing apparatus according to the present embodiment repeats the process starting from step S1000.

Further, in a case in which it is determined in step S1004 that the divisional translation text to be processed does not include a noun, the information processing apparatus according to the present embodiment determines whether or not the divisional translation text to be processed includes a verb (S1008).

In a case in which it is determined in step S1008 that the divisional translation text to be processed includes a verb, the information processing apparatus according to the present embodiment sets the priority to "4" (S1010). Then, the information processing apparatus according to the present embodiment repeats the process starting from step S1000.

Further, in a case in which it is determined in step S1008 that the divisional translation text to be processed does not include a verb, the information processing apparatus according to the present embodiment determines whether or not the divisional translation text to be processed includes an adjective (S1012).

In a case in which it is determined in step S1012 that the divisional translation text to be processed includes an adjective, the information processing apparatus according to the present embodiment sets the priority to "3" (S1014). Then, the information processing apparatus according to the present embodiment repeats the process starting from step S1000.

Further, in a case in which it is determined in step S1012 that the divisional translation text to be processed does not include an adjective, the information processing apparatus according to the present embodiment determines whether or not the divisional translation text to be processed includes an adverb (S1016).

In a case in which it is determined in step S1016 that the divisional translation text to be processed includes an adverb, the information processing apparatus according to the present embodiment sets the priority to "2" (S1018).

Then, the information processing apparatus according to the present embodiment repeats the process starting from step S1000.

Further, in a case in which it is determined in step S1016 that the divisional translation text to be processed does not include an adverb, the information processing apparatus according to the present embodiment sets the priority to a minimum value "1" (S1020). Then, the information processing apparatus according to the present embodiment repeats the process starting from step S1000.

In a case in which it is determined in step S1000 that there is not a divisional translation text to be processed, the information processing apparatus according to the present embodiment sorts the notification order in accordance with the set priority (S1022).

The information processing apparatus according to the present embodiment performs, for example, the process illustrated in FIG. 31 as the process of step S912 in FIG. 30. Further, needless to say, the process of step S912 in FIG. 30 is not limited to the process illustrated in FIG. 31.

An example of the process of step S122 of FIG. 22 will be described with reference to FIG. 30 again. In a case in which it is determined in step S910 that the language of the divisional translation text is not English, the information processing apparatus according to the present embodiment decides the notification order in Japanese (S914). As the process of step S914, for example, the process illustrated in FIG. 32 may be performed.

Figure 32:
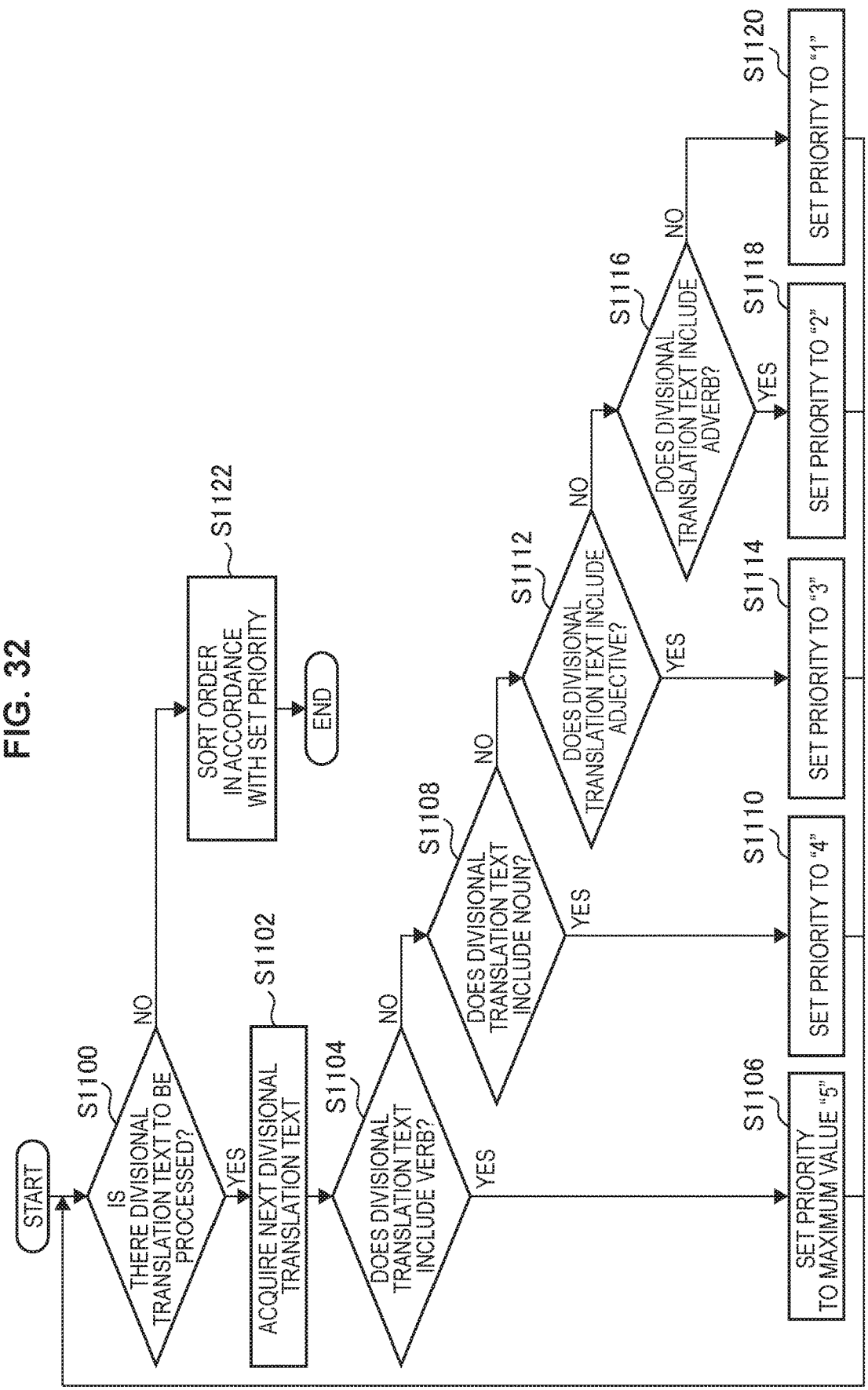
FIG. 32 is a flowchart illustrating an example of a process according to an information processing method of the present embodiment.

Referring to FIG. 32, the information processing apparatus according to the present embodiment determines whether or not there is a divisional translation text to be processed similarly to step S1100 in FIG. 31 (S1100). Here, an unprocessed translation result among the translation results of each translation unit corresponds to the divisional translation text to be processed in step S1100.

In a case in which it is determined in step S1100 that there is a divisional translation text to be processed, the information processing apparatus according to the present embodiment acquires the divisional translation text to be processed next (S1102).

The information processing apparatus according to the present embodiment determines whether or not the divisional translation text to be processed includes a verb (S1104).

In a case in which it is determined in step S1104 that the divisional translation text to be processed includes a verb, the information processing apparatus according to the present embodiment sets the priority to a maximum value "5" (S1106). Then, the information processing apparatus according to the present embodiment repeats the process starting from step S1100.

Further, in a case in which it is determined in step S1104 that the divisional translation text to be processed does not include a verb, the information processing apparatus according to the present embodiment determines whether or not the divisional translation text to be processed includes a noun (S1108).

In a case in which it is determined in step S1108 that the divisional translation text to be processed includes a noun, the information processing apparatus according to the present embodiment sets the priority to "4" (S1110). Then, the information processing apparatus according to the present embodiment repeats the process starting from step S1100.

Further, in a case in which it is determined in step S1108 that the divisional translation text to be processed does not include a noun, the information processing apparatus according to the present embodiment determines whether or not the divisional translation text to be processed includes an adjective (S1112).

In a case in which it is determined in step S1112 that the divisional translation text to be processed includes an adjective, the information processing apparatus according to the present embodiment sets the priority to "3" (S1114). Then, the information processing apparatus according to the present embodiment repeats the process starting from step S1100.

Further, in a case in which it is determined in step S1112 that the divisional translation text to be processed does not include an adjective, the information processing apparatus according to the present embodiment determines whether or not the divisional translation text to be processed includes an adverb (S1116).

In a case in which it is determined in step S1116 that the divisional translation text to be processed includes an adverb, the information processing apparatus according to the present embodiment sets the priority to "2" (S1118). Then, the information processing apparatus according to the present embodiment repeats the process starting from step S1100.

Further, in a case in which it is determined in step S1116 that the divisional translation text to be processed does not include an adverb, the information processing apparatus according to the present embodiment sets the priority to a minimum value "1" (S1120). Then, the information processing apparatus according to the present embodiment repeats the process starting from step S1100.

In a case in which it is determined in step S1100 that there is not a divisional translation text to be processed, the information processing apparatus according to the present embodiment sorts the notification order in accordance with the set priority (S1122).

The information processing apparatus according to the present embodiment performs, for example, the process illustrated in FIG. 32 as the process of step S914 in FIG. 30. Further, needless to say, the process of step S914 in FIG. 30 is not limited to the process illustrated in FIG. 32.

An example of the process of step S122 of FIG. 22 will be described with reference to FIG. 30 again. If the process of step S912 or the process of step S914 is completed, the information processing apparatus according to the present embodiment causes a notification of the divisional translation text in which the notification order is decided to be given according to the notification control process (S916). As the process of step S916, for example, the process illustrated in FIG. 33 may be performed.

Figure 33:
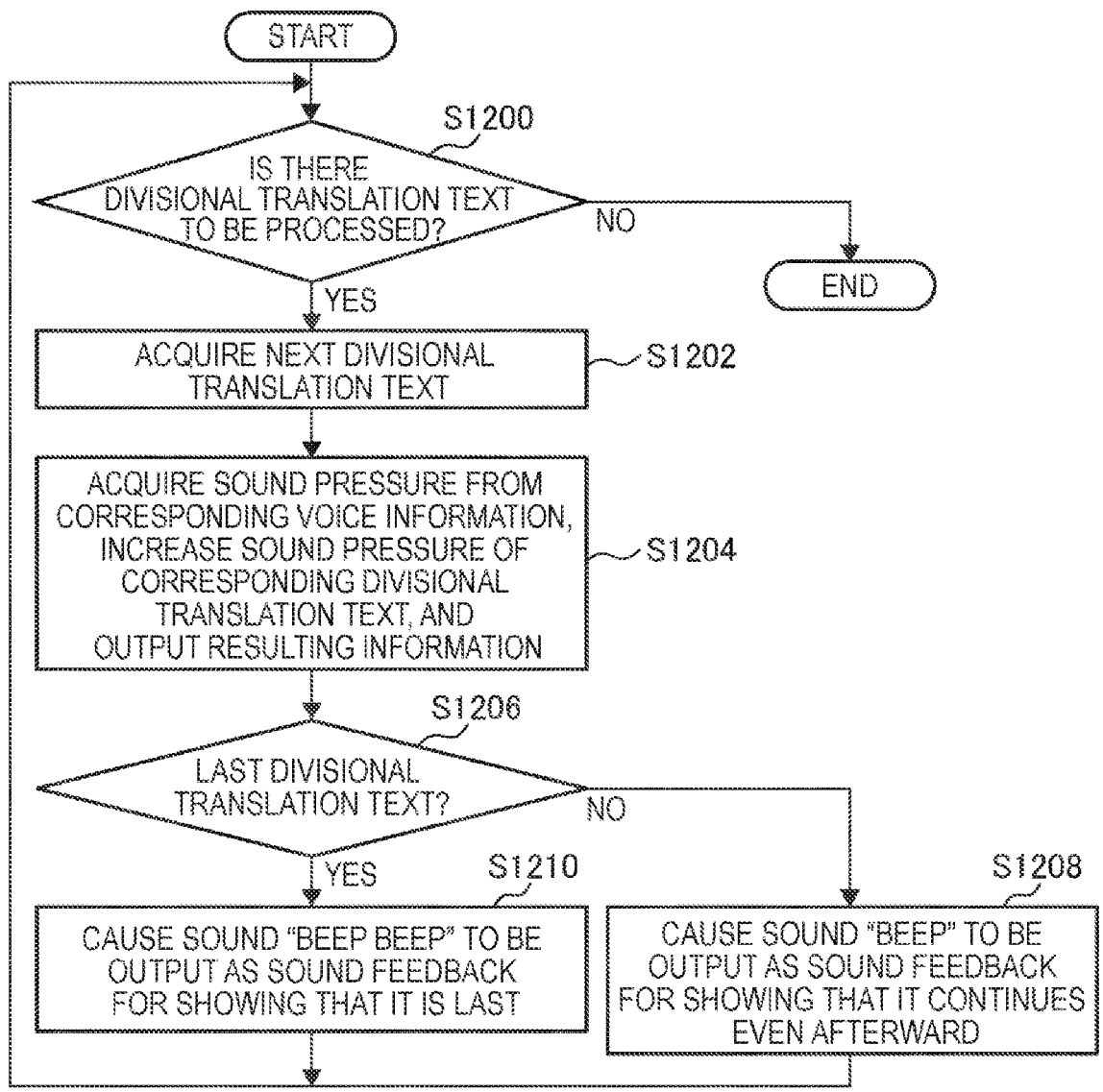
FIG. 33 is a flowchart illustrating an example of a process according to an information processing method of the present embodiment.

Referring to FIG. 33, the information processing apparatus according to the present embodiment determines whether or not there is a divisional translation text to be processed similarly to step S1000 in FIG. 31 (S1200). Here, an unprocessed translation result among the translation results of each translation unit corresponds to the divisional translation text to be processed in step S1200.

In a case in which it is determined in step S1200 that there is a divisional translation text to be processed, the information processing apparatus according to the present embodiment acquires the divisional translation text to be processed next (S1202).

The information processing apparatus according to the present embodiment acquires the sound pressure from the voice information corresponding to the divisional translation text to be processed, increases the sound pressure of the divisional translation text to be processed, and causes the resulting information to be output (S1204).

The information processing apparatus according to the present embodiment determines whether or not the divisional translation text output in step S1204 is the last divisional translation text (S1206). For example, the information processing apparatus according to the present embodiment determines that it is not the last divisional translation text in a case in which there is an unprocessed translation result, and determines that it is the last divisional translation text in a case in which there is no unprocessed translation result.

In a case in which it is determined in step S1206 that it is not the last divisional translation text, the information processing apparatus according to the present embodiment causes a sound "beep" to be output as sound feedback for showing that it continues even afterward (S1208). Then, the information processing apparatus according to the present embodiment repeats the process starting from step S1200.

Further, in a case in which it is determined in step S1206 that it is the last divisional translation text, the information processing apparatus according to the present embodiment causes a sound "beep beep" to be output as sound feedback for showing that it is the last (S1210). Then, the information processing apparatus according to the present embodiment repeats the process starting from step S1200.

In a case in which it is determined in step S1200 that there is no divisional translation text to be processed, the information processing apparatus according to the present embodiment ends the process of FIG. 33.

The information processing apparatus according to the present embodiment performs, for example, the process illustrated in FIG. 33 as the process of step S916 in FIG. 30. Further, needless to say, the process of step S916 in FIG. 30 is not limited to the process illustrated in FIG. 33.

For example, as the processes illustrated in FIGS. 22 to 33 are performed, the use case described with reference to FIGS. 1, 2, 3A, 3B, 3C, 4A, 4B, and 5 can be implemented. Further, needless to say, the process according to the information processing method of the present embodiment is not limited to the processes illustrated in FIGS. 22 to 33.

[5] Example of Effect Obtained by Using Information Processing Method According to Present Embodiment The information processing apparatus according to the present embodiment performs the process according to the information processing method of the present embodiment, and thus for example, the following effects are obtained. Further, needless to say, the effects obtained by using the information processing method of the present embodiment are not limited to the following effects.

Even in a case in which the speaker speaks in a disorganized manner, only the main points are translated, and thus matters which the speaker desires to convey can be conveyed to a recipient.

Since only the main points are translated, it is possible to shorten a confirmation time of the recipient and realize smooth translation communication.

Since there are cases in which the sentences serving as the processing target of the translation process can be reduced extremely, the accuracy of translation can be improved.

Since the recipient need not receive unnecessary words since the content of the speech is summarized and then translated, it is easy for the recipient to understand. As a result, it is possible to encourage people who are not good at foreign languages to speak across language barriers.

(Information Processing Apparatus According to Embodiment)

Next, an example of a configuration of the information processing apparatus according to the embodiment capable of performing the process related to the information processing method according to the embodiment described above will be described. Hereinafter, as one example of a configuration of the information processing apparatus according to the present embodiment, example of an information processing apparatus capable of performing either or both of the process according to the first information processing method described above and the process according to the second information processing method described above will be described.

Figure 34:
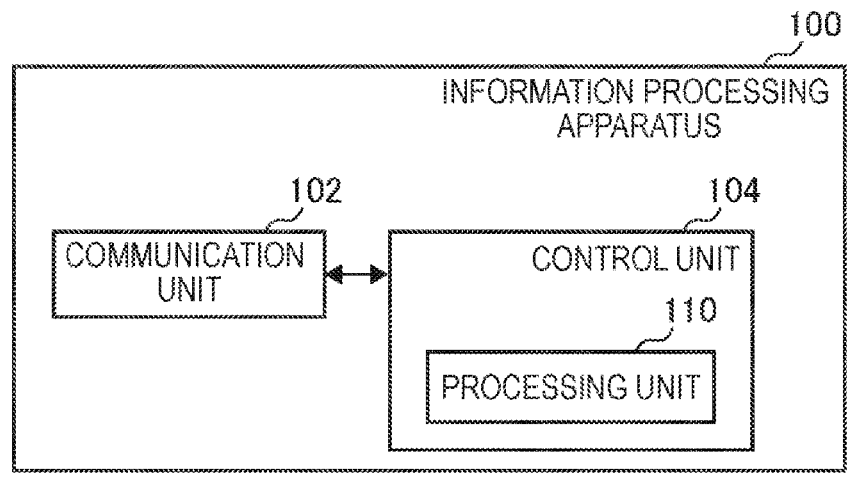
FIG. 34 is a block diagram illustrating an example of a configuration of an information processing apparatus according to the embodiment.

FIG. 34 is a block diagram illustrating an example of a configuration of the information processing apparatus 100 according to the embodiment. The information processing apparatus 100 includes, for example, a communication unit 102 and a control unit 104.

Moreover, for example, the information processing apparatus 100 may include, a read-only memory (ROM which is not illustrated), a random access memory (RAM which is not illustrated), a storage unit (not illustrated), a manipulation unit (not illustrated) which can be manipulated by a user of the information processing apparatus 100, and a display unit (not illustrated) that displays various screens on a display screen. In the information processing apparatus 100, for example, the constituent elements are connected via a bus serving as a data transmission path. Further, the information processing apparatus 100 is driven by, for example, electric power supplied from an internal power supply such as a battery of the information processing apparatus 100, electric power supplied from a connected external power supply, or the like.

The ROM (not illustrated) stores a program or control data such as calculation parameters which are used by the control unit 104. The RAM (not illustrated) temporarily stores a program or the like which is executed by the control unit 104.

The storage unit (not illustrated) is storage means included in the information processing apparatus 100 and stores, for example, data related to the information processing method according to the embodiment, such as the table for setting the weight related to the summary and various kinds of data such as various applications. Here, as the storage unit (not illustrated), for example, a magnetic recording medium such as a hard disk and a nonvolatile memory such as a flash memory can be exemplified. Moreover, the storage unit (not illustrated) may be detachably mounted on the information processing apparatus 100.

As the manipulation unit (not illustrated), a manipulation input device to be described below can be exemplified. Moreover, as the display unit (not illustrated), a display device to be described below can be exemplified.

[Example of Hardware Configuration of Information Processing Apparatus 100]

FIG. 35 is an explanatory diagram illustrating an example of a hardware configuration of the information processing apparatus 100 according to the embodiment. The information processing apparatus 100 includes, for example, an MPU 150, a ROM 152, a RAM 154, a recording medium 156, an input and output interface 158, a manipulation input device 160, a display device 162, and a communication interface 164. Moreover, in the information processing apparatus 100, for example, the constituent elements are connected via a bus 166 serving as a data transmission path.

For example, the MPU 150 includes one or two or more processors or various processing circuits including a calculation circuit such as an MPU, and functions as the control unit 104 controlling the entire information processing apparatus 100. Moreover, the MPU 150 plays roles of, for example, the processing unit 110 to be described below in the information processing apparatus 100. Note that the processing unit 110 may include a dedicated (or general-purpose) circuit (for example, a processor different from the MPU 150) capable of realizing a process of the processing unit 110.

The ROM 152 stores a program or control data such as calculation parameters which is used by the MPU 150. For example, the RAM 154 temporarily stores a program or the like which is executed by the MPU 150.

The recording medium 156 functions as a storage unit (not illustrated) and stores, for example, data related to the information processing method according to the embodiment, such as the table for setting the weight related to the summary and various kinds of data such as various applications. Here, as the recording medium 156, for example, a magnetic recording medium such as a hard disk and a nonvolatile memory such as a flash memory can be exemplified. Moreover, the recording medium 156 may be detachably mounted on the information processing apparatus 100.

The input and output interface 158 connects, for example, the manipulation input device 160 or the display device 162. The manipulation input device 160 functions as a manipulation unit (not illustrated) and the display device 162 functions as a display unit (not illustrated). Here, as the input and output interface 158, for example, a Universal Serial Bus (USB) terminal, a Digital Visual Interface (DVI) terminal, a High-Definition Multimedia Interface (HDMI) (registered trademark) terminal, and various processing circuits can be exemplified.

Moreover, for example, the manipulation input device 160 can be installed on the information processing apparatus 100 and is connected to the input and output interface 158 inside the information processing apparatus 100. As the manipulation input device 160, for example, a button, an arrow key, a rotary selector such as a jog dial, or a combination thereof can be exemplified.

Moreover, for example, the display device 162 can be installed on the information processing apparatus 100 and is connected to the input and output interface 158 inside the information processing apparatus 100. As the display device 162, for example, a liquid crystal display or an organic electro-luminescence display (or also referred to as an organic light emitting diode display) can be exemplified.

In addition, it is regardless to say that the input and output interface 158 can be connected to an external device such as an external manipulation input device (for example, a keyboard or a mouse) or an external display device of the information processing apparatus 100. Moreover, the display device 162 may be, for example, a device in which display and a user manipulation are possible, such as a touch panel.

The communication interface 164 is communication means included in the information processing apparatus 100 and functions as the communication unit 102 that performs wireless or wired communication with an external apparatus or an external device. Here, as the communication interface 164, for example, a communication antenna and a radio frequency (RF) circuit (for wireless communication), an IEEE 802.15.1 port and a transmission and reception circuit (for wireless communication), an IEEE 802.11 port and a transmission and reception circuit (for wireless communication), or a Local Area Network (LAN) terminal and a transmission and reception circuit (for wired communication) can be exemplified.

The information processing apparatus 100 that has, for example, the configuration illustrated in FIG. 35 performs the process related to the information processing method according to the embodiment. In addition, a hardware configuration of the information processing apparatus 100 according to the embodiment is not limited to the configuration illustrated in FIG. 35.

For example, the information processing apparatus 100 does not have to include the communication interface 164 in a case in which communication with an external apparatus is performed via a connected external communication device. Moreover, the communication interface 164 may be capable of performing communication with one or two or more external apparatuses in conformity with a plurality of communication schemes.

Moreover, for example, the information processing apparatus 100 does not have to include the recording medium 156, the manipulation input device 160, or the display device 162.

Further, the information processing apparatus 100 may further include one or more of, for example, various sensors such as a motion sensor and a biosensor, a voice input device such as a microphone, a voice output device such as a speaker, a vibration device, an imaging device, and the like.

Moreover, a part or the whole of the structural elements illustrated in FIG. 35 (or a configuration according to a modification example) may be realized by one or two or more ICs.

Referring back to FIG. 34, an example of the configuration of the information processing apparatus 100 will be described. The communication unit 102 is communication means included in the information processing apparatus 100 and performs wireless or wired communication with an external apparatus or an external device via a network (or directly). Moreover, the communication of the communication unit 102 is controlled by, for example, the control unit 104.

Here, as the communication unit 102, for example, a communication antenna and an RF circuit or a LAN terminal and a transmission and reception circuit can be exemplified. However, the configuration of the communication unit 102 is not limited to the foregoing configuration. For example, the communication unit 102 can have a configuration corresponding to any standard capable of performing communication, such as a USB terminal and a transmission and reception circuit or have any configuration capable of communicating an external apparatus via a network. Moreover, the communication unit 102 may have a configuration capable of performing communication with one or two or more external apparatuses in conformity with a plurality of communication schemes.

The control unit 104 is constituted by, for example, an MPU or the like and plays a role of controlling the information processing apparatus 100 in general. Further, the control unit 104 includes, for example, a processing unit 110, and plays a leading role of performing the process according to the information processing method of the present embodiment. For example, the processing unit 110 plays a leading role of performing either or both of the process according to the first information processing method described above and the process according to the second information processing method described above.

In a case in which the process according to the first information processing method described above is performed, the processing unit 110 performs the summarization process of summarizing the content of the speech indicated by the voice information on the basis of the acquired information indicating the weight related to the summary. The processing unit 110 performs, for example, the process described in section [3-1] as the summarization process.

In a case in which the processing according to the second information processing method described above is performed, the processing unit 110 performs the notification control process for controlling the notification of the notification content on the basis of the summary information. The processing unit 110 performs, for example, the process described in section [3-3] as the notification control process.

Further, the processing unit 110 may further perform the translation process of translating the content of the speech summarized according to the summarization process into another language. The processing unit 110 performs, for example, the process described in section [3-2] as the translation process.

In a case in which the summarized content of the speech is translated into another language according to the translation process, the processing unit 110 can cause a notification of the translation result to be given according to the notification control process.

Further, the processing unit 110 can perform various kinds of processes according to the information processing method of the present embodiment such as the process related to the voice recognition, the process related to the voice analysis, the process related to the estimation of the state of the user, and the process related to the estimation of the distance between the user and the communication partner. Further, various kinds of processes according to the information processing method of the present embodiment may be performed in the external apparatus of the information processing apparatus 100.

For example, with the configuration illustrated in FIG. 34, the information processing apparatus 100 performs the process according to the information processing method of the present embodiment (for example, "either or both of the summarization process according to the first information processing method and the notification control process according to the second information processing method" or "either or both of the summarization process according to the first information processing method and the notification control process according to the second information processing method and the translation process").

Therefore, in a case in which the summarization process according to the first information processing method is performed as the process according to the information processing method of the present embodiment, the information processing apparatus 100 can summarize the content of the speech, for example, according to the configuration illustrated in FIG. 34.

Further, in a case in which the notification control process according to the second information processing method is performed as the process according to the information processing method of the present embodiment, the information processing apparatus 100 can cause a notification of the summarized content of the speech to be given, for example, according to the configuration illustrated in FIG. 34.

Further, as the information processing apparatus 100 can obtain the effects obtained by performing the process according to the information processing method of the present embodiment as described above, for example, with the configuration illustrated in FIG. 34.

Further, the configuration of the information processing apparatus according to the present embodiment is not limited to the configuration illustrated in FIG. 34.

For example, in the information processing apparatus according to the present embodiment, the processing unit 110 illustrated in FIG. 34 can be installed separately from the control unit 104 (for example, can be implemented by another processing circuit). Further, for example, the summarization process according to the first information processing method, the notification control process according to the second information processing method, and the translation process according to the present embodiment may be distributed and performed through a plurality of processing circuits.

Further, the summarization process according to the first information processing method, the notification control process according to the second information processing method, and the translation process according to the present embodiment are processes in which the process according to the information processing method of the present embodiment is specified for the sake of convenience. Therefore, the configuration for implementing the process according to the information processing method of the present embodiment is not limited to the configuration illustrated in FIG. 34, and a configuration corresponding to a way of separating the process according to the information processing method of the present embodiment may be employed.

Further, for example, in a case in which communication is performed with an external apparatus through an external communication device having a similar function and configuration to those of the communication unit 102, the information processing apparatus according to the present embodiment may not include the communication unit 102.

The present embodiment has been described using an information processing apparatus as an example, but the present embodiment is not limited to such an example. The present embodiment can be applied to various devices which are capable of performing the processes according to the information processing method of the present embodiment (for example, either of both of the process according to the first information processing method and the process according to the second information processing method) such as a "computer" such as a personal computer (PC) or a server," an "arbitrary wearable apparatus which is worn on the body of the user and used such as an eyewear type apparatus, a clock type apparatus, or a bracelet type apparatus," a "communication apparatus such as a smartphone," a "tablet type apparatus," a "game machine," and a "mobile object such as automobile." Further, for example, the present embodiment can also be applied to a processing IC which can be incorporated in devices described above.

Further, the information processing apparatus according to the present embodiment may be applied to a processing system based on a connection to a network (or communication between respective apparatuses) such as cloud computing or the like. As an example of the processing system in which the process according to the information processing method of the present embodiment is performed, for example, a "system in which the summarization process according to the first information processing method and the translation process is performed by one apparatus constituting the processing system, and the notification control process according to the second information processing method is performed by another apparatus constituting the processing system" may be used.

(Program According to Present Embodiment)

[I] Program (Computer Program) According to First Information Processing Method

A program causing a computer to function as the information processing apparatus according to the present embodiment performing the process according to the first information processing method (for example, a program capable of executing the process according to the first information processing method such as "the summarization process according to the first information processing method" or "the summarization process according to the first information processing method and the translation process according to the present embodiment") is executed by a processor or the like in a computer, and thus content of speech can be summarized.

Further, the program causing the computer to function as the information processing apparatus according to the present embodiment performing the process according to the first information processing method is executed by the processor or the like in the computer, and thus the effects obtained by the process according to the first information processing method described above can be obtained.

[II] Program According to Second Information Processing Method

A program causing a computer to function as the information processing apparatus according to the present embodiment performing the process according to the second information processing method (for example, a program capable of executing the process according to the second information processing method such as "the notification control process according to the second information processing method" or "the translation process according to the present embodiment and the notification control process according to the second information processing method") is executed by a processor or the like in a computer, and thus it is possible to cause a notification of content of speech to be given.

Further, the program causing the computer to function as the information processing apparatus according to the present embodiment performing the process according to the second information processing method is executed by the processor or the like in the computer, and thus the effects obtained by the process according to the second information processing method described above can be obtained.

[III] Program According to Information Processing Method of Present Embodiment

The program related to the information processing method of the present embodiment may include both a program according to the first information processing method and a program according to the second information processing method.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the example in which the program causing the computer to function as the information processing apparatus according to the present embodiment (the program capable of executing either or both of the process according to the first information processing method and the process according to the second information processing method) is provided has been described above, but in the present embodiment, a recording medium having the program stored therein can be provided together.

The above-described configuration is a configuration indicating an example of the present embodiment, and it would be understood that the above-described configuration is included in the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

a processing unit configured to perform a summarization process of summarizing content of speech indicated by voice information based on speech of a user on a basis of acquired information indicating a weight related to a summary.

(2)

The information processing apparatus according to (1), in which the processing unit performs the summarization process in a case in which a predetermined start condition is determined to be satisfied.

(3)

The information processing apparatus according to (2), in which the start condition is a condition related to a non-speaking period in which a state in which speech is not performed continues, and in a case in which the non-speaking period exceeds a predetermined period or in a case in which the non-speaking period is equal to or larger than the predetermined period, the processing unit determines that the start condition is satisfied.

(4)

The information processing apparatus according to (2) or (3), in which the start condition is a condition related to a state of voice recognition for acquiring the content of the speech from the voice information, and the processing unit determines that the start condition is satisfied on a basis of detection of a stop request for the voice recognition.

(5)

The information processing apparatus according to any one of (2) to (4), in which the start condition is a condition related to a state of voice recognition for acquiring the content of the speech from the voice information, and the processing unit determines that the start condition is satisfied on a basis of detection of completion of the voice recognition.

(6)

The information processing apparatus according to any one of (2) to (5), in which the start condition is a condition related to the content of the speech, and the processing unit determines that the start condition is satisfied on a basis of detection of a predetermined word from the content of the speech indicated by the voice information.

(7)

The information processing apparatus according to any one of (2) to (6), in which the start condition is a condition related to the content of the speech, and the processing unit determines that the start condition is satisfied on a basis of detection of hesitation to speak, the detection being based on the voice information.

(8)

The information processing apparatus according to any one of (2) to (7), in which the start condition is a condition related to an elapsed time since the voice information is obtained, and the processing unit determines that the start condition is satisfied in a case in which the elapsed time exceeds a predetermined period or in a case in which the elapsed time is equal to or larger than the predetermined period.

(9)

The information processing apparatus according to any one of (1) to (8), in which the processing unit does not perform the summarization process in a case in which a predetermined summarization exclusion condition is determined to be satisfied.

(10)

The information processing apparatus according to (9), in which the summarization exclusion condition is a condition related to detection of a gesture, and the processing unit determines that the summarization exclusion condition is satisfied in a case in which a predetermined gesture is detected.

(11)

The information processing apparatus according to any one of (1) to (10), in which the processing unit changes a summarization level of the content of the speech on a basis of at least one of a speaking period specified on a basis of the voice information and a number of characters specified on the basis of the voice information.

(12)

The information processing apparatus according to (11), in which the processing unit changes the summarization level of the content of the speech by limiting the number of characters indicated by the summarized content of the speech.

(13)

The information processing apparatus according to any one of (1) to (12), in which the processing unit sets the weight related to the summary on a basis of at least one of the voice information, information related to the user, information related to an application, information related to an environment, and information related to a device.

(14)

The information processing apparatus according to (13), in which the information related to the user includes at least one of state information of the user and manipulation information of the user.

(15)

The information processing apparatus according to any one of (1) to (14), in which the processing unit further performs a translation process of translating the content of the speech summarized according to the summarization process into another language.

(16)

The information processing apparatus according to (15), in which the processing unit does not perform the translation process in a case in which a predetermined translation exclusion condition is determined to be satisfied.

(17)

The information processing apparatus according to (15) or (16), in which the processing unit retranslates the content translated into another language according to the translation process into a language before translation, and in a case in which a word included in the content after retranslation is present in the content of the speech indicated by the voice information acquired after the retranslation, the word included in the content after the retranslation is included in the summarized content of the speech.

(18)

The information processing apparatus according to any one of (1) to (17), in which the processing unit further performs a notification control process of controlling notification of the summarized content of the speech.

(19)

An information processing method that is executed by an information processing apparatus, the information processing method including:

a step of performing a summarization process of summarizing content of speech indicated by voice information based on speech of a user on a basis of acquired information indicating a weight related to a summary.

(20)

A program for causing a computer to implement:

a function of performing a summarization process of summarizing content of speech indicated by voice information based on speech of a user on a basis of acquired information indicating a weight related to a summary.

REFERENCE SIGNS LIST 100 information processing apparatus
102 communication unit
104 control unit
110 processing unit

The invention claimed is:

1. An information processing apparatus, comprising:
at least one processor configured to:
  detect a first speech of a user based on first voice information associated with the first speech of the user;
  set a weight associated with a summary of the first speech of the user, wherein the weight is set based on information related to an application for execution by the user;
  summarize first content of the first speech indicated by the first voice information to generate the summary of the first speech, wherein the summarization of the first content is based on the set weight associated with the summary;
  detect a first language of the first speech of the user;
  translate the first content of the first speech into a second language via a translation process, wherein the second language is different from the first language;
  retranslate the first content, which is translated into the second language via the translation process, into the first language;
  acquire second voice information, after the retranslation of the first content; and
  include a first word in the first content of the first speech associated with the first voice information, based on the first word which is present in each of the retranslated first content and second content of a second speech associated with the second voice information.

2. The information processing apparatus according to claim 1, wherein the summarization of the first content is further based on a start condition being satisfied.

3. The information processing apparatus according to claim 2, wherein
the start condition is related to a non-speaking period in which the first speech is not performed by the user, and the at least one processor is further configured to determine that the start condition is satisfied based on the non-speaking period which is one of equal to or larger than a specific period.

4. The information processing apparatus according to claim 2, wherein
the start condition is related to a state of a voice recognition operation to acquire the first content of the first speech from the first voice information, and
the at least one processor is further configured to determine that the start condition is satisfied based on a stop request for the voice recognition operation.

5. The information processing apparatus according to claim 2, wherein
the start condition is related to a state of a voice recognition operation to acquire the first content of the first speech from the first voice information, and
the at least one processor is further configured to determine that the start condition is satisfied based on completion of the voice recognition operation.

6. The information processing apparatus according to claim 2, wherein
the start condition is related to the first content of the first speech, and
the at least one processor is further configured to determine that the start condition is satisfied based on a second word in the first content of the first speech indicated by the first voice information.

7. The information processing apparatus according to claim 2, wherein
the start condition is related to the first content of the first speech, and
the at least one processor is further configured to:
detect a hesitation of the user to speak, based on the first voice information; and
determine that the start condition is satisfied based on the detection of the hesitation to speak.

8. The information processing apparatus according to claim 2, wherein
the start condition is related to an elapsed time since the first voice information is obtained, and
the at least one processor is further configured to determine that the start condition is satisfied based on the elapsed time which is one of equal to or larger than a specific period.

9. The information processing apparatus according to claim 1, wherein the at least one processor is further configured to abort the summarization, based on a summarization exclusion condition is satisfied.

10. The information processing apparatus according to claim 9, wherein
the summarization exclusion condition is related to detection of a gesture, and
the at least one processor is further configured to determine that the summarization exclusion condition is satisfied based on the detection of the gesture.

11. The information processing apparatus according to claim 1, wherein the at least one processor is further configured to change a summarization level of the first content of the first speech based on at least one of a speaking period specified by the first voice information and a number of characters specified by the first voice information.

12. The information processing apparatus according to claim 11, wherein the at least one processor is further configured to limit the number of characters in the summary of the first speech to change the summarization level of the first content of the first speech.

13. The information processing apparatus according to claim 1, wherein
the at least one processor is further configured to set the weight associated with the summary, based on at least one of information related to the user, information related to an environment associated with the user, or information related to a device, and
the information related to the device includes at least one of a type of the device or a state of the device.

14. The information processing apparatus according to claim 13, wherein the information related to the user includes at least one of state information of the user or manipulation information of the user.

15. The information processing apparatus according to claim 1, wherein the at least one processor is further configured to abort the translation based on a translation exclusion condition being satisfied.

16. The information processing apparatus according to claim 1, wherein the at least one processor is further configured to control notification of the first content of the first speech.

17. An information processing method, comprising:
detecting a first speech of a user based on first voice information associated with the first speech of the user;
setting a weight associated with a summary of the first speech of the user, wherein the weight is set based on information related to an application for execution by the user;
summarizing first content of the first speech indicated by the first voice information to generate the summary of the first speech, wherein the summarization of the first content is based on the set weight associated with the summary;
detecting a first language of the first speech of the user;
translating the first content of the first speech into a second language via a translation process, wherein the second language is different from the first language;
retranslating the first content, which is translated into the second language via the translation process, into the first language;
acquiring second voice information, after the retranslation of the first content; and
including a word in the first content of the first speech associated with the first voice information, based on the word which is present in each of the retranslated first content and second content of a second speech associated with the second voice information.

18. A non-transitory computer-readable medium having stored thereon, computer-executable instructions which, when executed by a computer, cause the computer to execute operations, the operations comprising:
detecting a first speech of a user based on first voice information associated with the first speech of the user;
setting a weight associated with a summary of the first speech of the user, wherein the weight is set based on information related to an application for execution by the user;
summarizing first content of the first speech indicated by the first voice information for generation of the summary of the first speech, wherein the summarization of the first content is based on the set weight associated with the summary;
detecting a first language of the first speech of the user;
translating the first content of the first speech into a second language via a translation process, wherein the second language is different from the first language;

retranslating the first content, which is translated into the second language via the translation process, into the first language;
acquiring second voice information, after the retranslation of the first content; and
including a word in the first content of the first speech associated with the first voice information, based on the word which is present in each of the retranslated first content and second content of a second speech associated with the second voice information.

* * * * *